(12) United States Patent
Newman

(10) Patent No.: US 11,694,462 B1
(45) Date of Patent: *Jul. 4, 2023

(54) CHARACTER COUNT DETERMINATION FOR A DIGITAL IMAGE

(71) Applicant: United Services Automobile Association (USAA), San Antonio, TX (US)

(72) Inventor: Adam S. Newman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,309

(22) Filed: Feb. 15, 2022

Related U.S. Application Data

(63) Continuation of application No. 16/707,925, filed on Dec. 9, 2019, now Pat. No. 11,281,903, which is a
(Continued)

(51) Int. Cl.
*G06V 30/414* (2022.01)
*G06V 10/75* (2022.01)
*G06V 30/224* (2022.01)

(52) U.S. Cl.
CPC .......... *G06V 30/414* (2022.01); *G06V 10/751* (2022.01); *G06V 30/224* (2022.01)

(58) Field of Classification Search
None
See application file for complete search history.

(56) References Cited

U.S. PATENT DOCUMENTS

| 1,748,489 A | 2/1930 | McCarthy et al. |
| 2,292,825 A | 8/1942 | Dilks et al. |
| (Continued) | | |

FOREIGN PATENT DOCUMENTS

| CA | 2619884 | 3/2007 |
| CN | 1897644 A | 1/2007 |
| (Continued) | | |

OTHER PUBLICATIONS

Tiwari, Rajnish et al., "Mobile Banking as Business Strategy", IEEE Xplore, Jul. 2006.
(Continued)

*Primary Examiner* — Michelle M Entezari
(74) *Attorney, Agent, or Firm* — Crowell & Moring, L.L.P.

(57) ABSTRACT

An image processing system or electronic device may implement processing circuitry. The processing circuitry may receive an image, such as financial document image. The processing circuitry may determine a character count for the financial document image or particular portions of the financial document image without recognizing any particular character in the financial document image. In that regard, the processing circuitry may determine a top left score for pixels in the financial document, the top left score indicating or representing a likelihood that a particular pixel corresponds to a top left corner of a text character. The processing circuitry may also determine top right score for image pixels. Then, the processing circuitry may identify one or more text chunks using the top left and top rights scores for pixels in the financial document image. The processing circuitry may determine a character count for the identified text chunks.

20 Claims, 11 Drawing Sheets

Related U.S. Application Data continuation of application No. 16/368,202, filed on Mar. 28, 2019, now Pat. No. 11,144,753, which is a continuation of application No. 15/884,990, filed on Jan. 31, 2018, now Pat. No. 10,360,448, which is a continuation of application No. 15/014,918, filed on Feb. 3, 2016, now Pat. No. 9,904,848, which is a continuation of application No. 14/056,565, filed on Oct. 17, 2013, now Pat. No. 9,286,514.

(56) References Cited

U.S. PATENT DOCUMENTS

| | | | |
|---|---|---|---|
| 3,005,282 | A | 10/1961 | Christiansen |
| 3,341,820 | A | 9/1967 | Grillmeier, Jr. et al. |
| 3,576,972 | A | 5/1971 | Wood |
| 3,593,913 | A | 7/1971 | Bremer |
| 3,620,553 | A | 11/1971 | Donovan |
| 3,648,242 | A | 3/1972 | Grosbard |
| 3,800,124 | A | 3/1974 | Walsh |
| 3,816,943 | A | 6/1974 | Henry |
| 4,002,356 | A | 1/1977 | Weidmann |
| 4,027,142 | A | 5/1977 | Paup et al. |
| 4,060,711 | A | 11/1977 | Buros |
| 4,070,649 | A | 1/1978 | Wright, Jr. et al. |
| 4,128,202 | A | 12/1978 | Buros |
| 4,136,471 | A | 1/1979 | Austin |
| 4,205,780 | A | 6/1980 | Burns |
| 4,264,808 | A | 4/1981 | Owens |
| 4,305,216 | A | 12/1981 | Skelton |
| 4,321,672 | A | 3/1982 | Braun |
| 4,346,442 | A | 8/1982 | Musmanno |
| 4,417,136 | A | 11/1983 | Rushby et al. |
| 4,433,436 | A | 2/1984 | Carnes |
| 4,454,610 | A | 6/1984 | Sziklai |
| RE31,692 | E | 10/1984 | Tyburski et al. |
| 4,523,330 | A | 6/1985 | Grosbard |
| 4,636,099 | A | 1/1987 | Goldston |
| 4,640,413 | A | 2/1987 | Kaplan |
| 4,644,144 | A | 2/1987 | Chandek |
| 4,722,444 | A | 2/1988 | Murphy et al. |
| 4,722,544 | A | 2/1988 | Weber |
| 4,727,435 | A | 2/1988 | Otani |
| 4,737,911 | A | 4/1988 | Freeman |
| 4,739,411 | A | 4/1988 | Bolton |
| 4,774,574 | A | 9/1988 | Daly et al. |
| 4,774,663 | A | 9/1988 | Musmanno |
| 4,790,475 | A | 12/1988 | Griffin |
| 4,806,780 | A | 2/1989 | Yamamoto |
| 4,837,693 | A | 6/1989 | Schotz |
| 4,890,228 | A | 12/1989 | Longfield |
| 4,896,363 | A | 1/1990 | Taylor et al. |
| 4,927,071 | A | 5/1990 | Wood |
| 4,934,587 | A | 6/1990 | McNabb |
| 4,960,981 | A | 10/1990 | Benton |
| 4,975,735 | A | 12/1990 | Bright |
| 5,022,683 | A | 6/1991 | Barbour |
| 5,077,805 | A | 12/1991 | Tan |
| 5,091,968 | A | 2/1992 | Higgins et al. |
| 5,122,950 | A | 6/1992 | Benton et al. |
| 5,134,564 | A | 7/1992 | Dunn et al. |
| 5,146,606 | A | 9/1992 | Grondalski |
| 5,157,620 | A | 10/1992 | Shaar |
| 5,159,548 | A | 10/1992 | Caslavka |
| 5,164,833 | A | 11/1992 | Aoki |
| 5,175,682 | A | 12/1992 | Higashiyama et al. |
| 5,187,750 | A | 2/1993 | Behera |
| 5,191,525 | A | 3/1993 | LeBrun |
| 5,193,121 | A | 3/1993 | Elischer et al. |
| 5,220,501 | A | 6/1993 | Lawlor |
| 5,227,863 | A | 7/1993 | Bilbrey et al. |
| 5,229,589 | A | 7/1993 | Schneider |
| 5,233,547 | A | 8/1993 | Kapp et al. |
| 5,237,158 | A | 8/1993 | Kern et al. |
| 5,237,159 | A | 8/1993 | Stephens |
| 5,237,620 | A | 8/1993 | Deaton et al. |
| 5,257,320 | A | 10/1993 | Etherington et al. |
| 5,265,008 | A | 11/1993 | Benton |
| 5,268,968 | A | 12/1993 | Yoshida |
| 5,321,816 | A | 6/1994 | Rogan |
| 5,345,090 | A | 9/1994 | Hludzinski |
| 5,347,302 | A | 9/1994 | Simonoff |
| 5,350,906 | A | 9/1994 | Brody |
| 5,373,550 | A | 12/1994 | Campbell |
| 5,383,113 | A | 1/1995 | Kight et al. |
| 5,419,588 | A | 5/1995 | Wood |
| 5,422,467 | A | 6/1995 | Graef |
| 5,444,616 | A | 8/1995 | Nair et al. |
| 5,444,794 | A | 8/1995 | Uhland, Sr. |
| 5,455,875 | A | 10/1995 | Chevion et al. |
| 5,475,403 | A | 12/1995 | Havlovick et al. |
| 5,504,538 | A | 4/1996 | Tsujihara |
| 5,504,677 | A | 4/1996 | Pollin |
| 5,528,387 | A | 6/1996 | Kelly et al. |
| 5,530,773 | A | 6/1996 | Thompson |
| 5,577,179 | A | 11/1996 | Blank |
| 5,583,759 | A | 12/1996 | Geer |
| 5,590,196 | A | 12/1996 | Moreau |
| 5,594,225 | A | 1/1997 | Botvin |
| 5,598,969 | A | 2/1997 | Ong |
| 5,602,936 | A | 2/1997 | Green |
| 5,610,726 | A | 3/1997 | Nonoshita |
| 5,611,028 | A | 3/1997 | Shibasaki |
| 5,630,073 | A | 5/1997 | Nolan |
| 5,631,984 | A | 5/1997 | Graf et al. |
| 5,668,897 | A | 9/1997 | Stolfo |
| 5,673,320 | A | 9/1997 | Ray et al. |
| 5,677,955 | A | 10/1997 | Doggett |
| 5,678,046 | A | 10/1997 | Cahill et al. |
| 5,679,938 | A | 10/1997 | Templeton |
| 5,680,611 | A | 10/1997 | Rail |
| 5,691,524 | A | 11/1997 | Josephson |
| 5,699,452 | A | 12/1997 | Vaidyanathan |
| 5,734,747 | A | 3/1998 | Vaidyanathan |
| 5,737,440 | A | 4/1998 | Kunkler |
| 5,748,780 | A | 5/1998 | Stolfo |
| 5,751,842 | A | 5/1998 | Riach |
| 5,761,686 | A | 6/1998 | Bloomberg |
| 5,784,503 | A | 7/1998 | Bleecker, III et al. |
| 5,830,609 | A | 11/1998 | Warner |
| 5,832,463 | A | 11/1998 | Funk |
| 5,838,814 | A | 11/1998 | Moore |
| 5,848,185 | A | 12/1998 | Koga et al. |
| 5,859,935 | A | 1/1999 | Johnson et al. |
| 5,863,075 | A | 1/1999 | Rich |
| 5,870,456 | A | 2/1999 | Rogers |
| 5,870,724 | A | 2/1999 | Lawlor |
| 5,870,725 | A | 2/1999 | Bellinger et al. |
| 5,878,337 | A | 3/1999 | Joao |
| 5,889,884 | A | 3/1999 | Hashimoto et al. |
| 5,890,141 | A | 3/1999 | Carney et al. |
| 5,893,101 | A | 4/1999 | Balogh et al. |
| 5,897,625 | A | 4/1999 | Gustin |
| 5,898,157 | A | 4/1999 | Mangili et al. |
| 5,901,253 | A | 5/1999 | Tretter |
| 5,903,878 | A | 5/1999 | Talati |
| 5,903,881 | A | 5/1999 | Schrader |
| 5,903,904 | A | 5/1999 | Peairs |
| 5,910,988 | A | 6/1999 | Ballard |
| 5,917,931 | A | 6/1999 | Kunkler |
| 5,924,737 | A | 7/1999 | Schrupp |
| 5,926,548 | A | 7/1999 | Okamoto |
| 5,930,501 | A | 7/1999 | Neil |
| 5,930,778 | A | 7/1999 | Geer |
| 5,937,396 | A | 8/1999 | Konya |
| 5,940,844 | A | 8/1999 | Cahill |
| 5,982,918 | A | 11/1999 | Mennie |
| 5,987,439 | A | 11/1999 | Gustin et al. |
| 6,005,623 | A | 12/1999 | Takahashi |
| 6,012,048 | A | 1/2000 | Gustin et al. |
| 6,014,454 | A | 1/2000 | Kunkler |
| 6,021,202 | A | 2/2000 | Anderson |
| 6,021,397 | A | 2/2000 | Jones |
| 6,023,705 | A | 2/2000 | Bellinger et al. |
| 6,029,887 | A | 2/2000 | Furuhashi |

(56) References Cited

U.S. PATENT DOCUMENTS

| | | | |
|---|---|---|---|
| 6,030,000 | A | 2/2000 | Diamond |
| 6,032,137 | A | 2/2000 | Ballard |
| 6,038,553 | A | 3/2000 | Hyde |
| 6,044,883 | A | 4/2000 | Noyes |
| 6,053,405 | A | 4/2000 | Irwin, Jr. et al. |
| 6,059,185 | A | 5/2000 | Funk et al. |
| 6,064,753 | A | 5/2000 | Bolle et al. |
| 6,064,762 | A | 5/2000 | Haenel |
| 6,072,941 | A | 6/2000 | Suzuki et al. |
| 6,073,119 | A | 6/2000 | Borenmisza-wahr |
| 6,073,121 | A | 6/2000 | Ramzy |
| 6,085,168 | A | 7/2000 | Mori |
| 6,086,708 | A | 7/2000 | Colgate |
| 6,089,450 | A | 7/2000 | Koeple |
| 6,089,610 | A | 7/2000 | Greene |
| 6,092,047 | A | 7/2000 | Hyman et al. |
| 6,097,834 | A | 8/2000 | Krouse |
| 6,097,845 | A | 8/2000 | Ng et al. |
| 6,097,885 | A | 8/2000 | Rayner |
| 6,105,865 | A | 8/2000 | Hardesty |
| 6,128,603 | A | 10/2000 | Dent et al. |
| 6,141,339 | A | 10/2000 | Kaplan et al. |
| 6,145,738 | A | 11/2000 | Stinson et al. |
| 6,148,102 | A | 11/2000 | Stolin |
| 6,149,056 | A | 11/2000 | Stinson et al. |
| 6,151,409 | A | 11/2000 | Chen et al. |
| 6,151,423 | A | 11/2000 | Melen |
| 6,151,426 | A | 11/2000 | Lee |
| 6,159,585 | A | 12/2000 | Rittenhouse |
| 6,170,744 | B1 | 1/2001 | Lee |
| 6,178,270 | B1 | 1/2001 | Taylor et al. |
| 6,178,409 | B1 | 1/2001 | Weber et al. |
| 6,181,837 | B1 | 1/2001 | Cahill et al. |
| 6,188,506 | B1 | 2/2001 | Kaiserman |
| 6,189,785 | B1 | 2/2001 | Lowery |
| 6,192,165 | B1 | 2/2001 | Irons |
| 6,195,452 | B1 | 2/2001 | Royer |
| 6,195,694 | B1 | 2/2001 | Chen et al. |
| 6,199,055 | B1 | 3/2001 | Kara |
| 6,236,009 | B1 | 5/2001 | Emigh et al. |
| 6,243,689 | B1 | 6/2001 | Norton |
| 6,278,983 | B1 | 8/2001 | Ball |
| 6,282,523 | B1 | 8/2001 | Tedesco et al. |
| 6,282,826 | B1 | 9/2001 | Richards |
| 6,293,469 | B1 | 9/2001 | Masson et al. |
| 6,310,647 | B1 | 10/2001 | Parulski et al. |
| 6,314,452 | B1 | 11/2001 | Dekel |
| 6,315,195 | B1 | 11/2001 | Ramachandran |
| 6,317,727 | B1 | 11/2001 | May |
| 6,328,207 | B1 | 12/2001 | Gregoire et al. |
| 6,330,546 | B1 | 12/2001 | Gopinathan et al. |
| 6,339,658 | B1 | 1/2002 | Moccagatta |
| 6,339,766 | B1 | 1/2002 | Gephart |
| 6,351,553 | B1 | 2/2002 | Hayosh |
| 6,351,735 | B1 | 2/2002 | Deaton et al. |
| 6,354,490 | B1 | 3/2002 | Weiss et al. |
| 6,363,162 | B1 | 3/2002 | Moed et al. |
| 6,363,164 | B1 | 3/2002 | Jones et al. |
| 6,390,362 | B1 | 5/2002 | Martin |
| 6,397,196 | B1 | 5/2002 | Kravetz |
| 6,408,084 | B1 | 6/2002 | Foley |
| 6,411,725 | B1 | 6/2002 | Rhoads |
| 6,411,737 | B2 | 6/2002 | Wesolkowski et al. |
| 6,411,938 | B1 | 6/2002 | Gates et al. |
| 6,413,305 | B1 | 7/2002 | Mehta |
| 6,417,869 | B1 | 7/2002 | Do |
| 6,425,017 | B1 | 7/2002 | Dievendorff |
| 6,429,952 | B1 | 8/2002 | Olbricht |
| 6,439,454 | B1 | 8/2002 | Masson et al. |
| 6,449,397 | B1 | 9/2002 | Che-Chu |
| 6,450,403 | B1 | 9/2002 | Martens et al. |
| 6,463,220 | B1 | 10/2002 | Dance et al. |
| 6,464,134 | B1 | 10/2002 | Page |
| 6,469,745 | B1 | 10/2002 | Yamada et al. |
| 6,470,325 | B1 | 10/2002 | Leemhuis |
| 6,473,519 | B1 | 10/2002 | Pidhirny et al. |
| 6,502,747 | B1 | 1/2003 | Stoutenburg et al. |
| 6,505,178 | B1 | 1/2003 | Flenley |
| 6,546,119 | B2 | 4/2003 | Ciolli et al. |
| 6,574,377 | B1 | 6/2003 | Cahill et al. |
| 6,574,609 | B1 | 6/2003 | Downs |
| 6,578,760 | B1 | 6/2003 | Otto |
| 6,587,837 | B1 | 7/2003 | Spagna |
| 6,606,117 | B1 | 8/2003 | Windle |
| 6,609,200 | B2 | 8/2003 | Anderson |
| 6,611,598 | B1 | 8/2003 | Hayosh |
| 6,614,930 | B1 | 9/2003 | Agnihotri et al. |
| 6,643,416 | B1 | 11/2003 | Daniels |
| 6,647,136 | B2 | 11/2003 | Jones et al. |
| 6,654,487 | B1 | 11/2003 | Downs, Jr. |
| 6,661,910 | B2 | 12/2003 | Jones et al. |
| 6,668,372 | B1 | 12/2003 | Wu |
| 6,669,086 | B2 | 12/2003 | Abdi et al. |
| 6,672,452 | B1 | 1/2004 | Alves |
| 6,682,452 | B2 | 1/2004 | Quintus |
| 6,695,204 | B1 | 2/2004 | Stinson |
| 6,697,091 | B1 | 2/2004 | Rzepkowski et al. |
| 6,711,474 | B1 | 3/2004 | Treyz et al. |
| 6,726,097 | B2 | 4/2004 | Graef |
| 6,728,397 | B2 | 4/2004 | McNeal |
| 6,738,496 | B1 | 5/2004 | Van Hall |
| 6,742,128 | B1 | 5/2004 | Joiner |
| 6,745,186 | B1 | 6/2004 | Testa et al. |
| 6,754,640 | B2 | 6/2004 | Bozeman |
| 6,755,340 | B1 | 6/2004 | Voss et al. |
| 6,760,414 | B1 | 7/2004 | Schurko et al. |
| 6,760,470 | B1 | 7/2004 | Bogosian et al. |
| 6,763,226 | B1 | 7/2004 | McZeal |
| 6,781,962 | B1 | 8/2004 | Williams |
| 6,786,398 | B1 | 9/2004 | Stinson et al. |
| 6,789,054 | B1 | 9/2004 | Makhlouf |
| 6,796,489 | B2 | 9/2004 | Slater et al. |
| 6,796,491 | B2 | 9/2004 | Nakajima |
| 6,806,903 | B1 | 10/2004 | Okisu et al. |
| 6,807,294 | B2 | 10/2004 | Yamazaki |
| 6,813,733 | B1 | 11/2004 | Li |
| 6,829,704 | B2 | 12/2004 | Zhang |
| 6,844,885 | B2 | 1/2005 | Anderson |
| 6,856,965 | B1 | 2/2005 | Stinson |
| 6,863,214 | B2 | 3/2005 | Garner et al. |
| 6,870,947 | B2 | 3/2005 | Kelland |
| 6,873,728 | B2 | 3/2005 | Bernstein et al. |
| 6,883,140 | B1 | 4/2005 | Acker |
| 6,898,314 | B2 | 5/2005 | Kung et al. |
| 6,902,105 | B2 | 6/2005 | Koakutsu |
| 6,910,023 | B1 | 6/2005 | Schibi |
| 6,913,188 | B2 | 7/2005 | Wong |
| 6,922,487 | B2 | 7/2005 | Dance et al. |
| 6,930,718 | B2 | 8/2005 | Parulski et al. |
| 6,931,255 | B2 | 8/2005 | Mekuria |
| 6,931,591 | B1 | 8/2005 | Brown |
| 6,934,719 | B2 | 8/2005 | Nally |
| 6,947,610 | B2 | 9/2005 | Sun |
| 6,957,770 | B1 | 10/2005 | Robinson |
| 6,961,689 | B1 | 11/2005 | Greenberg |
| 6,970,843 | B1 | 11/2005 | Forte |
| 6,973,589 | B2 | 12/2005 | Wright |
| 6,983,886 | B2 | 1/2006 | Natsukari et al. |
| 6,993,507 | B2 | 1/2006 | Meyer |
| 6,996,263 | B2 | 2/2006 | Jones et al. |
| 6,999,943 | B1 | 2/2006 | Johnson |
| 7,003,040 | B2 | 2/2006 | Yi |
| 7,004,382 | B2 | 2/2006 | Sandru |
| 7,010,155 | B2 | 3/2006 | Koakutsu et al. |
| 7,010,507 | B1 | 3/2006 | Anderson |
| 7,016,704 | B2 | 3/2006 | Pallakoff |
| 7,027,171 | B1 | 4/2006 | Watanabe |
| 7,028,886 | B1 | 4/2006 | Maloney |
| 7,039,048 | B1 | 5/2006 | Monta |
| 7,046,991 | B2 | 5/2006 | Little |
| 7,051,001 | B1 | 5/2006 | Slater |
| 7,058,036 | B1 | 6/2006 | Yu |
| 7,062,099 | B2 | 6/2006 | Li et al. |
| 7,062,456 | B1 | 6/2006 | Riehl et al. |

(56) References Cited

U.S. PATENT DOCUMENTS

| | | |
|---|---|---|
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,116,446 B2 | 10/2006 | Maurer |
| 7,117,171 B1 | 10/2006 | Pollin |
| 7,120,461 B2 | 10/2006 | Cho |
| 7,131,571 B2 | 11/2006 | Swift et al. |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan et al. |
| 7,184,980 B2 | 2/2007 | Allen-Rouman et al. |
| 7,185,805 B1 | 3/2007 | McShirley |
| 7,197,173 B2 | 3/2007 | Jones et al. |
| 7,200,255 B2 | 4/2007 | Jones |
| 7,204,412 B2 | 4/2007 | Foss, Jr. |
| 7,207,478 B1 | 4/2007 | Blackson et al. |
| 7,216,106 B1 | 5/2007 | Buchanan |
| 7,219,082 B2 | 5/2007 | Forte |
| 7,219,831 B2 | 5/2007 | Murata |
| 7,240,336 B1 | 7/2007 | Baker |
| 7,245,765 B2 | 7/2007 | Myers et al. |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,277,191 B2 | 10/2007 | Metcalfe et al. |
| 7,290,034 B2 | 10/2007 | Budd |
| 7,296,734 B2 | 11/2007 | Pliha |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,331,523 B2 | 2/2008 | Meier et al. |
| 7,336,813 B2 | 2/2008 | Prakash et al. |
| 7,343,320 B1 | 3/2008 | Treyz |
| 7,349,566 B2 | 3/2008 | Jones et al. |
| 7,349,585 B2 | 3/2008 | Li |
| 7,350,697 B2 | 4/2008 | Swift et al. |
| 7,356,505 B2 | 4/2008 | March |
| 7,369,713 B2 | 5/2008 | Suino |
| 7,377,425 B1 | 5/2008 | Ma |
| 7,379,978 B2 | 5/2008 | Anderson |
| 7,383,227 B2 | 6/2008 | Weinflash et al. |
| 7,385,631 B2 | 6/2008 | Maeno |
| 7,386,511 B2 | 6/2008 | Buchanan |
| 7,388,683 B2 | 6/2008 | Rodriguez et al. |
| 7,389,912 B2 | 6/2008 | Starrs |
| 7,391,897 B2 | 6/2008 | Jones et al. |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,419,093 B1 | 9/2008 | Blackson et al. |
| 7,421,107 B2 | 9/2008 | Lugg |
| 7,421,410 B2 | 9/2008 | Schechtman et al. |
| 7,427,016 B2 | 9/2008 | Chimento |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,460,700 B2 | 12/2008 | Tsunachima et al. |
| 7,461,779 B2 | 12/2008 | Ramachandran |
| 7,461,780 B2 | 12/2008 | Potts |
| 7,464,859 B1 | 12/2008 | Hawkins |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Statou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve et al. |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,577,614 B1 | 8/2009 | Warren et al. |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,609,889 B2 | 10/2009 | Guo et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,647,897 B2 | 1/2010 | Jones |
| 7,668,363 B2 | 2/2010 | Price |
| 7,672,022 B1 | 3/2010 | Fan |
| 7,672,940 B2 | 3/2010 | Viola |
| 7,676,409 B1 | 3/2010 | Ahmad |
| 7,680,732 B1 | 3/2010 | Davies et al. |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,714,778 B2 | 5/2010 | Dupray |
| 7,720,735 B2 | 5/2010 | Anderson et al. |
| 7,734,545 B1 | 6/2010 | Fogliano |
| 7,743,979 B2 | 6/2010 | Fredman |
| 7,753,268 B1 | 7/2010 | Robinson et al. |
| 7,761,358 B2 | 7/2010 | Craig et al. |
| 7,766,223 B1 | 8/2010 | Mello |
| 7,766,244 B1 | 8/2010 | Field |
| 7,769,650 B2 | 8/2010 | Bleunven |
| 7,778,457 B2 | 8/2010 | Nepomniachtchi et al. |
| 7,792,752 B1 | 9/2010 | Kay |
| 7,792,753 B1 | 9/2010 | Slater et al. |
| 7,793,833 B2 | 9/2010 | Yoon et al. |
| 7,810,714 B2 | 10/2010 | Murata |
| 7,812,986 B2 | 10/2010 | Graham et al. |
| 7,818,245 B2 | 10/2010 | Prakash et al. |
| 7,831,458 B2 | 11/2010 | Neumann |
| 7,856,402 B1 | 12/2010 | Kay |
| 7,865,384 B2 | 1/2011 | Anderson et al. |
| 7,865,425 B2 | 1/2011 | Waelbroeck |
| 7,873,200 B1 | 1/2011 | Oakes, III et al. |

(56) References Cited

U.S. PATENT DOCUMENTS

| | | |
|---|---|---|
| 7,873,556 B1 | 1/2011 | Dolan |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,895,054 B2 | 2/2011 | Slen et al. |
| 7,896,232 B1 | 3/2011 | Prasad et al. |
| 7,900,822 B1 | 3/2011 | Prasad et al. |
| 7,903,863 B2 | 3/2011 | Jones et al. |
| 7,904,386 B2 | 3/2011 | Kalra et al. |
| 7,912,785 B1 | 3/2011 | Kay |
| 7,935,441 B2 | 5/2011 | Tononishi |
| 7,949,587 B1 | 5/2011 | Morris et al. |
| 7,950,698 B2 | 5/2011 | Popadic et al. |
| 7,953,441 B2 | 5/2011 | Lors |
| 7,958,053 B2 | 6/2011 | Stone |
| 7,962,411 B1 | 6/2011 | Prasad et al. |
| 7,970,677 B1 | 6/2011 | Oakes, III et al. |
| 7,974,869 B1 | 7/2011 | Sharma |
| 7,974,899 B1 | 7/2011 | Prasad et al. |
| 7,978,900 B2 | 7/2011 | Nepomniachtchi et al. |
| 7,979,326 B2 | 7/2011 | Kurushima |
| 7,987,231 B2 | 7/2011 | Karkanias |
| 7,996,312 B1 | 8/2011 | Beck et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,000,514 B2 | 8/2011 | Nepomniachtchi et al. |
| 8,001,051 B1 | 8/2011 | Smith et al. |
| 8,009,931 B2 | 8/2011 | Li |
| 8,045,784 B2 | 10/2011 | Price et al. |
| 8,046,301 B1 | 10/2011 | Smith et al. |
| 8,060,442 B1 | 11/2011 | Hecht et al. |
| 8,064,729 B2 | 11/2011 | Li |
| 8,065,307 B2 | 11/2011 | Haslam et al. |
| 8,091,778 B1 | 1/2012 | Block et al. |
| 8,116,533 B2 | 2/2012 | Kiplinger et al. |
| 8,118,654 B1 | 2/2012 | Nicolas |
| 8,131,636 B1 | 3/2012 | Viera et al. |
| 8,159,520 B1 | 4/2012 | Dhanoa |
| 8,203,640 B2 | 6/2012 | Kim et al. |
| 8,204,293 B2 | 6/2012 | Csulits et al. |
| 8,235,284 B1 | 8/2012 | Prasad et al. |
| 8,266,076 B2 | 9/2012 | Lopez et al. |
| 8,271,385 B2 | 9/2012 | Emerson et al. |
| 8,290,237 B1 | 10/2012 | Burks et al. |
| 8,313,020 B2 | 11/2012 | Ramachandran |
| 8,320,657 B1 | 11/2012 | Burks et al. |
| 8,332,329 B1 | 12/2012 | Thiele |
| 8,341,077 B1 | 12/2012 | Nichols et al. |
| 8,351,677 B1 | 1/2013 | Oakes, III et al. |
| 8,351,678 B1 | 1/2013 | Medina, III |
| 8,358,826 B1 | 1/2013 | Medina et al. |
| 8,364,563 B2 | 1/2013 | Choiniere, Sr. |
| 8,369,650 B2 | 2/2013 | Zanfir et al. |
| 8,374,963 B1 | 2/2013 | Billman |
| 8,391,599 B1 | 3/2013 | Medina, III |
| 8,392,332 B1 | 3/2013 | Oakes, III et al. |
| 8,396,623 B2 | 3/2013 | Maeda et al. |
| 8,401,962 B1 | 3/2013 | Bent et al. |
| 8,422,758 B1 | 4/2013 | Bueche, Jr. |
| 8,433,127 B1 | 4/2013 | Harpel et al. |
| 8,433,647 B1 | 4/2013 | Yarbrough |
| 8,452,689 B1 | 5/2013 | Medina, III |
| RE44,274 E | 6/2013 | Popadic et al. |
| 8,464,933 B1 | 6/2013 | Prasad et al. |
| 8,483,473 B2 | 7/2013 | Roach |
| 8,531,518 B1 | 9/2013 | Zomet |
| 8,538,124 B1 | 9/2013 | Harpel et al. |
| 8,542,921 B1 | 9/2013 | Medina |
| 8,548,267 B1 | 10/2013 | Yacoub et al. |
| 8,559,766 B2 | 10/2013 | Tilt et al. |
| 8,582,862 B2 | 11/2013 | Nepomniachtchi et al. |
| 8,611,635 B1 | 12/2013 | Medina, III |
| 8,660,952 B1 | 2/2014 | Viera et al. |
| 8,699,779 B1 | 4/2014 | Prasad et al. |
| 8,708,227 B1 | 4/2014 | Oakes, III et al. |
| 8,731,321 B2 | 5/2014 | Fujiwara et al. |
| 8,732,081 B1 | 5/2014 | Oakes, III et al. |
| 8,751,345 B1 | 6/2014 | Borzych et al. |
| 8,751,356 B1 | 6/2014 | Garcia |
| 8,751,379 B1 | 6/2014 | Bueche, Jr. |
| 8,768,836 B1 | 7/2014 | Acharya |
| 8,799,147 B1 | 8/2014 | Walls et al. |
| 8,818,033 B1 | 8/2014 | Liu |
| 8,824,772 B2 | 9/2014 | Viera |
| 8,837,806 B1 | 9/2014 | Ethington et al. |
| 8,843,405 B1 | 9/2014 | Hartman et al. |
| 8,929,640 B1 | 1/2015 | Mennie et al. |
| 8,959,033 B1 | 2/2015 | Oakes, III et al. |
| 8,977,571 B1 | 3/2015 | Bueche, Jr. et al. |
| 8,990,862 B1 | 3/2015 | Smith |
| 9,009,071 B1 | 4/2015 | Watson et al. |
| 9,036,040 B1 | 5/2015 | Danko |
| 9,058,512 B1 | 6/2015 | Medina, III |
| 9,064,284 B1 | 6/2015 | Janiszeski et al. |
| 9,129,340 B1 | 8/2015 | Medina, III et al. |
| 9,159,101 B1 | 10/2015 | Pollack et al. |
| 9,177,197 B1 | 11/2015 | Prasad et al. |
| 9,177,198 B1 | 11/2015 | Prasad et al. |
| 9,195,986 B2 | 11/2015 | Christy et al. |
| 9,224,136 B1 | 12/2015 | Oakes, III et al. |
| 9,235,860 B1 | 1/2016 | Boucher et al. |
| 9,270,804 B2 | 2/2016 | Dees et al. |
| 9,286,514 B1 | 3/2016 | Newman |
| 9,311,634 B1 | 4/2016 | Hildebrand |
| 9,336,517 B1 | 5/2016 | Prasad et al. |
| 9,384,409 B1 | 7/2016 | Ming |
| 9,387,813 B1 | 7/2016 | Moeller et al. |
| 9,390,339 B1 | 7/2016 | Danko |
| 9,401,011 B2 | 7/2016 | Medina, III et al. |
| 9,424,569 B1 | 8/2016 | Sherman et al. |
| 9,524,269 B1 | 12/2016 | Brinkmann et al. |
| 9,569,756 B1 | 2/2017 | Bueche, Jr. et al. |
| 9,613,467 B2 | 4/2017 | Roberts et al. |
| 9,613,469 B2 | 4/2017 | Fish et al. |
| 9,619,872 B1 | 4/2017 | Medina, III et al. |
| 9,626,183 B1 | 4/2017 | Smith et al. |
| 9,626,662 B1 | 4/2017 | Prasad et al. |
| 9,779,392 B1 | 10/2017 | Prasad et al. |
| 9,779,452 B1 | 10/2017 | Medina et al. |
| 9,785,929 B1 | 10/2017 | Watson et al. |
| 9,792,654 B1 | 10/2017 | Limas et al. |
| 9,818,090 B1 | 11/2017 | Bueche, Jr. et al. |
| 9,824,453 B1 | 11/2017 | Collins et al. |
| 9,886,642 B1 | 2/2018 | Danko |
| 9,892,454 B1 | 2/2018 | Pollack et al. |
| 9,898,778 B1 | 2/2018 | Pollack et al. |
| 9,898,808 B1 | 2/2018 | Medina, III et al. |
| 9,904,848 B1 | 2/2018 | Newman |
| 9,946,923 B1 | 4/2018 | Medina |
| 10,013,605 B1 | 7/2018 | Oakes, III et al. |
| 10,013,681 B1 | 7/2018 | Oakes, III et al. |
| 10,157,326 B2 | 12/2018 | Long et al. |
| 10,181,087 B1 | 1/2019 | Danko |
| 10,210,767 B2 | 2/2019 | Johansen |
| 10,217,375 B2 | 2/2019 | Waldron |
| 10,235,660 B1 | 3/2019 | Bueche, Jr. et al. |
| 10,325,420 B1 | 6/2019 | Moon |
| 10,354,235 B1 | 7/2019 | Medina |
| 10,360,448 B1 | 7/2019 | Newman |
| 10,373,136 B1 | 8/2019 | Pollack et al. |
| 10,380,559 B1 | 8/2019 | Oakes, III et al. |
| 10,380,562 B1 | 8/2019 | Prasad et al. |
| 10,380,565 B1 | 8/2019 | Prasad |
| 10,380,683 B1 | 8/2019 | Voutour et al. |
| 10,380,993 B1 | 8/2019 | Clauer Salyers |
| 10,402,638 B1 | 9/2019 | Oaks, III et al. |
| 10,402,790 B1 | 9/2019 | Clark et al. |
| 10,402,944 B1 | 9/2019 | Pribble et al. |
| 10,460,295 B1 | 10/2019 | Oakes, III et al. |
| 10,482,432 B1 | 11/2019 | Oakes, III et al. |
| 10,574,879 B1 | 2/2020 | Prasad et al. |
| 10,621,559 B1 | 4/2020 | Oakes, III et al. |

(56) References Cited

U.S. PATENT DOCUMENTS

| | | |
|---|---|---|
| 10,621,660 B1 | 4/2020 | Medina et al. |
| 10,713,629 B1 | 7/2020 | Medina, III |
| 10,719,815 B1 | 7/2020 | Oakes, III et al. |
| 10,769,598 B1 | 9/2020 | Oakes, III et al. |
| 10,818,282 B1 | 10/2020 | Clauer Salyers |
| 10,956,879 B1 | 3/2021 | Eidson |
| 11,030,752 B1 | 6/2021 | Backlund |
| 11,042,940 B1 | 6/2021 | Limas |
| 11,042,941 B1 | 6/2021 | Limas |
| 11,062,131 B1 | 7/2021 | Medina, III |
| 11,062,283 B1 | 7/2021 | Prasad |
| 11,064,111 B1 | 7/2021 | Prasad |
| 11,068,976 B1 | 7/2021 | Voutour |
| 11,070,868 B1 | 7/2021 | Mortensen |
| 11,121,989 B1 | 9/2021 | Castinado |
| 11,182,753 B1 | 11/2021 | Oakes, III et al. |
| 11,222,315 B1 | 1/2022 | Prasad et al. |
| 11,232,517 B1 | 1/2022 | Medina et al. |
| 11,250,398 B1 | 2/2022 | Prasad et al. |
| 11,288,898 B1 | 3/2022 | Moon |
| 11,328,267 B1 | 5/2022 | Medina, III |
| 2001/0004235 A1 | 6/2001 | Maloney |
| 2001/0014881 A1 | 8/2001 | Drummond |
| 2001/0016084 A1 | 8/2001 | Pollard et al. |
| 2001/0018739 A1 | 8/2001 | Anderson |
| 2001/0020949 A1 | 9/2001 | Gong et al. |
| 2001/0027994 A1 | 10/2001 | Hayashida |
| 2001/0030695 A1 | 10/2001 | Prabhu et al. |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski et al. |
| 2001/0047330 A1 | 11/2001 | Gephart |
| 2001/0051965 A1 | 12/2001 | Guillevic |
| 2001/0054020 A1 | 12/2001 | Barth et al. |
| 2002/0001393 A1 | 1/2002 | Jones |
| 2002/0013767 A1 | 1/2002 | Katz |
| 2002/0016763 A1 | 2/2002 | March |
| 2002/0016769 A1 | 2/2002 | Barbara et al. |
| 2002/0023055 A1 | 2/2002 | Antognini et al. |
| 2002/0025085 A1 | 2/2002 | Gustafson et al. |
| 2002/0026418 A1 | 2/2002 | Koppel et al. |
| 2002/0032656 A1 | 3/2002 | Chen |
| 2002/0038289 A1 | 3/2002 | Lawlor et al. |
| 2002/0040340 A1 | 4/2002 | Yoshida |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075380 A1 | 6/2002 | Seeger et al. |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107767 A1 | 8/2002 | McClair et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0120582 A1 | 8/2002 | Elston et al. |
| 2002/0120846 A1 | 8/2002 | Stewart et al. |
| 2002/0129249 A1 | 9/2002 | Maillard et al. |
| 2002/0130868 A1 | 9/2002 | Smith |
| 2002/0133409 A1 | 9/2002 | Sawano et al. |
| 2002/0138445 A1 | 9/2002 | Laage et al. |
| 2002/0138522 A1 | 9/2002 | Muralidhar |
| 2002/0145035 A1 | 10/2002 | Jones |
| 2002/0147798 A1 | 10/2002 | Huang |
| 2002/0150279 A1 | 10/2002 | Scott |
| 2002/0150311 A1 | 10/2002 | Lynn |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta |
| 2002/0152170 A1 | 10/2002 | Dutta |
| 2002/0153414 A1 | 10/2002 | Stoutenburg et al. |
| 2002/0154127 A1 | 10/2002 | Vienneau et al. |
| 2002/0154815 A1 | 10/2002 | Mizutani |
| 2002/0159648 A1 | 10/2002 | Alderson et al. |
| 2002/0169715 A1 | 11/2002 | Ruth et al. |
| 2002/0171820 A1 | 11/2002 | Okamura |
| 2002/0172516 A1 | 11/2002 | Aoyama |
| 2002/0178112 A1 | 11/2002 | Goeller |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0009420 A1 | 1/2003 | Jones |
| 2003/0015583 A1 | 1/2003 | Abdi et al. |
| 2003/0018897 A1 | 1/2003 | Bellis, Jr. et al. |
| 2003/0023557 A1 | 1/2003 | Moore |
| 2003/0026609 A1 | 2/2003 | Parulski |
| 2003/0038227 A1 | 2/2003 | Sesek |
| 2003/0046223 A1 | 3/2003 | Crawford |
| 2003/0050889 A1 | 3/2003 | Burke |
| 2003/0051138 A1 | 3/2003 | Maeda et al. |
| 2003/0053692 A1 | 3/2003 | Hong et al. |
| 2003/0055756 A1 | 3/2003 | Allan |
| 2003/0055776 A1 | 3/2003 | Samuelson |
| 2003/0072568 A1 | 4/2003 | Lin et al. |
| 2003/0074315 A1 | 4/2003 | Lam |
| 2003/0075596 A1 | 4/2003 | Koakutsu |
| 2003/0075916 A1 | 4/2003 | Gorski |
| 2003/0078883 A1 | 4/2003 | Stewart et al. |
| 2003/0081121 A1 | 5/2003 | Swan |
| 2003/0081824 A1 | 5/2003 | Mennie |
| 2003/0086615 A1 | 5/2003 | Dance et al. |
| 2003/0093367 A1 | 5/2003 | Allen-Rouman et al. |
| 2003/0093369 A1 | 5/2003 | Ijichi et al. |
| 2003/0097592 A1 | 5/2003 | Adusumilli |
| 2003/0102714 A1 | 6/2003 | Rhodes et al. |
| 2003/0105688 A1 | 6/2003 | Brown et al. |
| 2003/0105714 A1 | 6/2003 | Alarcon-Luther et al. |
| 2003/0119478 A1 | 6/2003 | Nagy et al. |
| 2003/0126078 A1 | 7/2003 | Vihinen |
| 2003/0126082 A1 | 7/2003 | Omura et al. |
| 2003/0130940 A1 | 7/2003 | Hansen et al. |
| 2003/0130958 A1 | 7/2003 | Narayanan et al. |
| 2003/0132384 A1 | 7/2003 | Sugiyama et al. |
| 2003/0133608 A1 | 7/2003 | Bernstein et al. |
| 2003/0133610 A1 | 7/2003 | Nagarajan et al. |
| 2003/0135457 A1 | 7/2003 | Stewart et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0177448 A1 | 9/2003 | Levine et al. |
| 2003/0187790 A1 | 10/2003 | Swift et al. |
| 2003/0191615 A1 | 10/2003 | Bailey |
| 2003/0191869 A1 | 10/2003 | Williams |
| 2003/0200107 A1 | 10/2003 | Allen et al. |
| 2003/0200174 A1 | 10/2003 | Star |
| 2003/0202690 A1 | 10/2003 | Jones et al. |
| 2003/0212904 A1 | 11/2003 | Randle et al. |
| 2003/0213841 A1 | 11/2003 | Josephson et al. |
| 2003/0217005 A1 | 11/2003 | Drummond et al. |
| 2003/0218061 A1 | 11/2003 | Filatov |
| 2003/0225705 A1 | 12/2003 | Park et al. |
| 2003/0231285 A1 | 12/2003 | Ferguson |
| 2003/0233278 A1 | 12/2003 | Marshall |
| 2003/0233318 A1 | 12/2003 | King et al. |
| 2004/0010466 A1 | 1/2004 | Anderson |
| 2004/0010803 A1 | 1/2004 | Berstis |
| 2004/0012496 A1 | 1/2004 | De Souza |
| 2004/0013284 A1 | 1/2004 | Yu |
| 2004/0017482 A1 | 1/2004 | Weitman |
| 2004/0024626 A1 | 2/2004 | Bruijning |
| 2004/0024708 A1 | 2/2004 | Masuda |
| 2004/0029591 A1 | 2/2004 | Chapman et al. |
| 2004/0030741 A1 | 2/2004 | Wolton et al. |
| 2004/0044606 A1 | 3/2004 | Buttridge et al. |
| 2004/0057697 A1 | 3/2004 | Renzi |
| 2004/0058705 A1 | 3/2004 | Morgan |
| 2004/0061913 A1 | 4/2004 | Takiguchi |

(56) References Cited

U.S. PATENT DOCUMENTS

| | | |
|---|---|---|
| 2004/0066031 A1 | 4/2004 | Wong |
| 2004/0066419 A1 | 4/2004 | Pyhalammi |
| 2004/0069841 A1 | 4/2004 | Wong |
| 2004/0071333 A1 | 4/2004 | Douglas et al. |
| 2004/0075754 A1 | 4/2004 | Nakajima et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0111371 A1 | 6/2004 | Friedman |
| 2004/0117302 A1 | 6/2004 | Weichert |
| 2004/0122754 A1 | 6/2004 | Stevens |
| 2004/0133511 A1 | 7/2004 | Smith et al. |
| 2004/0133516 A1 | 7/2004 | Buchanan et al. |
| 2004/0136586 A1 | 7/2004 | Okamura |
| 2004/0138974 A1 | 7/2004 | Shimamura |
| 2004/0148235 A1 | 7/2004 | Craig et al. |
| 2004/0158549 A1 | 8/2004 | Matena |
| 2004/0165096 A1 | 8/2004 | Maeno |
| 2004/0170259 A1 | 9/2004 | Park |
| 2004/0171371 A1 | 9/2004 | Paul |
| 2004/0184766 A1 | 9/2004 | Kim et al. |
| 2004/0193878 A1 | 9/2004 | Dillinger et al. |
| 2004/0201695 A1 | 10/2004 | Inasaka |
| 2004/0201741 A1 | 10/2004 | Ban |
| 2004/0202349 A1 | 10/2004 | Erol et al. |
| 2004/0205459 A1 | 10/2004 | Green |
| 2004/0210515 A1 | 10/2004 | Hughes |
| 2004/0210523 A1 | 10/2004 | Gains et al. |
| 2004/0217170 A1 | 11/2004 | Takiguchi et al. |
| 2004/0225604 A1 | 11/2004 | Foss, Jr. et al. |
| 2004/0228277 A1 | 11/2004 | Williams |
| 2004/0236647 A1 | 11/2004 | Acharya |
| 2004/0236688 A1 | 11/2004 | Bozeman |
| 2004/0238619 A1 | 12/2004 | Nagasaka et al. |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267665 A1 | 12/2004 | Nam et al. |
| 2004/0267666 A1 | 12/2004 | Minami |
| 2005/0001421 A1 | 1/2005 | Luth et al. |
| 2005/0001924 A1 | 1/2005 | Honda |
| 2005/0010108 A1 | 1/2005 | Rahn et al. |
| 2005/0015332 A1 | 1/2005 | Chen |
| 2005/0015341 A1 | 1/2005 | Jackson |
| 2005/0015342 A1 | 1/2005 | Murata et al. |
| 2005/0021466 A1 | 1/2005 | Buchanan et al. |
| 2005/0030388 A1 | 2/2005 | Stavely et al. |
| 2005/0033645 A1 | 2/2005 | Duphily |
| 2005/0033685 A1 | 2/2005 | Reyes |
| 2005/0033690 A1 | 2/2005 | Antognini et al. |
| 2005/0033695 A1 | 2/2005 | Minowa |
| 2005/0034046 A1 | 2/2005 | Berkmann |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0077351 A1 | 4/2005 | De Jong |
| 2005/0078192 A1 | 4/2005 | Sakurai |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0089209 A1 | 4/2005 | Stefanuk |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1 | 5/2005 | Singfield |
| 2005/0097050 A1 | 5/2005 | Orcutt |
| 2005/0100216 A1 | 5/2005 | Myers et al. |
| 2005/0102208 A1 | 5/2005 | Gudgeon |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0128333 A1 | 6/2005 | Park |
| 2005/0131820 A1 | 6/2005 | Rodriguez |
| 2005/0133586 A1 | 6/2005 | Rekeweg et al. |
| 2005/0143136 A1 | 6/2005 | Lev et al. |
| 2005/0144131 A1 | 6/2005 | Aziz |
| 2005/0149436 A1 | 7/2005 | Elterich |
| 2005/0157174 A1 | 7/2005 | Kitamura et al. |
| 2005/0165641 A1 | 7/2005 | Chu |
| 2005/0168566 A1 | 8/2005 | Tada |
| 2005/0171899 A1 | 8/2005 | Dunn |
| 2005/0171907 A1 | 8/2005 | Lewis |
| 2005/0177494 A1 | 8/2005 | Kelly et al. |
| 2005/0177499 A1 | 8/2005 | Thomas |
| 2005/0177510 A1 | 8/2005 | Hilt et al. |
| 2005/0177518 A1 | 8/2005 | Brown |
| 2005/0182710 A1 | 8/2005 | Anderson |
| 2005/0188306 A1 | 8/2005 | Mackenzie |
| 2005/0198364 A1 | 9/2005 | del Val et al. |
| 2005/0203430 A1 | 9/2005 | Williams et al. |
| 2005/0205660 A1 | 9/2005 | Munte |
| 2005/0205661 A1 | 9/2005 | Taylor |
| 2005/0209961 A1 | 9/2005 | Michelsen |
| 2005/0213805 A1 | 9/2005 | Blake et al. |
| 2005/0216409 A1 | 9/2005 | McMonagle et al. |
| 2005/0216410 A1 | 9/2005 | Davis et al. |
| 2005/0218209 A1 | 10/2005 | Heilper et al. |
| 2005/0220324 A1 | 10/2005 | Klein et al. |
| 2005/0228733 A1 | 10/2005 | Bent et al. |
| 2005/0238257 A1 | 10/2005 | Kaneda et al. |
| 2005/0244035 A1 | 11/2005 | Klein et al. |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0273430 A1 | 12/2005 | Pliha |
| 2005/0278250 A1 | 12/2005 | Zair |
| 2005/0281448 A1 | 12/2005 | Lugg |
| 2005/0281450 A1 | 12/2005 | Richardson |
| 2005/0281471 A1 | 12/2005 | LeConte |
| 2005/0281474 A1 | 12/2005 | Huang |
| 2005/0289030 A1 | 12/2005 | Smith |
| 2005/0289059 A1 | 12/2005 | Brewington et al. |
| 2005/0289182 A1 | 12/2005 | Pandian et al. |
| 2006/0002426 A1 | 1/2006 | Madour |
| 2006/0004660 A1 | 1/2006 | Pranger |
| 2006/0015450 A1 | 1/2006 | Guck et al. |
| 2006/0015733 A1 | 1/2006 | O'Malley et al. |
| 2006/0017752 A1 | 1/2006 | Kurzweil et al. |
| 2006/0025697 A1 | 2/2006 | Kurzweil |
| 2006/0026140 A1 | 2/2006 | King |
| 2006/0039628 A1 | 2/2006 | Li et al. |
| 2006/0039629 A1 | 2/2006 | Li et al. |
| 2006/0041506 A1 | 2/2006 | Mason et al. |
| 2006/0171697 A1 | 2/2006 | Nijima |
| 2006/0045374 A1 | 3/2006 | Kim et al. |
| 2006/0045379 A1 | 3/2006 | Heaney, Jr. et al. |
| 2006/0047593 A1 | 3/2006 | Naratil |
| 2006/0049242 A1 | 3/2006 | Mejias et al. |
| 2006/0053056 A1 | 3/2006 | Alspach-Goss |
| 2006/0059085 A1 | 3/2006 | Tucker |
| 2006/0064368 A1 | 3/2006 | Forte |

(56) References Cited

U.S. PATENT DOCUMENTS

| | | |
|---|---|---|
| 2006/0071950 A1 | 4/2006 | Kurzweil et al. |
| 2006/0077941 A1 | 4/2006 | Alagappan et al. |
| 2006/0080245 A1 | 4/2006 | Bahl |
| 2006/0085357 A1 | 4/2006 | Pizarro |
| 2006/0085516 A1 | 4/2006 | Farr et al. |
| 2006/0102704 A1 | 5/2006 | Reynders |
| 2006/0103893 A1 | 5/2006 | Azimi et al. |
| 2006/0106691 A1 | 5/2006 | Sheaffer |
| 2006/0106717 A1 | 5/2006 | Randle |
| 2006/0108168 A1 | 5/2006 | Fischer et al. |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu et al. |
| 2006/0118613 A1 | 6/2006 | McMann |
| 2006/0124728 A1 | 6/2006 | Kotovich et al. |
| 2006/0124730 A1 | 6/2006 | Maloney |
| 2006/0144924 A1 | 7/2006 | Stover |
| 2006/0144937 A1 | 7/2006 | Heilper et al. |
| 2006/0144950 A1 | 7/2006 | Johnson |
| 2006/0159367 A1 | 7/2006 | Zeineh et al. |
| 2006/0161499 A1 | 7/2006 | Rich et al. |
| 2006/0161501 A1 | 7/2006 | Waserstein |
| 2006/0164682 A1 | 7/2006 | Lev |
| 2006/0166178 A1 | 7/2006 | Driedijk |
| 2006/0167818 A1 | 7/2006 | Wentker et al. |
| 2006/0181614 A1 | 8/2006 | Yen et al. |
| 2006/0182331 A1 | 8/2006 | Gilson et al. |
| 2006/0182332 A1 | 8/2006 | Weber |
| 2006/0186194 A1 | 8/2006 | Richardson |
| 2006/0202014 A1 | 9/2006 | VanKirk et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0212393 A1 | 9/2006 | Brown |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0221198 A1 | 10/2006 | Fry et al. |
| 2006/0222260 A1 | 10/2006 | Sambongi et al. |
| 2006/0229976 A1 | 10/2006 | Jung |
| 2006/0229986 A1 | 10/2006 | Corder |
| 2006/0229987 A1 | 10/2006 | Leekle |
| 2006/0238503 A1 | 10/2006 | Smith |
| 2006/0242062 A1 | 10/2006 | Peterson |
| 2006/0242063 A1 | 10/2006 | Peterson |
| 2006/0248009 A1 | 11/2006 | Hicks et al. |
| 2006/0249567 A1 | 11/2006 | Byrne |
| 2006/0255124 A1 | 11/2006 | Hoch |
| 2006/0270421 A1 | 11/2006 | Phillips |
| 2006/0273165 A1 | 12/2006 | Swift et al. |
| 2006/0274164 A1 | 12/2006 | Kimura et al. |
| 2006/0279628 A1 | 12/2006 | Fleming |
| 2006/0282383 A1 | 12/2006 | Doran |
| 2006/0289630 A1 | 12/2006 | Updike et al. |
| 2006/0291744 A1 | 12/2006 | Ikeda et al. |
| 2007/0002157 A1 | 1/2007 | Shintani et al. |
| 2007/0005467 A1 | 1/2007 | Haigh et al. |
| 2007/0013721 A1 | 1/2007 | Vau et al. |
| 2007/0016796 A1 | 1/2007 | Singhal |
| 2007/0019243 A1 | 1/2007 | Sato |
| 2007/0027802 A1 | 2/2007 | VanDeburg et al. |
| 2007/0030357 A1 | 2/2007 | Levien et al. |
| 2007/0030363 A1 | 2/2007 | Cheatle et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0058874 A1 | 3/2007 | Tabata et al. |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0116364 A1 | 5/2007 | Kleihorst et al. |
| 2007/0118472 A1 | 5/2007 | Allen-Rouman et al. |
| 2007/0118747 A1 | 5/2007 | Pintsov et al. |
| 2007/0122024 A1 | 5/2007 | Haas et al. |
| 2007/0124241 A1 | 5/2007 | Newton |
| 2007/0127805 A1 | 6/2007 | Foth et al. |
| 2007/0129955 A1 | 6/2007 | Dalmia |
| 2007/0130063 A1 | 6/2007 | Jindia |
| 2007/0131758 A1 | 6/2007 | Mejias et al. |
| 2007/0136078 A1 | 6/2007 | Plante |
| 2007/0136198 A1 | 6/2007 | Foth et al. |
| 2007/0138255 A1 | 6/2007 | Carreon et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0154098 A1 | 7/2007 | Geva et al. |
| 2007/0156438 A1 | 7/2007 | Popadic et al. |
| 2007/0168265 A1 | 7/2007 | Rosenberger |
| 2007/0168283 A1 | 7/2007 | Alvarez et al. |
| 2007/0171288 A1 | 7/2007 | Inoue |
| 2007/0172107 A1 | 7/2007 | Jones et al. |
| 2007/0172148 A1 | 7/2007 | Hawley |
| 2007/0175977 A1 | 8/2007 | Bauer et al. |
| 2007/0179883 A1 | 8/2007 | Questembert |
| 2007/0183000 A1 | 8/2007 | Eisen et al. |
| 2007/0183652 A1 | 8/2007 | Backstrom et al. |
| 2007/0183741 A1 | 8/2007 | Lerman et al. |
| 2007/0194102 A1 | 8/2007 | Cohen |
| 2007/0198432 A1 | 8/2007 | Pitroda et al. |
| 2007/0203708 A1 | 8/2007 | Polycn et al. |
| 2007/0206877 A1 | 9/2007 | Wu et al. |
| 2007/0208816 A1 | 9/2007 | Baldwin et al. |
| 2007/0214086 A1 | 9/2007 | Homoki |
| 2007/0217669 A1 | 9/2007 | Swift et al. |
| 2007/0233525 A1 | 10/2007 | Boyle |
| 2007/0233585 A1 | 10/2007 | Ben Simon et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0244811 A1 | 10/2007 | Tumminaro |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0262137 A1 | 11/2007 | Brown |
| 2007/0262148 A1 | 11/2007 | Yoon |
| 2007/0268540 A1 | 11/2007 | Gaspardo et al. |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0010204 A1 | 1/2008 | Rackley, III et al. |
| 2008/0013831 A1 | 1/2008 | Aoki |
| 2008/0021802 A1 | 1/2008 | Pendelton |
| 2008/0040280 A1 | 2/2008 | Davis |
| 2008/0046362 A1 | 2/2008 | Easterly |
| 2008/0052182 A1 | 2/2008 | Marshall |
| 2008/0059376 A1 | 3/2008 | Davis |
| 2008/0063253 A1 | 3/2008 | Wood |

(56) References Cited

U.S. PATENT DOCUMENTS

| | | |
|---|---|---|
| 2008/0065524 A1 | 3/2008 | Matthews et al. |
| 2008/0068674 A1 | 3/2008 | McIntyre |
| 2008/0069427 A1 | 3/2008 | Liu |
| 2008/0071679 A1 | 3/2008 | Foley |
| 2008/0071721 A1 | 3/2008 | Wang |
| 2008/0073423 A1 | 3/2008 | Heit et al. |
| 2008/0080760 A1 | 4/2008 | Ronca |
| 2008/0086421 A1 | 4/2008 | Gilder |
| 2008/0086770 A1 | 4/2008 | Kulkarni et al. |
| 2008/0091599 A1 | 4/2008 | Foss, Jr. |
| 2008/0097899 A1 | 4/2008 | Jackson et al. |
| 2008/0097907 A1 | 4/2008 | Till et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0115066 A1 | 5/2008 | Pavley et al. |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0140552 A1 | 6/2008 | Blaikie |
| 2008/0147549 A1 | 6/2008 | Ruthbun |
| 2008/0155672 A1 | 6/2008 | Sharma |
| 2008/0156438 A1 | 7/2008 | Stumphauzer et al. |
| 2008/0162319 A1 | 7/2008 | Breeden et al. |
| 2008/0162320 A1 | 7/2008 | Mueller et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0192129 A1 | 8/2008 | Walker |
| 2008/0205751 A1 | 8/2008 | Mischler |
| 2008/0208727 A1 | 8/2008 | McLauqhlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder et al. |
| 2008/0249951 A1 | 10/2008 | Gilder et al. |
| 2008/0250196 A1 | 10/2008 | Mori |
| 2008/0262950 A1 | 10/2008 | Christensen et al. |
| 2008/0262953 A1 | 10/2008 | Anderson |
| 2008/0275821 A1 | 11/2008 | Bishop et al. |
| 2008/0301441 A1 | 12/2008 | Calman et al. |
| 2008/0304769 A1 | 12/2008 | Hollander et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0066987 A1 | 3/2009 | Inokuchi |
| 2009/0076921 A1 | 3/2009 | Nelson et al. |
| 2009/0092309 A1 | 4/2009 | Calman et al. |
| 2009/0094148 A1 | 4/2009 | Gilder et al. |
| 2009/0108080 A1 | 4/2009 | Meyer |
| 2009/0110281 A1 | 4/2009 | Hirabayashi |
| 2009/0114716 A1 | 5/2009 | Ramachandran |
| 2009/0132813 A1 | 5/2009 | Schibuk |
| 2009/0141962 A1 | 6/2009 | Borgia et al. |
| 2009/0164350 A1 | 6/2009 | Sorbe et al. |
| 2009/0164370 A1 | 6/2009 | Sorbe et al. |
| 2009/0166406 A1 | 7/2009 | Pigg et al. |
| 2009/0167870 A1 | 7/2009 | Caleca et al. |
| 2009/0171723 A1 | 7/2009 | Jenkins |
| 2009/0171795 A1 | 7/2009 | Clouthier et al. |
| 2009/0171819 A1 | 7/2009 | Emde et al. |
| 2009/0171825 A1 | 7/2009 | Roman |
| 2009/0173781 A1 | 7/2009 | Ramachadran |
| 2009/0176511 A1 | 7/2009 | Morrison |
| 2009/0185241 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0190823 A1 | 7/2009 | Walters |
| 2009/0192938 A1 | 7/2009 | Amos |
| 2009/0212929 A1 | 8/2009 | Drory et al. |
| 2009/0222347 A1 | 9/2009 | Whitten |
| 2009/0236413 A1 | 9/2009 | Mueller et al. |
| 2009/0240574 A1 | 9/2009 | Carpenter |
| 2009/0240620 A1 | 9/2009 | Kendrick et al. |
| 2009/0252437 A1 | 10/2009 | Li |
| 2009/0254447 A1 | 10/2009 | Blades |
| 2009/0257641 A1 | 10/2009 | Liu et al. |
| 2009/0263019 A1 | 10/2009 | Tzadok et al. |
| 2009/0271287 A1 | 10/2009 | Halpern |
| 2009/0281904 A1 | 11/2009 | Pharris |
| 2009/0284637 A1 | 11/2009 | Parulski et al. |
| 2009/0290751 A1 | 11/2009 | Ferman et al. |
| 2009/0292628 A1 | 11/2009 | Dryer et al. |
| 2009/0313167 A1 | 12/2009 | Dujari et al. |
| 2009/0319425 A1 | 12/2009 | Tumminaro et al. |
| 2009/0327129 A1 | 12/2009 | Collas et al. |
| 2010/0007899 A1 | 1/2010 | Lay |
| 2010/0008579 A1 | 1/2010 | Smirnov |
| 2010/0016016 A1 | 1/2010 | Brundage et al. |
| 2010/0027679 A1 | 2/2010 | Sunahara et al. |
| 2010/0030687 A1 | 2/2010 | Panthaki et al. |
| 2010/0038839 A1 | 2/2010 | DeWitt et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0069093 A1 | 3/2010 | Morrison |
| 2010/0069155 A1 | 3/2010 | Schwartz |
| 2010/0076890 A1 | 3/2010 | Low |
| 2010/0078471 A1 | 4/2010 | Lin et al. |
| 2010/0082468 A1 | 4/2010 | Low et al. |
| 2010/0082470 A1 | 4/2010 | Walach |
| 2010/0112975 A1 | 5/2010 | Sennett |
| 2010/0161408 A1 | 6/2010 | Karson |
| 2010/0165015 A1 | 7/2010 | Barkley et al. |
| 2010/0198733 A1 | 8/2010 | Gantman et al. |
| 2010/0201711 A1 | 8/2010 | Fillion et al. |
| 2010/0225773 A1 | 9/2010 | Lee |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0262607 A1 | 10/2010 | Vassilvitskii |
| 2010/0274693 A1 | 10/2010 | Bause et al. |
| 2010/0287250 A1 | 11/2010 | Carlson |
| 2010/0312705 A1 | 12/2010 | Caruso et al. |
| 2011/0015963 A1 | 1/2011 | Chafle |
| 2011/0016084 A1 | 1/2011 | Mundy et al. |
| 2011/0016109 A1 | 1/2011 | Vassilvitskii |
| 2011/0054780 A1 | 3/2011 | Dhanani |
| 2011/0069180 A1 | 3/2011 | Nijemcevic et al. |
| 2011/0082747 A1 | 4/2011 | Khan |
| 2011/0083101 A1 | 4/2011 | Sharon |
| 2011/0105092 A1 | 5/2011 | Felt |
| 2011/0106675 A1 | 5/2011 | Perlman |
| 2011/0112967 A1 | 5/2011 | Anderson et al. |
| 2011/0112985 A1 | 5/2011 | Kocmond |
| 2011/0170740 A1 | 7/2011 | Coleman |
| 2011/0191161 A1 | 8/2011 | Dai |
| 2011/0251956 A1 | 10/2011 | Cantley et al. |
| 2011/0276483 A1 | 11/2011 | Saegert et al. |
| 2011/0280450 A1 | 11/2011 | Nepomniachtchi et al. |
| 2011/0285874 A1 | 11/2011 | Showering et al. |
| 2011/0310442 A1 | 12/2011 | Popadic et al. |
| 2012/0036014 A1 | 2/2012 | Sunkada |
| 2012/0045112 A1 | 2/2012 | Lundblad et al. |
| 2012/0047070 A1 | 2/2012 | Pharris |
| 2012/0052874 A1 | 3/2012 | Kumar |
| 2012/0062732 A1 | 3/2012 | Marman et al. |
| 2012/0089514 A1 | 4/2012 | Kraemling et al. |
| 2012/0098705 A1 | 4/2012 | Yost |
| 2012/0099792 A1 | 4/2012 | Chevion et al. |
| 2012/0109793 A1 | 5/2012 | Abeles |
| 2012/0113489 A1 | 5/2012 | Heit et al. |
| 2012/0150767 A1 | 6/2012 | Chacko |
| 2012/0185383 A1 | 7/2012 | Atsmon |
| 2012/0185388 A1 | 7/2012 | Pranger |
| 2012/0229872 A1 | 9/2012 | Dolev |
| 2012/0230577 A1 | 9/2012 | Calman et al. |
| 2012/0296768 A1 | 11/2012 | Fremont-Smith |

(56) References Cited

U.S. PATENT DOCUMENTS

| | | |
|---|---|---|
| 2013/0021651 A9 | 1/2013 | Popadic et al. |
| 2013/0120595 A1 | 5/2013 | Roach et al. |
| 2013/0155474 A1 | 6/2013 | Roach et al. |
| 2013/0191261 A1 | 7/2013 | Chandler |
| 2013/0198071 A1 | 8/2013 | Jurss |
| 2013/0201534 A1 | 8/2013 | Carlen |
| 2013/0223721 A1 | 8/2013 | Nepomniachtchi et al. |
| 2013/0297353 A1 | 11/2013 | Strange |
| 2013/0324160 A1 | 12/2013 | Sabatellil |
| 2013/0332004 A1 | 12/2013 | Gompert et al. |
| 2013/0332219 A1 | 12/2013 | Clark |
| 2013/0346306 A1 | 12/2013 | Kopp |
| 2013/0346307 A1 | 12/2013 | Kopp |
| 2014/0010467 A1 | 1/2014 | Mochizuki et al. |
| 2014/0032406 A1 | 1/2014 | Roach et al. |
| 2014/0037183 A1 | 2/2014 | Gorski et al. |
| 2014/0067661 A1 | 3/2014 | Elischer |
| 2014/0156501 A1 | 6/2014 | Howe |
| 2014/0197922 A1 | 7/2014 | Stanwood et al. |
| 2014/0203508 A1 | 7/2014 | Pedde |
| 2014/0207673 A1 | 7/2014 | Jeffries |
| 2014/0207674 A1 | 7/2014 | Schroeder |
| 2014/0236820 A1 | 8/2014 | Carlton et al. |
| 2014/0244476 A1 | 8/2014 | Shvarts |
| 2014/0258169 A1 | 9/2014 | Wong et al. |
| 2014/0279453 A1 | 9/2014 | Belchee et al. |
| 2014/0313335 A1 | 10/2014 | Koravadi |
| 2014/0351137 A1 | 11/2014 | Chisholm |
| 2014/0374486 A1 | 12/2014 | Collins, Jr. |
| 2015/0039528 A1 | 2/2015 | Minogue et al. |
| 2015/0090782 A1 | 4/2015 | Dent |
| 2015/0134517 A1 | 5/2015 | Cosgray |
| 2015/0235484 A1 | 8/2015 | Kraeling et al. |
| 2015/0244994 A1 | 8/2015 | Jang et al. |
| 2015/0294523 A1 | 10/2015 | Smith |
| 2015/0348591 A1 | 12/2015 | Kaps et al. |
| 2016/0026866 A1 | 1/2016 | Sundaresan |
| 2016/0034590 A1 | 2/2016 | Endras et al. |
| 2016/0142625 A1 | 5/2016 | Weksler et al. |
| 2016/0189500 A1 | 6/2016 | Kim et al. |
| 2016/0335816 A1 | 11/2016 | Thoppae et al. |
| 2017/0039637 A1 | 2/2017 | Wandelmer |
| 2017/0068421 A1 | 3/2017 | Carlson |
| 2017/0132583 A1 | 5/2017 | Nair |
| 2017/0146602 A1 | 5/2017 | Samp et al. |
| 2017/0229149 A1 | 8/2017 | Rothschild et al. |
| 2017/0263120 A1 | 9/2017 | Durie, Jr. et al. |
| 2017/0337610 A1 | 11/2017 | Beguesse |
| 2018/0108252 A1 | 4/2018 | Pividori |
| 2018/0197118 A1 | 7/2018 | McLaughlin |
| 2019/0026577 A1 | 1/2019 | Hall et al. |
| 2019/0122222 A1 | 4/2019 | Uechi |
| 2021/0097615 A1 | 4/2021 | Gunn, Jr. |

FOREIGN PATENT DOCUMENTS

| | | |
|---|---|---|
| CN | 1967565 A | 5/2007 |
| EP | 0 984 410 A1 | 3/2000 |
| EP | 0984410 | 3/2000 |
| EP | 1 855 459 A2 | 5/2007 |
| JP | 2004-23158 | 1/2004 |
| JP | 2004-23158 A | 1/2004 |
| JP | 3708807 | 10/2005 |
| JP | 2006-174105 A | 6/2006 |
| KR | 20040076131 A | 8/2004 |
| WO | WO 96/14707 A1 | 5/1996 |
| WO | WO 98/37655 A1 | 8/1998 |
| WO | WO 01/61436 | 8/2001 |
| WO | WO 01/61436 A2 | 8/2001 |
| WO | WO 2004/008350 A1 | 1/2004 |
| WO | WO 2005/043857 | 5/2005 |
| WO | WO 2005/124657 A1 | 12/2005 |
| WO | WO 2006/075967 A1 | 7/2006 |
| WO | WO 2006/086768 A2 | 8/2006 |
| WO | WO 2006/136958 A2 | 12/2006 |
| WO | WO 2007/024889 | 3/2007 |

OTHER PUBLICATIONS

Lyn C. Thomas, "A survey of credit and behavioural scoring: forecasting financial risk of lending to consumers", International Journal of Forecasting, (Risk) (2000).
Non-Final Office Action issued on U.S. Appl. No. 14/293,159 dated Aug. 11, 2022.
Non-Final Office Action issued on U.S. Appl. No. 16/455,024 dated Sep. 7, 2022.
Non-Final Office Action issued on U.S. Appl. No. 17/071,678 dated Sep. 14, 2022.
Non-Final Office Action issued on U.S. Appl. No. 17/180,075 dated Oct. 4, 2022.
Non-Final Office Action issue on U.S. Appl. 17/511,822 dated Sep. 16, 2022.
Non-Final Office Action issued on U.S. Appl. No. 17/568,849 dated Oct. 4, 2022.
Yong Gu Ji et al., "A Usability Checklist for the Usability Evaluation of Mobile Phone User Interface", International Journal of Human-Computer Interaction, 20(3), 207-231 (2006).
Printout of news article dated Feb. 13, 2008, announcing a Nokia phone providing audio cues for capturing a document image.
IPR Petition 2022-01593, *Truist Bank v. United Services Automobile Association* filed Oct. 11, 2022.
Defendant Wells Fargo Bank, N.A.'s Second Amended Answer, Affirmative Defenses, and Counterclaims to Plaintiff's Amended Complaint, *United Services Automobile Association v. Wells Fargo Bank, N.A.*, Civil Action No. 2:18-cv-245, dated Aug. 1, 2019, 72 pgs.
Claim Construction Memorandum Opinion and Order, *United Services Automobile Association v. Wells Fargo Bank, N.A.*, Civil Action No. 2:18-cv-366, dated Jul. 29, 2019, 36 pgs.
Wells Fargo's Objections to Magistrate Judge Payne's Claim Construction Memorandum Opinion and Order, *United Services Automobile Association v. Wells Fargo Bank, N.A.*, Civil Action No. 2:18-cv-366, dated Aug. 12, 2019, 7 pgs.
USAA's Objections to Magistrate Judge Payne's Claim Construction Memorandum Opinion and Order, *United Services Automobile Association v. Wells Fargo Bank, N.A.*, Civil Action No. 2:18-cv-366, dated Aug. 12, 2019, 10 pgs.
IPR2019-00815 U.S. Pat. No. 9,818,090, Petitioner's Reply Brief to Patent Owner Preliminary Response Pursuant to Authorization Provided in Paper No. 13, dated Aug. 1, 2019, 9 pgs.
IPR2019-00815 U.S. Pat. No. 9,818,090, Petitioner's Supplemental Exhibit List, dated Aug. 1, 2019, 5 pgs.
IPR2019-00815 U.S. Pat. No. 9,818,090, United Services Automobile Association (USAA)'s Sur-Reply in Support of Patent Owner Preliminary Response, dated Aug. 8, 2019, 8 pgs.
IPR2019-00815 U.S. Pat. No. 9,818,090, Decision Denying Institution of Inter Parties Review, dated Aug. 26, 2019, 28 pgs.
Mitek Video titled "Mobile Deposit Tour", Published on Jul. 2, 2009 by Mitek Systems, duration 2 minutes and 13 seconds, located on the Internet at: https://www.youtube.com/watch?v=sGD49ybxS2Q, 25 pgs.
Provisional patent application filed by Wells Fargo Bank, dated Jan. 29, 2008, 134 pgs.
SCH0i910 Portable Dualmode Smartphone User Guide by Samsung, Copyright 2009 Samsung Electronics Canada, downloadable from www.manualslib.com, 168 pgs.
U.S. Appl. No. 61/022,279, dated Jan. 18, 2008, (cited in IPR2020-00090, U.S. Pat. No. 9,177,197), 35 pgs.
Panini My Vision X Operator Manual, Panini, 2004, (cited in IPR2020-00093, U.S. Pat. No. 9,892,454), 51 pgs.
Yeo, L.H. et al., "Submission of transaction from mobile workstations in a cooperative multidatabase environment", *IEEE*, 1994, (cited in IPR2020-00097, U.S. Pat. No. 7,885,880), 10 pgs.
Cormac Herley, "Recursive Method to Extract Rectangular Objects From Scans", 4 pages, Oct. 2003.

(56) References Cited

OTHER PUBLICATIONS

E. Tochip et al., "Camera Phone Color Appearance Utility—Finding a Way to Identify Camera Phone Picture Color", 25 pages, 2007.
Patent Disclaimer for U.S. Pat. No. 8,699,779, filed on Mar. 4, 2019, 2 pgs.
Patent Disclaimer for U.S. Pat. No. 8,977,571, filed on Feb. 20, 2019, 2 pgs.
Patent Disclaimer for U.S. Pat. No. 9,336,517, filed on Mar. 4, 2019, 2 pgs.
Patent Disclaimer for U.S. Pat. No. 9,818,090, filed on Feb. 20, 2019, 2 pgs.
CBM2019-00002 U.S. Pat. No. 9,818,090, United Services Automobiie Association (USAA)'s Patent Owner Preliminary Response, dated Feb. 20, 2019, 75 pgs.
CBM2019-00002 U.S. Pat. No. 9,818,090, Declaration of Tim Crews in Support of Patent Owner Preliminary Response, dated Feb. 20, 2019, 8 pgs.
CBM2019-00002 U.S. Pat. No. 9,818,090, Declaration of Matthew Calman in Support of Patent Owner Preliminary Response, dated Feb. 20, 2019, 14 pgs.
CBM2019-00002 U.S. Pat. No. 9,818,090, Katie Knight Videotape Deposition Transcript, dated Feb. 8, 2019, 27 pgs.
CBM2019-00002 U.S. Pat. No. 9,818,090, Peter Alexander, Ph.D., Oral and Videotaped Deposition, dated Jan. 23, 2019, 27 pgs.
CBM2019-00002 U.S. Pat. No. 9,818,090, United Services Automobile Association (USAA)'s Updated Exhibit List, dated Mar. 19, 2019, 8 pgs.
CBM2019-00003 U.S. Pat. No. 9,336,517, United Services Automobile Association (USAA)'s Patent Owner Preliminary Response, dated Mar. 4, 2019, 91 pgs.
CBM2019-00003 U.S. Pat. No. 8,699,779, Declaration of Matthew Calman in Support of Patent Owner Preliminary Response, dated Mar. 4, 2019, 15 pgs.
CBM2019-00003 U.S. Pat. No. 9,336,517, Katie Knight Videotape Deposition Transcript, dated Feb. 8, 2019, 27 pgs.
CBM2019-00003 U.S. Pat. No. 9,336,517, Peter Alexander, PhD., Oral and Videotaped Deposition, dated Jan. 23, 2019, 27 pgs.
CBM2019-00003 U.S. Pat. No. 9,336,517, United Services Automobile Association (USAA)'s Updated Exhibit List Pursuant to 37 CFR 42.63(e), dated Mar. 19, 2019, 8 pgs.
CBM2019-00003 U.S. Pat. No. 9,338,517, Petitioner's Reply Brief to Patent Owner Preliminary Response Pursuant to Authorization Provided in Paper No. 14, dated Apr. 10, 2019, 10 pgs.
CBM2019-00004 U.S. Pat. No. 8,977,571, Declaration of Tim Crews in Support of Patent Owner Preliminary Response, dated Feb. 20, 2019, 8 pgs.
CBM2019-00004 U.S. Pat. No. 8,977,571, United Services Automobile Association (USAA)'s Patent Owner Preliminary Response, dated Feb. 20, 2019, 99 pgs.
CBM2019-00004 U.S. Pat. No. 8,977,571, Declaration of Matthew Calman in Support of Patent Owner Preliminary Response, dated Feb. 20, 2019, 14 pgs.
CBM2019-00004 U.S. Pat. No. 8,977,571, United Services Automobile Association (USAA)'s Updated Exhibit List Pursuant to 37 CFR 43.63(e), dated Mar. 19, 2019, 8 pgs.
CBM2019-00005 U.S. Pat. No. 8,699,779, United Services Automobile Association's (USAA) s Patent Owner Preliminary Response, dated Mar. 4, 2019, 103 pgs.
CBM2019-00005 U.S. Pat. No. 8,899,779, Katie Knight Videotape Deposition Transcript, dated Feb. 8, 2019, 27 pgs.
CBM2019-00005 U.S. Pat. No. 8,899,779 Matthew A. Calman Declaration, dated Mar. 4, 2019, 15 pgs.
CBM2019-00005 U.S. Pat. No. 8,699,779 Peter Alexander, Ph.D, Oral and Videotaped Deposition, dated Jan. 23, 2019, 27 pgs.
CBM2019-00027 U.S. Pat. No. 9,224,136 Declaration of Peter Alexander, Ph.D., dated Mar. 28, 2019, 147 pgs.
CBM2019-00027 U.S. Pat. No. 9,224,136 Petition for Covered Business Method Review of Claims 1-3, 5-9, 11-16 and 18 of U.S. Pat. No. 9,224,136, dated Mar. 28, 2019, 93 pgs.
CBM2019-00027 U.S. Pat. No. 9,224,136 Notice of Filing Date Accorded to Petition and Time for Filing Patent Owner Preliminary Response, dated Apr. 8, 2019, 3 pgs.
CBM2019-00028 U.S. Pat. No. 10,013,681, Plaintiff United Services Automobile Association (USAA) Preliminary Claim Constructions and Extrinsic Evidence, dated Mar. 15, 2019, 74 pgs.
CBM2019-00028 U.S. Pat. No. 10,013,681, Declaration of Peter Alexander, Ph.D., dated Mar. 28, 2019, 94 pgs.
CBM2019-00028 U.S. Pat. No. 10,013,681, Petition for Covered Business Method Review of Claims 1-30 of U.S. Pat. No. 10,013,681, dated Mar. 28, 2019, 99 pgs.
CBM2019-00028 U.S. Pat. No. 10,013,681, Petitioner's Updated Exhibit List (as of Apr. 1, 2019) for U.S. Pat. No. 10,013,681, dated Apr. 1, 2019, 5 pgs.
CBM2019-00028 U.S. Pat. No. 10,013,681, Notice of Filing Date Accorded to Petition and Time for Filing Patent owner Preliminary Response for U.S. Pat. No. 10,013,681, dated Apr. 8, 2019, 3 pgs.
CBM2019-00029 U.S. Pat. No. 10,013,605, Declaration of Peter Alexander, Ph.D., dated Mar. 28, 2019, 76 pgs.
CBM2019-00029 U.S. Pat. No. 10,013,605, Petition for Covered Business Method Review of Claims 1-3, 5-14, 16-29 of U.S. Pat. No. 10,013,605, dated Mar. 28, 2019, 88 pgs.
CBM2019-00029 U.S. Pat. No. 10,013,605, Plaintiff United Services Automobile Association (USAA) Preliminary Claim Constructions and Extrinsic Evidence, dated Mar. 15, 2019, 74 pgs.
IPR2019-00815 U.S. Pat. No. 9,818,090, Petition for Inter Parties Review of Claims 109 of U.S. Pat. No. 9,818,090, dated Mar. 20, 2019, 56 pgs.
IPR2019-00815 U.S. Pat. No. 9,818,090, Declaration of Peter Alexander, PhD. as filed in the IPR on Mar. 20, 2019, 99 pgs.
IPR2019-00815 U.S. Pat. No. 9,818,090, Notice of Filing Date Accorded to Petition and Time for Filing Patent Owner Preliminary Response, dated Mar. 27, 2019, 5 pgs.
IPR2019-00815 U.S. Pat. No. 9,818,090, Exhibit B Proposed Claim Construction for the '571, '779 and '517 Patents, filed on Feb. 28, 2019, 10 pgs.
ABA Routing System Transit Number, Wikipedia, dated Sep. 27, 2006, 3 pgs.
Accredited Standards Committee Technical Report TR 33-2006, dated Aug. 28, 2006, 75 pgs.
ANS X9.100-140-2004, "Specification for an Image Replacement document—IRD", American Standard for Financial Services, Oct. 1, 2004, 15 pgs.
ANSI News, Check 21 Goes Into Effect Oct. 28, 2004, dated Oct. 25, 2004, 1 pg.
ANSI, "Return Reasons for Check Image Exchange of IRDS", dated May 6, 2016, 23 pgs.
ANSI, "Sepcifications for Electronic Exchange of Check and Image Data", dated Jul. 11, 2006, 230 pgs.
ANSI X9.7-1999(R2007), Bank Check Background and Convenience Amount Field Specification, dated Jul. 11, 2007, 86 pgs.
ASCX9, "Specification for Electronic Exchange of Check and Image Data", date Mar. 31, 2003. 156 pgs.
Bankers' Hotline, "Training Page: Learning the Bank Numbering System", Copyright 2004, 2 pgs.
BrainJar Validation Algorithms, archived on Mar. 16, 2016 from BrainJar.com, 2 pgs.
Canon White Paper, "Two Words Every Business Should Know—Remote Deposit", dated 2005, 7 pgs.
CBR online, "Diebold lauches ATM depository technology", Oct. 4, 2007, 5 pgs.
Cheq Information Technology White Paper, "Teller Scanner Performance and Scanner Design: Camera Position Relative to the Feeder", dated 2005, 7 pgs.
De Jesus, Angie et al., "Distributed Check Processing in a Check 21 Environment", dated Nov. 2004, 22 pgs.
Federal Reserve Adoption of DSTU X9.37-2003, Image Cash Letter Customer Documentation Version 1.8, dated Oct. 1, 2008, 48 pgs.
Fielding, R. et al., "RFC-2616—Hypertext Transfer Protocol", Network Working Group, The internet Society copyright 1999, 177 pgs.
Hill, Simon, "From J-Phone to Lumina 1020: A Complete History of the Camera Phone", dated Aug. 11, 2013, 19 pgs.

(56) References Cited

OTHER PUBLICATIONS

Instrument—Definition from the Merriam-Webster Online Dictionary, dated Mar. 2, 2019, 1 pg.
Instrument—Definition of instrument from the Oxford Dictionaries (British & World English), dated Jul. 2, 2017, 44 pgs.
IPhone Application Programming Guide Device Support, dated Apr. 26, 2009, 7 pgs.
IPhone Announces the New iPhone 3gsp—The Fastest, Most Powerful iPhone Yet, Press Release dated Jun. 8, 2009, 4 pgs.
Klein, Robert, Financial Services Technology, "Image Quality and Usability Assurance: Phase 1 Project", dated Jul. 23, 2004, 67 pgs.
Lange, Bill, "Combining Remote Capture and IRD Printing, A Check 21 Strategy for Community and Regional Banks", dated 2005, 25 pgs.
Lee, Jeanne, "Mobile Check Deposits: Pro Tips to Ensure They Go Smoothly", dated Feb. 19, 2016, 6 pgs.
Meara, Bob, "State of Remote Deposit Capture 2015: Mobile is the New Scanner", Dated May 26, 2015, obtained from the Internet at: https://www.celent.com/insights/57842967, 3 pgs.
Meara, Bob, "State of Remote Deposit Capture 2015 Mobile Is the New Scanner", dated May 2015, 56 pgs.
Meara, Bob,"USAA's Mobile Remote Deposit Capture", Dated Jun. 26, 2009, 2 pgs.
Mitek's Mobile Deposit Processes More Than Two Billion Checks, $1.5 Trillion in Cumulative Check Value, dated Mar. 18, 2018, 2 pgs.
Mitek, "Video Release—Mitek MiSnap™ Mobile Auto Capture Improves Mobile Deposit® User Experience at Ten Financial Institutions", dated Jul. 15, 2014, 2 pgs.
NCR, Mobile Remote Deposit Capture (RDC), copyright 2011, 8 pgs.
Nokia N90 Review Digital Trends, dated Feb. 11, 2019, obtained from the Internet at: https://www.digitaltrends.com/cell-phone-reviews/nokia-n90-review/, 11 pgs.
Nokia N95 8GB User Guide, copyright 2009, (from the Wells Fargo Bank, N.A. IPR2019-00815, filed on Mar. 20, 2019), Part 1 of 3, 67 pgs.
Nokia N95 8GB User Guide, copyright 2009, (from the Wells Fargo Bank, N.A. IPR2019-00815, filed on Mar. 20, 2019), Part 2 of 3, 60gs.
Nokia N95 8GB User Guide, copyright 2009, (from the Wells Fargo Bank, N.A. IPR2019-00815, filed on Mar. 20, 2019), Part 3 of 3, 53 pgs.
Patel, Kunur, Ad Age, "How Mobile Technology Is Changing Banking's Future", dated Sep. 21, 2009, 3 pgs.
Remote Deposit Capture Basic Requirements, dated Aug. 22, 2009, 1 pg.
Remote Deposit Capture.com Scanner Matrix, dated Oct. 21, 2011, 3 pgs.
Rowles, Tony, *USAA*-v. *Wells Fargo* No. 2:16-cv-245-JRGL e-mail correspondence dated Jan. 24, 2019, 2 pgs.
Sechrest, Stuart et al., "Windows XP Performance", Microsoft, dated Jun. 1, 2001, 20 pgs.
Spenser, Harvey, "White Paper Check 21 Controlling Image Quality at the Point of Capture", dated 2004, 7 pgs.
Timothy R. Crews list of Patents, printed from the United States Patent and Trademark Office on Feb. 13, 2019, 7 pgs.
Van Dyke, Jim, "2017 Mitek Mobile Deposit Benchmark Report", copyright 2017, 50 pgs.
Wausau, "Understanding Image Quality & Usability Within a New Environment", copyright 2019, 1 pg.
Whitney, Steve et al., "A Framework for Exchanging Image Returns", dated Jul. 2001, 129 pgs.
12 CRF § 229.51 and Appendix D to Part 229 (Jan. 1, 2005 edition), 3 pgs.
149 Cong. Rec. H9289, Oct. 8, 2003, 6 pgs.
"Accept "Customer Not Present" Checks," Accept Check Online, http://checksoftware.com, Cited in U.S. Pat. No. 7,900,822, as dated 2007 (1 pg).

*Apple Announces the New iPhone 3GS—The Fastest, Most Powerful iPhone Yet*, Jun. 8, 2009, located on the Internet at: http://www.apple.com.rensroom/2009/06/08Apple-Annpounces-the-New-iPhone-3GS-The Fastest-Most-Powerful-iPhone-Yet, 4 pgs.
Apple Reinvents the Phone with iPhone, Jan. 2007, located on the Internet at: https://www.apple.com/newsroom/2007/01/09Apple-Reinvents-the-Phone-with-iPhone/, 4 pgs.
Askey, *Canon EOS 40D Review* (pts.1,4,10), Digital Photography Review, located on the Internet at: : https://www.dpreview.com/reviews/canoneos40d, 24 pgs.
Askey, *Leica Digilux 2 Review* (pts.1,3,7), Digital Photography Review, May 20, 2004, located on the Internet at: : https://www.dpreview.com/reviews/leicadigilux2, 20 pgs.
Askey, Nikon D300 In-depth Review (pts.1,3,9), Digital Photography Review, Mar. 12, 2008, located on the Internet at: : https://www.preview.com/reviews/nikond300, 24 pgs.
Askey, *Panasonic Lumix DMC-L1 Review* (pts.1,3,7), Digital Photography Review, Apr. 11, 2007, located on the Internet at: https://www.dpreview.com/reviews/panasonicdmc11, 24 pgs.
Askey, *Sony Cyber-shot DSC-R1 Review* (pts,1,3,7), Digital Photography Review, Dec. 6, 2005, located on the Internet at: http://www.dpreview.com.reviews/sonydscr1, 24 pgs.
*Automated Clearing Houses* (ACHs), Federal Reserve Bank of New York (May 2000) available at: https://www.newyorkfed.org/aboutthefed/fedpoint/fed31.html, (attached as Exhibit 12 from the Defendant Wells Fargo Bank, N.A.'s Answer dated Aug. 14, 2018), 4 pgs.
"Adjusting Brightness and Contrast", www.eaglesoftware.com/adjustin.htm, retrieved on May 4, 2009 (4 pgs).
Berman, *How Hitchcock Turned a Small Budget Into a Great Triumph,* Time.com, Apr. 29, 2015, located on the Internet at: http://time.com/3823112/alfred-hitchcock-shadow-of-a-doubt, 1 pg.
"Best practices for producing quality digital image files," Digital Images Guidelines, http://deepblue.lib.umich.edu/bitstream/2027.42/40247/1/Images-Best_Practice.pdf, downloaded 2007 (2 pgs).
*Big Red Book,* Adobe Systems Incorporated, copyright 2000, (attached as Exhibit 27 from the Defendant Wells Fargo Bank, N.A.'s Answer dated Aug. 14, 2018), 45 pgs.
Canon Eos 40D Digital Camera Instruction Manual, located on the Internet at: http://gdlp01.c-wss.com/gds/6/0900008236/01/EOS40D_HG_EN.pdf (attached as Exhibit 6 from the Defendant Wells Fargo Bank, N.A.'s Answer dated Aug. 14, 2018), 38 pgs.
"Chapter 7 Payroll Programs," Uniform Staff Payroll System, http://www2.oecn.k12.oh.us/www/ssdt/usps/usps_user_guide_005.html, Cited in patent No. 7,900,822, as dated 2007 (9 pgs).
"Check 21—The check is not in the post", RedTitan Technology 2004 http://www.redtitan.com/check21/htm (3 pgs).
"Check 21 Solutions," Columbia Financial International, Inc. http://www.columbiafinancial.us/check21/solutions.htm, Cited in U.S. Pat. No. 7,900,822, as dated 2007 (8 pgs).
Check Clearing for the 21st Century Act Foundation for Check 21 Compliance Training, Federal Financial Institutions Examination Council, (Oct. 16, 2004), available on the Internet at: https://web.archive.org/web/20041016100648/https://www.ffiec.gov/exam/check21/check21foundationdoc.htm, (excerpts attached as Exhibit 20 from the Defendant Wells Fargo Bank, N.A.'s Answer dated Aug. 14, 2018), 11 pgs.
"Check Fraud: A Guide to Avoiding Losses", All Net, http://all.net/books/audit/checkfraud/security.htm, Cited in U.S. Pat. No. 7,900,822, as dated 2007 (1 pg).
Chen, Brian et al., *iPhone 3GS Trounces Predecessors, Rivals in Web Browser Speed Test,* Wired, Jun. 24, 2009, located on the Internet at: www.wired.com/2009.3gs-speed/, 10 pgs.
"Clearing House Electronic Check Clearing System (CHECCS) Operating Rules," An IP.com Prior Art Database Technical Disclosure, Jul. 29, 2015 (35 pgs).
"Compliance with Regulation CC", http./www/federalreserve.gov/Pubs/regcc/regcc.htm, Jan. 24, 2006 (6 pgs).
"Customer Personalized Bank Checks and Address Labels" Checks Your Way Inc., http://www.checksyourway.com/htm/web_pages/faq.htm, Cited in U.S. Pat. No. 7,900,822, as dated 2007 (6 pgs).
Defendant Wells Fargo Bank, N.A.'s Answer, Affirmative Defenses, and Counterclaims to Plaintiff's Complaint, dated Aug. 14, 2018, 64 pgs.

(56) References Cited

OTHER PUBLICATIONS

Declaration of Peter Alexander, Ph.D., CBM2019-0004, Nov. 8, 2018, 180 pgs.
"Deposit Now: Quick Start User Guide," BankServ, 2007, 29 pages.
"Direct Deposit Application for Payroll", Purdue University, Business Office Form 0003, http://purdue.edu/payroll/pdf/directdepositapplication.pdf, Jul. 2007 (2 pgs).
"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, Cited in U.S. Pat. No. 7,900,822, as dated 2007 (3 pgs).
"Electronic Billing Problem: The E-check is in the mail" American Banker—vol. 168, No. 95, May 19, 2003 (4 pgs).
Excerpts from American National Standard for Financial Services, ANS, X9.100-140-2004—Specifications for an Image Replacement Document—IRD, Oct. 1, 2004, 16 pgs.
"First Wireless Handheld Check and Credit Card Processing Solution Launched by Commericant®, MobileScape® 5000 Eliminates Bounced Checks, Enables Payments Everywhere," Business Wire, Mar. 13, 2016, 3 pages.
"Frequently Asked Questions" Bank of America, http://www/bankofamerica.com/deposits/checksave/index.cfm?template-Ic_faq_bymail, Cited in U.S. Pat. No. 7,900,822, as dated 2007 (2 pgs).
"Full Service Direct Deposit", www.nonprofitstaffing.com/images/upload/dirdepform.pdf. Cited in U.S. Pat. No. 7,900,822, as dated 2001, (2 pgs).
Gates, *A History of Wireless Standards, Wi-Fi Back to Basics, Aerohive Blog,* Jul. 2015, located on the Internet at: http://blog.aerohive.com/a-history-of-wireless-standards, 5 pgs.
*Guidelines for Evaluation of Radio Transmission Technologies for IMT-2000,* dated 1997, ITU-R-M.1225, located on the Internet at: https://www.itu.int/dms-pubrec/itu-r/rec/m/R-REC-M,1225-0-199702-I!!PDF-E.pdf, 60 pgs.
Helio Ocean User Manual, located on the Internet at: https://standupwireless.com/wp-content/uploads/2017/04/Manual_PANTECH_OCEAN.pdf (excerpts attached as Exhibit 10 from the Defendant Wells Fargo Bank, N.A.'s Answer dated Aug. 14, 2018), 76 pgs.
"How to Digitally Deposit a Check Image", Smart Money Daily, Copyright 2008 (5 pgs).
HTC Touch Diamond Manual, copyright 2008, (attached as Exhibit 11 from the Defendant Wells Fargo Bank, N.A.'s Answer dated Aug. 14, 2018), 257 pgs.
Humphrey, David B. and Hunt, Robert, "*Getting Rid of Paper: Savings From Check 21*", Working Paper No. 12-12, Research Department, Federal Reserve Bank of Philadelphia, (May 2012), available on the Internet at: https://philadelphiafed.org/-/media/research-and-data/publications/working-papers/2012/wp12-12.pdf, (attached as Exhibit 14 from the Defendant Wells Fargo Bank, N.A.'s Answer dated Aug. 14, 2018), 29 pgs.
"ImageNet Mobile Deposit Provides Convenient Check Deposit and Bill Pay to Mobile Consumers," Miteksystems, 2008 (2 pgs).
*IPhone Store Downloads Top 10 Million in First Weekend,* Jul. 14, 2008, located on the Internet at: iPhone Store Downloads Top 10 Million in First Weekend, Jul. 14, 2008, located on the Internet at: https://www.apple.com/newsroom/2008/07/14iPhone-App-Store-Downloads-Top-10-Million-in-First-Weekend, 4pgs.
"It's the easiest way to Switch banks", LNB, http://www.inbky.com/pdf/LNBswitch-kit10-07.pdf Cited in U.S. Pat. No. 7,996,316, as dated 2007 (7 pgs).
Joinson et al., *Olympus E-30 Review* (pts.1,4,8), Digital Photography Review, Mar. 24, 2009, located on the Internet at: www.dpreview.com/reviews/olympus30, 6 pgs.
Knerr et al., *The A2iA Intercheque System: Courtesy Amount and Legal Amount Recognition for French Checks in Automated Bankcheck Processing* 43-86, Impedove et al. eds., 1997, 50 pgs.
Lacker, Jeffrey M., "*Payment System Disruptions and the Federal Reserve Following Sep. 11, 2001*", The Federal Reserve Bank of Richmond, (Dec. 23, 2003) (attached as Exhibit 19 from the Defendant Wells Fargo Bank, N.A.'s Answer dated Aug. 14, 2018), 55 pgs.
Leica Digilux 2 Instructions located on the Internet: http://www.overgaard.dk/pdf/d2_manual.pdf (attached as Exhibit 2 from the Defendant Wells Fargo Bank N.A.'s Answer dated Aug. 14, 2018), 95 pgs.
"Lesson 38—More Bank Transactions", Turtle Soft, http://www.turtlesoft.com/goldenseal-software-manual.lesson38.htm, Cited in U.S. Pat. No. 7,900,822, as dated 2007 (8 pgs).
"Machine Accepts Bank Deposits", *New York Times,* Apr. 12, 1961, 1 pg.
Mackenzie, E., *Photography Made Easy,* copyright 1845, 80 pgs.
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.com/cgi-bin/stories/pl?ACCT=104&STORY=/www/story/10-01- . . . , Nov. 25, 2008 (2 pgs).
Motorola RAZR MAXX V6 User Manual, located on the Internet at: https://www.phonearena.com/phones/Motorola-RAZR-MAXX-V6_id1680, (attached as Exhibit 7 from the Defendant Wells Fargo Bank, N.A.'s Answer dated Aug. 14, 2018), 36 pgs.
MOTOMANUAL for MOTORAZR, located on the Internet at: https://www.cellphones.ca/downloads/phones/manuals/motorola-razr-v3xx-manual.pdf (excerpts attached as Exhibit 8 from the Defendant Wells Fargo Bank, N.A.'s Answer dated Aug. 14, 2018), 34 pgs.
Nikon Digital Camera D300 User's Manual, located on the Internet at: http://download.nikonimglib.com/archive2/iBuJv00Aj97i01y8BrK49XX0Ts69/D300,EU(En)04.pdf (attached as Exhibit 5 from the Defendant Wells Fargo Bank, N.A.'s Answer dated Aug. 14, 2018), 195 pgs.
Nokia N95 8GB User Guide, copyright 2009, located on the Internet at: https://www.nokia.com/en_int/phones/sites/default/files/user-guides/Nokia_N95_8GB_Extended_UG_en.pdf (excerpts attached as Exhibit 9 from the Defendant Wells Fargo Bank, N.A.'s Answer dated Aug. 14, 2018), 77 pgs.
"NOVA Enhances Electronic Check Service to Benefit Multi-Lane Retailers," Business Wire, Nov. 28, 2006, 2 pages.
Panasonic Operating Instructions for Digital Camera/Lens Kit Model No. DMC-L1K, https://www.panasonic.com/content/dam/Panasonic/support_manual/Digital_Still_Camera/English_01-vqt0-vqt2/vqt0w95_L1_oi.pdf (attached as Exhibit 4 from the Defendant Wells Fargo Back N.A.'s Answer dated Aug. 14, 2018), 129 pgs.
"Personal Finance", PNC, http://www.pnc.com/webapp/unsec/productsandservice.do?sitearea=/PNC/home/personal/account+services/quick+switch/quick+switch+faqs, Cited in U.S. Pat. No. 7,900,822, as dated 2007 (12 pgs).
POP, ARC and BOC—A Comparison, Federal Reserve Banks, at 1(Jan. 7, 2009), available on the Internet at: https://web.archive.org/web/20091071011808/https://www.frbservices.org/files/eventseducation/ pdf/pop_arc_boc_comparison.pdf (attached as Exhibit 13 from the Defendant Wells Fargo Bank, N.A.'s Answer dated Aug. 14, 2018), 3 pgs.
Quinn and Roberds, *The Evolution of the Check as a Means of Payment: A Historical Survey,* Federal Reserve Bank of Atlanta, Economic Review, 2008, 30 pgs.
Petition filed by Wells Fargo Bank, N.A. for Covered Business Method Review of Claims 1-20 of U.S. Pat. No. 9,818,090, dated Nov. 8, 2018, 90 pgs.
Petition filed by Wells Fargo Bank, N.A. for Covered Business Method Review of Claims 1-20 of U.S. Pat. No. 9,336,517, dated Nov. 8, 2018, 98 pgs.
Petition filed by Wells Fargo Bank, N.A. for Covered Business Method Review of Claims 1-20 of U.S. Pat. No. 8,977,571, dated Nov. 8, 2018, 95 pgs.
Petition filed by Wells Fargo Bank, N.A. for Covered Business Method Review of Claims 1-23 of U.S. Pat. No. 8,699,779, dated Nov. 8, 2018, 101 pgs.
"Refractive index" Wikipedia, the free encyclopedia; http://en.wikipedia.org/wiki/refractiveindex.com Oct. 16, 2007 (4 pgs).
"Remote check deposit is the answer to a company's banking problem," Daily Breeze, Torrance, CA, Nov. 17, 2006, 2 pgs.

(56) References Cited

OTHER PUBLICATIONS

"Remote Deposit Capture", Plante & Moran, http://plantemoran.com/industries/fincial/institutions/bank/resources/community+bank+advisor/2007+summer+issue/remote+deposit+capture.htm, Cited in U.S. Pat. No. 7,900,822, as dated 2007 (3 pgs).

"Remote Deposit" National City, http://www.nationalcity.com/smallbusiness/cashmanagement/remotedeposit/default.asp; Cited in U.S. Pat. No. 7,900,822, as dated 2007 (1 pg).

Rockwell, *The Megapixel Myth*, KenRickwell.com, 2008, located on the Internet at: http://kewrockwell.com.tech/mpmyth.htm, 6 pgs.

"Save on ATM Fees", RedEye Edition, Chicago Tribune, Chicago, IL Jun. 30, 2007 (2 pgs).

Shah, *Moore's Law*, Continuous Everywhere but Differentiable Nowhere, Feb. 12, 2009, located on the Internet at: http://samjshah.com/2009/02/24/morres-law/, 5 pgs.

"SNB Check Capture: SmartClient User's Guide," Nov. 2006, 21 pgs.

SONY Digital Camera User's Guide/ Trouble Shooting Operating Instructions, copyright 2005, located on the Internet at: https://www.sony.co.uk/electronics/support/res/manuals/2654/26544941M.pdf (attached as Exhibit 3 from the Defendant Wells Fargo Bank N.A.'s Answer dated Aug. 14, 2018), 136 pgs.

Sumits, *Major Mobile Milestones—The Last 15 Years, and the Next Five*, Cisco Blogs, Feb. 3, 2016, located on the Internet at: https://blogs.cisco.com/sp/mobile-vni-major-mobile-milesrones-the-last15-years-and-the-next-five, 12 pgs.

"Switching Made Easy," Bank of North Georgia, http://www.banknorthgeorgia.com/cmsmaster/documents/286/documents616.pdf, 2007 (7 pgs).

"Two Words Every Business Should Know: Remote Deposit," Canon, http://www.rpsolutions.com/rpweb/pdfs/canon_rdc.pdf, 2005 (7 pgs).

"Virtual Bank Checks", Morebusiness.com, http://www.morebusiness.com/running_your business/businessbits/d908484987.brc, Cited in U.S. Pat. No. 7,900,822, as dated 2007 (3 pgs).

"WallStreetGrapevine.com" Stocks on the Rise: JADG, BKYI, MITK; Mar. 3, 2008 (4 pgs).

Wausau Financial Systems, *Understanding Image Quality & Usability Within a New Environment*, 2006, 22 pgs.

"What is check Fraud", National Check Fraud Center, http://www.ckfraud.org/ckfraud.html, Cited in U.S. Pat. No. 7,900,822, as dated 2007 (12 pgs).

"Exchangeable image file format for digital still cameras: Exif Version 2.2," Standard of Electronics and Information Technology Industries Associate, JEITA CP-3451, Technical Standardization Committee on AV & IT Storage Systems and Equipments, Japan Electronics and Information Technology Industries Association, Apr. 2002 (154 pgs). (retrieved from: http://www.exif.org/Exif2-2.PDF).

Affinity Federal Credit Union, "Affinity Announces Online Deposit," Aug. 4, 2005 (1 pg).

Albrecht, W. Steve, "Check Kiting: Detection, Prosecution and Prevention," The FBI Law Enforcement Bulletin, Nov. 1, 1993 (6 pgs).

Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).

Amber Avalona-Butler / Paraglide, "At Your Service: Best iPhone Apps for Military Lifestyle," Jul. 9, 2010 (2 pgs).

Anderson, Milton M. "FSML and Echeck", Financial Services Technology Consortium, 1999 (17 pgs).

Aradhye, Hrishikesh B., "A Generic Method for Determining Up/Down Orientation of Text in Roman and Non-Roman Scripts," Pattern Recognition Society, Dec. 13, 2014, 18 pages.

Archive Index Systems; Panini My Vision X-30 or VX30 or X30 © 1994-2008 Archive Systems, Inc. P./O. Box 40135 Bellevue, WA USA 98015 (2 pgs).

Associate of German Banks, SEPA 2008: Uniform Payment Instruments for Europe, Berlin, Cited in U.S. Pat. No. 7,900,822, as dated Jul. 2007, Bundesverbankd deutscher banken ev, (42 pgs).

Automated Merchant Systems, Inc., "Electronic Check Conversion," http://www.automatedmerchant.com/electronic_check_conversion.cfm, 2006, downloaded Oct. 18, 2006 (3 pgs).

Bank Systems & Technology, Untitled Article, May 1, 2006, http://www.banktech.com/showarticle.jhtml? articleID=187003126, "Are you Winning in the Payment World?" (4 pgs).

BankServ, "DepositNow: What's the difference?" Cited in U.S. Pat. No. 7,970,677, as dated 2006, (4 pgs).

BankServ, Product Overview, http://www.bankserv.com/products/remotedeposit.htm, Cited in U.S. Pat. No. 7,970,677, as dated 2006, (3 pgs).

Bills, Steve, "Automated Amount Scanning Is Trend in Remote-Deposit," American Banker, New York, NY, Aug. 30, 2005, (3 pgs).

Blafore, Bonnie "Lower Commissions, Fewer Amenities", Better Investing, Madison Heights: Feb. 2003, vol. 52, Iss 6, (4 pgs).

BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).

Blue Mountain Consulting, from URL: www.bluemontainconsulting.com, Cited in U.S. Pat. No. 7,900,822, as dated Apr. 26, 2006 (3 pgs).

Board of Governors of the federal reserve system, "Report to the Congress on the Check Clearing for the $21^{st}$ Century Act of 2003" Apr. 2007, Submitted to Congress pursuant to section 16 of the Check Clearing for the $21^{st}$ Century Act of 2003, (59 pgs).

Braun, Tim, "Camdesk—Towards Portable and Easy Document Capture," Image Understanding and Pattern Recognition Research Group, Department of Computer Science, University of Kaiserslautern, Technical Report, Mar. 29, 2005 (64 pgs). (Retrieved from: https://pdfs.semanticscholar.org/93b2/ea0d12f24c91f3c46fa1c0d58a76bb132bd2.pdf).

Bruene, Jim; "Check Free to Enable In-Home Remote Check Deposit for Consumers and Small Business", NetBanker. Com, Financial Insite, Inc., http://www. netbanker.com/2008/02/checkfree_to_enableinhome_rem.html, Feb. 5, 2008 (3 pgs).

Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).

Bruno, M., "Instant Messaging," Bank Technology News, Dec. 2002 (3 pgs).

Burnett, J. "Depository Bank Endorsement Requirements," BankersOnline.com, http://www.bankersonline.com/cgi-bin/printview/printview.pl, Jan. 6, 2003 (3 pgs).

Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).

Carrubba, P. et al., "Remote Deposit Capture: A White Paper Addressing Regulatory, Operational and Risk Issues," NetDeposit Inc., 2006 (11 pgs).

Century Remote Deposit High-Speed Scanner User's Manual Release 2006, (Century Manual), Century Bank, 2006, (32 pgs).

Chiang, Chuck, The Bulletin, "Remote banking offered", http://bendbulletin.com/apps/pbcs.dll/article?AID=/20060201/BIZ0102/602010327&templ . . . , May 23, 2008 (2 pgs).

CNN.com/technology, "Scan, deposit checks from home", www.cnn.com/2008ITECH/biztech/02/07/check.scanning.ap/index.html, Feb. 7, 2008 (3 pgs).

Constanzo, Chris, "Remote Check Deposit: Wells Captures a New Checking Twist", Bank Technology News Article—May 2005, www.americanbanker.com/btn_article.html?id=20050502YQ50FSYG (2 pgs).

Craig, Ben, "Resisting Electronic Payment Systems: Burning Down the House?", Federal Reserve Bank of Cleveland, Jul. 1999 (4 pgs).

Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).

(56) References Cited

OTHER PUBLICATIONS

Credit Union Journal, "The Ramifications of Remote Deposit Capture Success", www.cuiournal.com/orintthis.html?id=20080411 EODZT57G, Apr. 14, 2008 (1 pg).
Credit Union Journal, "AFCU Averaging 80 DepositHome Transactions per Day", Credit Union Journal, Aug. 15, 2005 (1 pg).
Credit Union Management, "When You wish Upon an Imaging System . . . the Right Selection Process can be the Shining Star," Credit Union Management, Aug. 1993, printed from the internet at <http://search.proquest.com/docview/227756409/14138420743684F7722/15?accountid=14 . . . >, on Oct. 19, 2013 (11 pgs).
DCU Member's Monthly—Jan. 2008, "PC Deposit—Deposit Checks from Home!", http://www.mycreditunionnewsletter.com/dcu/0108/page1.html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
Debello, James et al., "RDM and Mitek Systems to Provide Mobile Check Deposit," Mitek Systems, Inc., San Diego, California and Waterloo, Ontario, (Feb. 24, 2009), 2 pgs.
DeYoung, Robert; "The Financial Performance of Pure Play Internet Banks"; Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Digital Transactions News, "An ACH-Image Proposal for Check Roils Banks and Networks" May 26, 2006 (3 pgs).
Dinan, R.F. et al., "Image Plus High Performance Transaction System", IBM Systems Journal, 1990 vol. 29, No. 3 (14 pgs).
Doermann, David et al., "Progress in Camera-Based Document Image Analysis," Proceedings of the Seventh International Conference on Document Analysis and Recognition (ICDAR 2003) 0-7695-1960-1/03, 2003, IEEE Computer Society, 11 pages.
Duvall, Mel, "Remote Deposit Capture," Baseline, vol. 1, Issue 70, Mar. 2007, 2 pgs.
ECU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, Cited in U.S. Pat. No. 7,873,200, as dated Dec. 2005 (20 pgs).
Federal Reserve Board, "Check Clearing for the 21st Century Act", FRB, http://www.federalreserve.gov/paymentsystems/truncation/, Mar. 1, 2006 (1 pg).
Federal Reserve System, "12 CFR, Part 229 [Regulation CC; Docket No. R-0926]: Availability of Funds and Collection of Checks," Federal Registrar, Apr. 28, 1997, pp. 1-50.
Federal Reserve System, "Part IV, 12 CFR Part 229 [Regulation CC; Docket No. R-1176]: Availability of Funds and Collection of Checks; Final Rule," Federal Registrar, vol. 69, No. 149, Aug. 4, 2004, pp. 47290-47328.
Fest, Glen., "Patently Unaware" Bank Technology News, Apr. 2006, Retrieved from the internet at URL:http://banktechnews.com/article.html?id=2006403T7612618 (5 pgs).
Fidelity Information Services, "Strategic Vision Embraces Major Changes in Financial Services Solutions: Fidelity's long-term product strategy ushers in new era of application design and processing," Insight, 2004, pp. 1-14.

Fisher, Dan M., "Home Banking in the 21st Century: Remote Capture Has Gone Retail", May 2008 (4 pgs).
Furst, Karen et al., "Internet Banking: Developments and Prospects", Economic and Policy Analysis Working Paper Sep. 2000, Sep. 2000 (60 pgs).
Garry, M., "Checking Options: Retailers face an evolving landscape for electronic check processing that will require them to choose among several scenarios," Supermarket News, vol. 53, No. 49, 2005 (3 pgs).
German Shegalov, Diplom-Informatiker, "Integrated Data, Message, and Process Recovery for Failure Masking in Web Services", Dissertation Jul. 2005 (146 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).
Hartly, Thomas, "Banks Check Out New Image", Business First, Buffalo: Jul. 19, 2004, vol. 20, Issue 43, (3 pgs).
Heckenberg, D. "Using Mac OS X for Real-Time Image Processing" Oct. 8, 2003 (15 pgs).
Herley, Cormac, "Efficient Inscribing of Noisy Rectangular Objects in Scanned Images," 2004 International Conference on Image Processing, 4 pages.
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing forthe 21st Century Act, Check 21," ConsumersUnion.org, http://www.consumersunion.org/finance/ckclear1002.htm, Jul. 27, 2004, downloaded Oct. 18, 2006 (6 pgs).
Iida, Jeanne, "The Back Office: Systems—Image Processing Rolls on as Banks ReapBenefits," American Banker, Jul. 19, 1993, printed from the internet at <http://search.proquest.com/docview/292903245/14138420743684F7722/14?accountid=14 . . . >, on Oct. 19, 2013 (3 pgs).
Image Master, "Photo Restoration: We specialize in digital photo restoration and photograph repair of family pictures", http://www.imphotorepair.com, Cited in U.S. Pat. No. 7,900,822, as downloaded Apr. 2007 (1 pg).
Investment Systems Company, "Portfolio Accounting System," 2000, 34, pgs.
JBC, "What is a MICR Line?," eHow.com, retrieved from http://www.ehow.com/about_4684793_what-micr-line.html on May 4, 2009 (2 pgs).
Johnson, Jennifer J., Secretary of the Board; Federal Reserve System, 12 CFR Part 229, Regulation CC; Docket No. R 1176, "Availability of Funds and Collection of Checks". Cited in U.S. Pat. No. 7,900,822, as dated 2009, (89 pgs).
Kendrick, Kevin B., "Check Kiting, Float for Purposes of Profit," Bank Security & Fraud Prevention, vol. 1, No. 2, 1994 (3 pgs).
Kiser, Elizabeth K.; "Modeling the Whole Firm: The Effect of Multiple Inputs and Financial Intermediation on Bank Deposit Rates;" FEDS Working Paper No. Jul. 2004; Jun. 3, 2003; pp. 1-46 (46 pgs).
Knestout, Brian P. et al., "Banking Made Easy" Kiplinger's Personal Finance Washington, Jul. 2003, vol. 57, Iss 7 (5 pgs).
Kornai Andras et al., "Recognition of Cursive Writing on Personal Checks", Proceedings of International Workshop on the Frontiers in Handwriting Recognition, Cited in U.S. Pat. No. 7,900,822, as dated Sep. 1996, (6 pgs).
Lampert, Christoph et al., "Oblivious Document Capture and Real-Time Retrieval," International Workshop on Camera Based Document Analysis and Recognition (CBDAR), 2005 (8 pgs). (Retrieved from: http://www-cs.ccny.cuny.edu/~wolberg/capstone/bookwarp/LampertCBDAR05.pdf).

(56) References Cited

OTHER PUBLICATIONS

Levitin, Adam J., Remote Deposit Capture: A Legal and Transactional Overview, Banking Law Journal, p. 115, 2009 (RDC), 8 pgd.
Liang, Jian et al., Camera-Based Analysis of Text and Documents: A Survey, International Journal on Document Analysis and Recognition, Jun. 21, 2005, 21 pages.
Luo, Xi-Peng et al., "Design and Implementation of a Card Reader Based on Build-In Camera," Proceedings of the 17th International Conference on Pattern Recognition, 2004, 4 pages.
Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).
Matthews, Deborah, "Advanced Technology Makes Remote Deposit Capture Less Risky," Indiana Bankers Association, Apr. 2008 (2 pgs).
Metro 1 Credit Union, "Remote Banking Services," http://ww\\i.metro1cu.org/metro1cu/remote.html, downloaded Apr. 17, 2007 (4 pgs).
Mitek systems, "Imagenet Mobile Deposit", San Diego, CA, downloaded 2009 (2 pgs).
Mitek Systems: Mitek Systems Launches First Mobile Check Deposit and Bill Pay Application, San Diego, CA, Jan. 22, 2008 (3 pgs).
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," CONNOTECH Experts-conseils, Inc., Apr. 1995 (31 pgs).
Nelson, B. et al., "Remote deposit capture changes the retail landscape," Northwestern Financial Review, http://findarticles.com/p/articles/mi qa3799/is 200607/ai_n16537250, 2006 (3 pgs).
Netbank, Inc., "Branch Out: Annual Report 2004," 2004 (150 pgs).
Netbank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htm, Cited in U.S. Pat. No. 7,900,822, as dated 2006 (3 pgs).
Oxley, Michael G., from committee on Financial Services; "Check Clearing for the $21^{st}$ Century Act", $108^{th}$ Congress, $1^{st}$ Session House of Representatives report 108-132, Jun. 2003 (20 pgs).
Oxley, Michael G., from the committee of conference; "Check Clearing for the $21^{st}$ Century Act" $108^{th}$ Congress, $1^{st}$ Session Senate report 108-291, Oct. 1, 2003 (27 pgs).
Palacios, Rafael et al., "Automatic Processing of Brazilian Bank Checks". Cited in U.S. Pat. No. 7,900,822, as dated 2002 (28 pgs).
Patterson, Scott "USAA Deposit@Home—Another Wow moment for Net Banking", NextCU.com, Jan. 26, 2007 (5 pgs).
Public Law 108-100, 108 Congress; "An Act Check Clearing for the $21^{st}$ Century Act", Oct. 28, 2003, 117 STAT. 1177 (18 pgs).
Rao, Bharat; "The Internet and the Revolution in Distribution: A Cross-Industry Examination"; Technology in Society; 1999; pp. 287-306; vol. 21, No. 3 (20 pgs).
Remotedepositcapture, URL:www.remotedepositcapture.com, Cited in U.S. Pat. No. 7,900,822, as dated 2006 (5 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
RemoteDepositCapture.com, Remote Deposit Capture News Articles from Jul. 6, 2006, "BankServ Announces New Remote Deposit Product Integrated with QuickBooks" (3 pgs).

Remotedepsitcapture.com, LLC, "Remote Deposit Capture Overview," ROC Overview, http://remotedepositcapture.com/overview/RDC_overview.htm, Cited in U.S. Pat. No. 7,900,822, as dated Mar. 12, 2007 (4 pgs).
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).
Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).
Rose, Sarah et al., "Best of the We: The Top 50 Financial Websites", Money, New York, Dec. 1999, vol. 28, Iss. 12 (8 pgs).
Shelby, Hon. Richard C. (Committee on Banking, Housing and Urban Affairs); "Check Truncation Act of 2003", calendar No. 168, $108^{th}$ Congress, $1^{st}$ Session Senate report 108-79, Jun. 2003 (27 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html, © 1999-2007 (2 pgs).
The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in U.S. Pat. No. 7,900,822, as dated Dec. 2005 (3 pgs).
The Green Sheet 2.0: Newswire, "CO-OP adds home deposit capabilities to suite of check imaging products", www.greensheet.com/newswire.php?newswire_id=8799, Mar. 5, 2008 (2 pgs).
Tygar, J.D., Atomicity in Electronic Commerce, In ACM Networker, 2:2, Apr./May 1998 (12 pgs).
Valentine, Lisa, "Remote Deposit Capture Hot Just Got Hotter," ABA Banking Journal, Mar. 2006, p. 1-9.
Varearn, Craig, "Image Deposit Solutions: Emerging Solutions for More Efficient Check Processing," JP Morgan Chase, Nov. 2005 (16 pgs).
Wade, Will, "Early Debate on Remote-Capture Risk," American Banker, New York, NY, May 26, 2004 (3 pgs).
Wade, Will, "Early Notes: Updating Consumers on Check 21" American Banker Aug. 10, 2004 (3 pgs).
Wallison, Peter J., "Wal-Mart Case Exposes Flaws in Banking-Commerce Split", American Banker, vol. 167. No. 8, Jan. 11, 2002 (3 pgs).
Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).
Wells Fargo Commercial, "Remote Deposit", www.wellsfargo.com/com/treasury mgmtlreceivables/electronic/remote deposit, Copyright 2008 (1 pg).
White, J.M. et al., "Image Thresholding for Optical Character Recognition and Other Applications Requiring Character Image Extraction", IBM J. Res. Development, Jul. 1983, vol. 27, No. 4 (12 pgs).
Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).
Wikipedia ®, "Remote Deposit," http://en.wikipedia.org/wiki/Remote_deposit, 2007 (3 pgs).
Windowsfordevices.Com, "Software lets camera phone users deposit checks, pay bills", www.windowsfordevices.com/news/NS3934956670.html, Jan. 29, 2008 (3 pgs).
Wolfe, Daniel, "Check Image Group Outlines Agenda," American Banker, New York, N.Y.: Feb. 13, 2009, vol. 174, Iss. 30, p. 12. (2 pgs).

(56) References Cited

OTHER PUBLICATIONS

Woody Baird Associated Press, "Pastor's Wife got Scammed—She Apparently Fell for Overseas Money Scheme," The Commercial Appeal, Jul. 1, 2006, p. A. 1.
Zandifar, A., "A Video-Based Framework for the Analysis of Presentations/Posters," International Journal on Document Analysis and Recognition, Feb. 2, 2005, 10 pages.
Zhang, C.Y., "Robust Estimation and Image Combining" Astronomical Data Analysis Software and Systems IV, ASP Conference Series, 1995 (5 pgs).
Zions Bancorporation, "Moneytech, the technology of money in our world: Remote Deposit," http://www.bankjunior.com/pground/moneytech/remote_deposit.jsp, 2007 (2 pgs).
"Quicken Bill Pay", Retrieved from the Internet on Nov. 27, 2007 at: <URL:http://quicken intuit.com/quicken-bill-pay-jhtml>, 2 pgs.
"Start to Simplify with Check Imaging a Smarter Way to Bank", Retrieved from the Internet on Nov. 27, 2007, at: <URL: http://www.midnatbank.com/Internet%20Banking/internet_Banking.html>, 3 pgs.
MotoManual, MOTOROKR-E6-GSM-English for wireless phone, copyright 2006, 144 pgs.
CBM2019-00005 U.S. Pat. No. 8,699,779, Patent Owner's Sur-Reply Brief to Petitioner's Reply Brief to Patent Owner Preliminary Response Pursuant to Authorization Provided in Paper No. 15, dated May 1, 2019, 7 pgs.
CBM2019-00004 U.S. Pat. No. 8,977,571, Defendant's Claim Construction Brief, *United Services Automobile Association v. Wells Fargo Bank, N.A.*, Civil Action No. 2:18-cv-245, dated Apr. 25, 2019, 36 pgs.
CBM2019-00004 U.S. Pat. No. 8,977,571, Patent Owner's Sur-Reply Brief to Petitioner's Reply Brief to Patent Owner Preliminary Response Pursuant to Authorization Provided in Paper 14, dated Apr. 30, 2019, 7 pgs.
USAA's Reply to Claim Construction Brief, *United Services Automobile Association v. Wells Fargo Bank, N.A.*, Civil Action No. 2:18-cv-245, dated May 2, 2019, 15 pgs.
Plaintiff and Counterclaim Defendant's Answer to Defendant and Counterclaims Plaintiff's Amended Answer, Affirmative Defenses, & Counterclaims, *United Services Automobile Association v. Wells Fargo Bank, N.A.*, Civil Action No. 2:18-cv-366, dated Apr. 26, 2019, 18 pgs.
USAA's Reply Claim Construction Brief, *United Services Automobile Association v. Wells Fargo Bank, N.A.*, Civil Action No. 2:18-cv-245, dated May 2, 2019, 227 pgs.
Parties' P.R. 4-5(D) Joint Claim Construction Chart, *United Services Automobile Association v. Wells Fargo Bank, N.A.*, Civil Action No. 2:18-cv-245, dated May 9, 2019, 25 pgs.
CBM2019-00002 U.S. Pat. No. 9,818,090, Decision Denying Institution of Covered Business Method Patent Review 37 C.F.R. § 42.208, dated Apr. 26, 2019, 5 pgs.
CBM2019-00003 U.S. Pat. No. 9,336,517, Decision Denying Institution of Covered Business Method Patent Review 37 C.F.R. § 42.208, dated Jun. 3, 2019, 28 pgs.
CBM2019-00004 U.S. Pat. No. 8,977,571, Decision Denying Institution of Covered Business Method Patent Review 37 C.F.R. § 42.208, dated May 15, 2019, 33 pgs.
CBM2019-00005 U.S. Pat. No. 8,699,779, Decision Denying Institution of Covered Business Method Patent Review 37 C.F.R. § 42.208, dated Jun. 3, 2019, 27 pgs.
USAA's Opening Claim Construction Brief, filed in Civil Action No. 2:18-CV-366, dated May 17, 2019, 32 pgs.
Defendant's Claim Construction Brief, filed in Civil Action No. 2:18-CV-366, dated May 31, 2019, 111 pgs.
Plaintiff's Notice of Filing Claim Construction Presentation, filed in Civil Action No. 2:18-CV-245, dated May 23, 2019, 106 pgs.
IPR2019-01081 U.S. Pat. No. 9,336,517, Petition tor Inter Partes Review of Claims 1, 5-10, 12-14, 17-20 of U.S. Pat. No. 9,336,517, dated Jun. 5, 2019, 78 pgs.
IPR2019-01082 U.S. Pat. No. 8,977,571, Petition tor Inter Partes Review of Claims 1-13 U.S. Pat. No. 8,977,571, dated Jun. 5, 2019, 75 pgs.
IPR2019-01083 U.S. Pat. No. 8,699,779, Petition tor Inter Partes Review of Claims 1-18 U.S. Pat. No. 8,699,779, dated Jun. 5, 2019, 74 pgs.
Plaintiff's Notice of Decisions Denying Institution of Covered Business Method Patent Review, filed in Civil Action No. 2:18-CV-245, dated Jun. 6, 2019, 61 pgs.
Claim Construction Memorandum Opinion and Order, filed in Civil Action No. 2:18-CV-245, dated Jun. 13, 2019, 48 pgs.
Parties' P.R.4-5(D) Joint Claim Construction Chart, filed in Civil Action No. 2:18-CV-245, dated Jun. 14, 2019, 28 pgs.
Defendant's Claim Construction Brief, filed in Civil Action No. 2:18-CV-366, dated May 31, 2019, 28 pgs.
USAA's Reply Claim Construction Brief, filed in Civil Action No. 2:18-CV-366, dated Jun. 7, 2019, 14 pgs.
Wells Fargo's Objections to Magistrate Judge Payne's Claim Construction Memorandum Opinion and Order, filed in Civil Action No. 2:18-CV-245, dated Jun. 27, 2019, 7 pgs.
USAA's Objections to Magistrate Judge Payne's Claim Construction Memorandum Opinion and Order, filed in Civil Action No. 2:18-CV-245, dated Jun. 27, 2019, 6 pgs.
Parties' P.R. 4-5(D) Joint Claim Construction Chart, filed in Civil Action No. 2:18-CV-366, dated Jun. 18, 2019, 27 pgs.
IPR2019-00815, Invalidity Chart, uploaded on Jun. 27, 2019, 94 pgs.
IPR2019-00815, United Services Automobile Association ("USAA")'s Patent Owner Preliminary Response, dated Jun. 27, 2019, 66 pgs.
IPR2019-00815, Supplemental Invalidity Chart, dated on Jun. 27, 2019, 16 pgs.
IPR2019-00815, Declaration of Matthew A. Calman in Support of Patent Owner Preliminary Response, dated Jun. 27, 2019, 25 pgs.
CBM 2019-00027, Declaration of Bharat Prasad, dated Jul. 8, 2019, 32 pgs.
CBM 2019-00027, Patent Owner Preliminary Response and Exhibits 2001-1042, dated Jul. 8, 2019, 91 pgs.
CBM 2019-00028, United Services Automobile Association ("USAA")'s Patent Owner Preliminary Response, dated Jul. 8, 2019, 73 pgs.
CBM2019-00028, Declaration of Matthew A. Calman in Support of Patent Owner Preliminary Response, dated Jul. 8, 28 pgs.
CBM2019-00028, Malykhina, Elena "Get Smart", Copyright 2006 by ProQuest Information and Learning Company, 6 pgs.
CBM2019-00028, Palm Treo 700W Smartphone manual, Copyright 2005 by Palm, Inc., 96 pgs.
CBM2019-00028, 00000 C720w User Manual for Windows Mobile Smart Phone, Copyright 2006, 352 pgs.
CBM2019-00028, "Smarter Than Your Average Phone", Copyright 2006 by Factiva, 4 pgs.
CBM2019-00028, "64 Million Smart Phones Shipped Worldwide in 2006", Canalys Newsroom, 2006, 3 pgs.
CBM2019-00028, Nokia 9500 Communicator user Guide, Copyright 2006 by Nokia Corporation, 112 pgs.
CBM2019-00028, Robinson, Daniel, "Client Week—Handsets advance at 3GSM", Copyright 2004 by VNU Business Publications Ltd., 2 pgs.
CBM2019-00028, Burney, Brett "MacBook Pro with Intel processor is fast, innovative", Copyright 2006 by Plain Dealer Publishing Co., 2 pgs.
CBM2019-00028, 17-inch MacBook Pro User's Guide, Copyright 2006 by Apple Computer, Inc., 144 pgs.
CBM2019-00028, Wong, May "HP unveils new mobile computers", Copyright 2006 by the Buffalo News, 2 pgs.
CBM2019-00028, Jewell, Mark "Cell Phone Shipments Reach Record 208M", Copyright 2005 by Associated Press, 1 pg.
CBM 2019-00028, Lawler, Ryan "Apple shows Intel-based Macs, surge in revenue", Copyright 2006 by the Yomiuri Shimbun, 2 pgs.
CBM 2019-00028, Aspire 9800 Series User Guide, Copyright 2006 by Acer International, 122 pgs.
CBM 2019-00028, Dell XPS M1210 Owner's Manual, Copyright 2006 by Dell Inc., 192 pgs.

(56) References Cited

OTHER PUBLICATIONS

CBM 2019-00028, Estridge, Bonnie "Is your phone smart enough?: The series that cuts through the technobabble to bring you the best advice on the latest gadgets", Copyright 2006 by XPRESS—A1 Nsr Media, 3 pgs.
CBM 2019-00028, "Motorola, Palm collaborate on smart phone", Copyright 2000 by Crain Communications, Inc., 1 pg.
CBM 2019-00028, Nasaw, Daniel "Viruses Pose threat to 'Smart' Cellphones—Computer Programs Could Cripple Devices and Shut Down Wireless Networks", Copyright 2004 by Factiva, 2 pgs.
CBM 2019-00028, Seitz, Patrick "Multifunction Trend Shaking Up the Handheld Device industry; Solid Sales Expected in 2004; PDA, handset, camera—one single, small product can fill a variety of roles", Copyright 2004 Investor's Business Daily, Inc., 3 pgs.
Microsoft Mobile Devices Buyer's Guide, 2002, 4 pgs.
Microsoft Mobile Devices Smartphone, 2003, 2 pgs.
Plaintiff's Notice of Decision Denying Institution of Covered Business Method Patent Review, filed in Civil Action No. 2:18-CV-245, dated May 15, 2019, 36 pgs.
Defendant's Claim Construction Brief, filed in Civil Action No. 2:18-CV-366, dated Jun. 24, 2019, 28 pgs.
CBM2019-00029, United Services Automobile Association (USAA)'s Patent Owner Preliminary Response, dated Jul. 17, 2019, 76 pgs.
CBM2019-00029, Declaration of Matthew A. Calman in Support of Patent Owner Preliminary Response, dated Jul. 17, 2019, 29 pgs.
CBM2019-00029, Defendant's Claim Construction Brief, filed in Civil Action No. 2:18-CV-366, dated May 31, 2019, 28 pgs.
CBM2019-00029, Palenchar, Joseph, "PDA Phone Adds WiFi VoIP, Turn-by-Turn GPS Navigation", Copyright 2006 by Reed Business Information, 2 pgs.
CBM2019-00029, HP User Guide, Additional Product Information, Copyright 2006 by Hewlett-Packard Development Company, L.P., 204 pgs.
CBM2019-00029, Pocket PC User Manual, Version 1, dated May 2006 by Microsoft, 225 pgs.
CBM2019-00029, "Dynamism.com: Take tomorrow's tech home today with Dynamism.com: Latest gadgets merge next generation technology with high style design", Copyright 2006 Normans Media Limited, 2 pgs.
IPR2019-00815, Federal Reserve Financial Services Retired: DSTU X9.37-2003, Specifications for Electronic Exchange of Check and Image Data, Copyright 2006 by Accredited Standards Committee X9, Inc., dated Mar. 31, 2003, 157 pgs.
IPR2019-01081, Declaration of Peter Alexander, Ph.D, dated Jun. 5, 2019, 135 pgs.
USAA's Opening Claim Construction Brief, *United Services Automobile Association* v. *Wells Fargo Bank, N.A.,* Civil Action No. 2:18-cv-245, dated Apr. 11, 2019, 32 pgs.
P.R. 4-3 Joint Claim Construction and Pre-Hearing Statement, *United Services Automobile Association* v. *Wells Fargo Bank, N.A.,* Civil Action No. 2:18-cv-366, dated Apr. 5, 2019, 190 pgs.
Defendant Wells Fargo Bank, N.A.'s Amended Answer, Affirmative Defenses, and Counterclaims to Plaintiff's Complaint, *United Services Automobile Association* v. *Wells Fargo Bank, N.A.,* Civil Action No. 2:18-cv-366, dated Apr. 12, 2019, 32 pgs.
Plaintiff and Counterclaim Defendant's Answer to Defendant and Counterclaims Plaintiff's Amended Answer, Affirmative Defenses, & Counterclaims, *United Services Automobile Association* v. *Wells Fargo Bank, N.A.,* Civil Action No. 2:18-cv-245, dated Mar. 21, 2019, 36 pgs.
Andrew S. Tanenbaum, Modern Operation Systems, Second Edition 2001.
Arnold et al, The Java Programming Language, Fourth Edition 2005.
Consumer Assistance & Information—Check 21 https://www.fdic.ov/consumers/assistance/ protection/check21 .html FDIC.
Halonen et al., GSM, GPRS, and EDGE Performance: Evolution Towards 3G/UMTS, Second Edition 2003.
Heron, Advanced Encryption Standard AES, 12 Network Security Aug. 2009.

Immich et al., Performance Analysis of Five Interprocess Communication Mechanisms Across UNIX O eratin S stems, 68 J. S ss. & Software 27 2003.
Leach, et al., A Universally Unique Identifier (UUID) URN Namespace, (Jul. 2005 retrieved from https://www.ietf.or_/rfc/rfc4122.txt.
N. Ritter & M. Ruth, The Geo Tiff Data Interchange Standard for Raster Geo ra hic Ima es, 18 Int. J. Remote Session 1637 1997.
Pbmplus—image file format conversion package, retrieved from https://web.archive.org/web/20040202224728/https:/www.acme.com/software/pbm lus/.
Petition filed by PNC Bank N.A. for Inter Partes Review of Claims 1-23 of U.S. Pat. No. 10,482,432 dated Jul. 14, 2021 , IPR2021-01071 , 106 a es.
Petition filed by PNC Bank N.A. for Inter Partes Review of Claims 1-7, 10-21 and 23 of U.S. Pat. No. 10,482,432, dated Jul. 14, 2021 , IPR2021-01074.
Petition filed by PNC Bank N.A. for Inter Partes Review of Claims 1-18 of U.S. Pat. No. 10,621,559, dated Jul. 21, 2021 , IPR2021-01076, 1 1 1 pages.
Petition filed by PNC Bank N.A. for Inter Partes Review of Claims 1-18 of U.S. Pat. No. 10,621,559, filed Jul. 21, 2021 , IPR2021-01077; 100 pages.
Petition filed by PNC Bank N.A. for Inter Partes Review of Claims 1-30 of Patent 3,681 , filed Aug. 27, 2021, IPR2021-01381 , 127 pages.
Petition filed by PNC Bank N.A. for Inter Panes Review of U.S. Pat. No. 10,013,605, filed Aug. 27, 2021 , IPR2021-01399, 1 13 pages.
Readdle, Why Scanner Pro is way Better Than Your Camera? (Jun. 27, 2016) retrieved from https://readdle.com/bloq/why-scanner-pro-is-way-better-than-yourcamera.
Santomero, The Evolution of Payments in the U.S.: Paper vs. Electronic (2005) retrieved from https://web.archive.org/web/20051210185509/https://www.philadelphiafed.org/pu_blicaffairs/s eeches/2005 santomer09.html.
Schindler, Scanner Pro Review (Dec. 27, 2016) retrieved from https://www. cma .com/reviews/scanner- ro.
Sing Li & Jonathan Knudsen, Beginning J2ME: From Novice to Professional, Third Edition 2005 , ISBN bk : 1-59059-479-7, 468 a es.
Wang, Ching-Lin et al. "Chinese document image retrieval system based on proportion of black pixel area in a character image", the 6th International Conference on Advanced Communication Technology, 2004, vol. 1 , IEEE, 2004.
Zaw, Kyi Pyar and Zin Mar Kyu, "Character Extraction and Recognition for Myanmar Script Signboard Images using Block based Pixel Count and Chain Codes" 2018 IEEE/ACIS 1 7th International Conference on Computer and Information Science CS , IEEE, 2018.
Jung et al, "Rectangle Detection based on a \Mndowed Hough Transform", IEEE Xplore, 2004, 8 pgs.
Craig Vaream, "Image Deposit Solutions" Emerging Solutions for More Efficient Check Processing, Nov. 2005, 16 pages.
Certificate of Accuracy related to Article entitled, "Deposit checks by mobile" on webpage: https_://www.elmundo.es/naveqante/2005/07/21/empresas/1_121957427._html signed by Christian Paul Scroum translator on Sep. 9, 2021.
Fletcher, Lloyd A,, and Rangachar Kasturi, "A robust algorithm for text string separation from mixed text/graphics images", IEEE transactions on pattern analysis and machine intelligence 10.6 (1988), 910-918 (1988).
IPR 2022-00076 filed Nov. 17, 2021 on behalf of PNC Bank N.A., 98 pages.
IPR 2022-00075 filed Nov. 5, 2021 on behalf of PNC Bank N.A., 90 pages.
IPR 2022-00050 filed Oct. 22, 2021 on behalf of PNC Bank N.A., 126 pages.
IPR 2022-00049 filed Oct. 22, 2021 on behalf of PNC Bank N.A., 70 pages.
*About Network Servers,* GlobalSpec (retrieved from https://web.archive.org/web/20051019130842/http://globalspec.com80/LearnMore/Networking_Communication_Equipment/Networking_Equipment/Networking_Servers ("GlobalSpec").

(56) References Cited

OTHER PUBLICATIONS

FDIC: Check Clearing for the 21$^{st}$ Century act (Check21), FED. Deposit Ins. Corp., Apr. 25, 2016 (retrieved from https://web.archive.org/web/20161005124304/https://www.fdic.gov/consumers/assistance/protection/check21.html ("FDIC").
Bieniecki, Wojciech et al. "Image Preprocessing for Improving OCR Accuracy", Computer Engineering Department, Technical University of Lodz, al. Politechniki 11, Lodz Poland, May 23, 2007.
Shaikh, Aijaz Ahmed et al., "Auto Teller Machine (ATM) Fraud—Case Study of Commercial Bank in Pakistan", Department of Business Administration, Sukkur Institute of Business Administration, Sukkur, Pakistan, Aug. 5, 2012.
Bruno-Britz, Maria "Mitek Launches Mobile Phone Check Capture Solution," Bank Systems and Technologies Information Week (Jan. 24, 2008).
V User Guide, https://www.lg.com/us/support/manualsdocuments?customerModelCode=%20LGVX9800&csSalesCode=LGVX9800, select"VERISON(USA) en"; The V_UG_051125.pdf.
MING Phone User Manual, 2006.
Patel, Kunur, "How Mobile Technology is Changing Banking's Future" AdAge, Sep. 21, 2009, 4 pages.
Spencer, Harvey, "Controlling Image Quality at the Point of Capture" Check 21, Digital Check Corporation & HSA 2004.
Moseik, Celeste K., "Customer Adoption of Online Restaurant Services: A Multi-Channel Approach", Order No. 1444649 University of Delaware, 2007, Ann Arbor: ProQuest., Web. Jan. 10, 2022 (Year: 2007).
ANS X9.100-160-1-2004, Part 1: Placement and Location of Magnetic Ink Printing (MICR), American National Standard for Financial Services, approved Oct. 15, 2004.
Clancy, Heather, "Turning cellphones into scanners", The New York Times, Feb. 12, 2005; https://www.nytimes.com/2005/02/12/busienss/worldbusiness/turning-cellphones-into-scanners.htmi.
Consumer Guide to Check 21 and Substitute Checks, The Federal Reserve Board, The Wayback Machine—Oct. 28, 2004; https://web.archive.org/web/20041102233724/http://www.federalreserve.gov.
Curtin, Denis P., A Short Course in Digital Photography Chapter 7 Graphic File Formats.
Dance, Christopher, "Mobile Document Imaging", Xerox, Research Centre Europe, XRCE Image Processing Area, Nov. 2004.
Digital Photography Now, Nokia N73 Review, Oct. 28, 2006.
Federal Reserve System, 12 CFR Part 229, Regulation CC: Docket No. R-1176, Availability of Funds and Collection ofChecks, Board of Governors of the Federal Reserve System Final rule.
Financial Services Policy Committee, Federal Reserve Banks Plan Black-and-White Image Standard and Quality Checks, May 18, 2004.
MICR-Line Issues Associated With the Check 21 Act and the Board's Proposed Rule, Prepared by Federal Reserve Board Staff, Apr. 27, 2004.
Microsoft Computer Dictionary Fifth Edition—Copyright 2002.
HTTP Over TLS, Network Working Group, May 2000, Memo.
Nokia N73—Full phone specifications.
Ranjan, Amit, "Using a Camera with Windows Mobile 5", Jul. 21, 2006.
Reed, John, "FT.com site: Mobile users branch out", ProQuest, Trade Journal, Oct. 6, 2005.
Weiqui Luo et al., "Robust Detection of Region-Duplication Forgery in Digital Image" Guoping Qui, School of Computer Science, University of Nottingham, NG8 1 BB, UK—Jan. 2006.
Final Written Decision relating to U.S. Pat. No. 8,699,779, IPR2021-01070, Jan. 19, 2023.
Final Written Decision relating to U.S. Pat. No. 8,977,571, IPR2021-01073, Jan. 19, 2023.
Final Written Decision relating to U.S. Pat. No. 10,621,559, IPR2021-01077, Jan. 20, 2023.

Figure 2

CHARACTER COUNT DETERMINATION FOR A DIGITAL IMAGE

CROSS-REFERENCE TO RELATED APPLICATION(S)

This application is a continuation of U.S. patent application Ser. No. 16/707,925, filed Dec. 9, 2019 (pending), which is a continuation of U.S. patent application Ser. No. 16/368,202, filed Mar. 28, 2019, (now U.S. Pat. No. 11,144, 753 issued on Oct. 12, 2021), which is a continuation of Ser. No. 15/884,990, filed on Jan. 31, 2018, (now U.S. Pat. No. 10,360,448 issued on Jul. 2, 2019), which is a continuation of U.S. patent application Ser. No. 15/014,918, filed on Feb. 3, 2016 (now U.S. Pat. No. 9,904,848 issued Feb. 27, 2018), which is a continuation of U.S. patent application Ser. No. 14/056,565 (now U.S. Pat. No. 9,286,514 issued on Mar. 15, 2016), filed on Oct. 17, 2013, the entirety of all of which are incorporated by reference herein.

BACKGROUND

1. Technical Field

This disclosure relates to determining a character count for an image, such as a financial document image. This disclosure also relates to determining the character count of the image without recognizing the identity of the characters in the image.

2. Description of Related Art

Systems may receive digital images for processing. As one example, an electronic device may capture an image of a financial document, such as a check. The user can submit the image of the check to a financial institution server for processing and deposit of the check. However, the check image may be degraded in multiple ways. The check may be overly cropped by the user such that important fields or portions of the check are cropped out of the check image. The image capture device of the electronic device may capture a blurry image of the check. These degradations may inhibit subsequent processing of the check image.

BRIEF SUMMARY

The descriptions below include methods, systems, logic, and devices for processing an image and determining a number of characters in the image with recognizing or attempting to recognize the actual text or characters in the image. In one aspect, a method is performed by circuitry, such as a processor, in an electronic device. The method performed by the circuitry includes receiving a financial document image and identifying a text chunk in the financial document image by determining a first pixel of the financial document image as the top left pixel of the text chunk based on a top left score of the first pixel and determining a second pixel of the financial document image as top right pixel of the text chunk based on a top right score of the second pixel. The method further includes determining a character count for the text chunk without recognizing any particular character in the text chunk.

In another aspect, a system includes a memory and a processor. The processor is operable to receive a financial document image and identify a text chunk in the financial document image by determining a first pixel of the financial document image as top left pixel of the text chunk based on a top left score of the first pixel and determining a second pixel of the financial document image as top right pixel of the text chunk based on a top right score of the second pixel. The processor is also operable to determine a chunk extension for the text chunk and add the chunk extension to the text chunk. After adding the chunk extension to the text chunk, the processor is operable to determine a character count for the text chunk without recognizing any particular character in the text chunk.

In another aspect, a non-transitory computer readable medium includes instructions that, when executed by a processor, cause the processor to receive a financial document image; identify an interest region in the financial document image; and identify a text chunk in the interest region of the financial document image. The instructions cause the processor to identify the text chunk by determining a first pixel of the financial document image as top left pixel of the text chunk based on a top left score of the first pixel and determining a second pixel of the financial document image as top right pixel of the text chunk based on a top right score of the second pixel. The instructions also cause the processor to determine a character count for the text chunk in the interest region of the financial document image without recognizing any particular character in the text chunk; determine a character count for the interest region by summing the character count for the text chunk with a character count of any additional text chunks in the interest region; and determine whether the character count for the interest region exceeds a minimum character count threshold specifically for the interest region.

BRIEF DESCRIPTION OF THE DRAWINGS

The innovation may be better understood with reference to the following drawings and description. In the figures, like reference numerals designate corresponding parts throughout the different views.

FIG. 2 shows an example of a financial document image.

DETAILED DESCRIPTION

Figure 1:
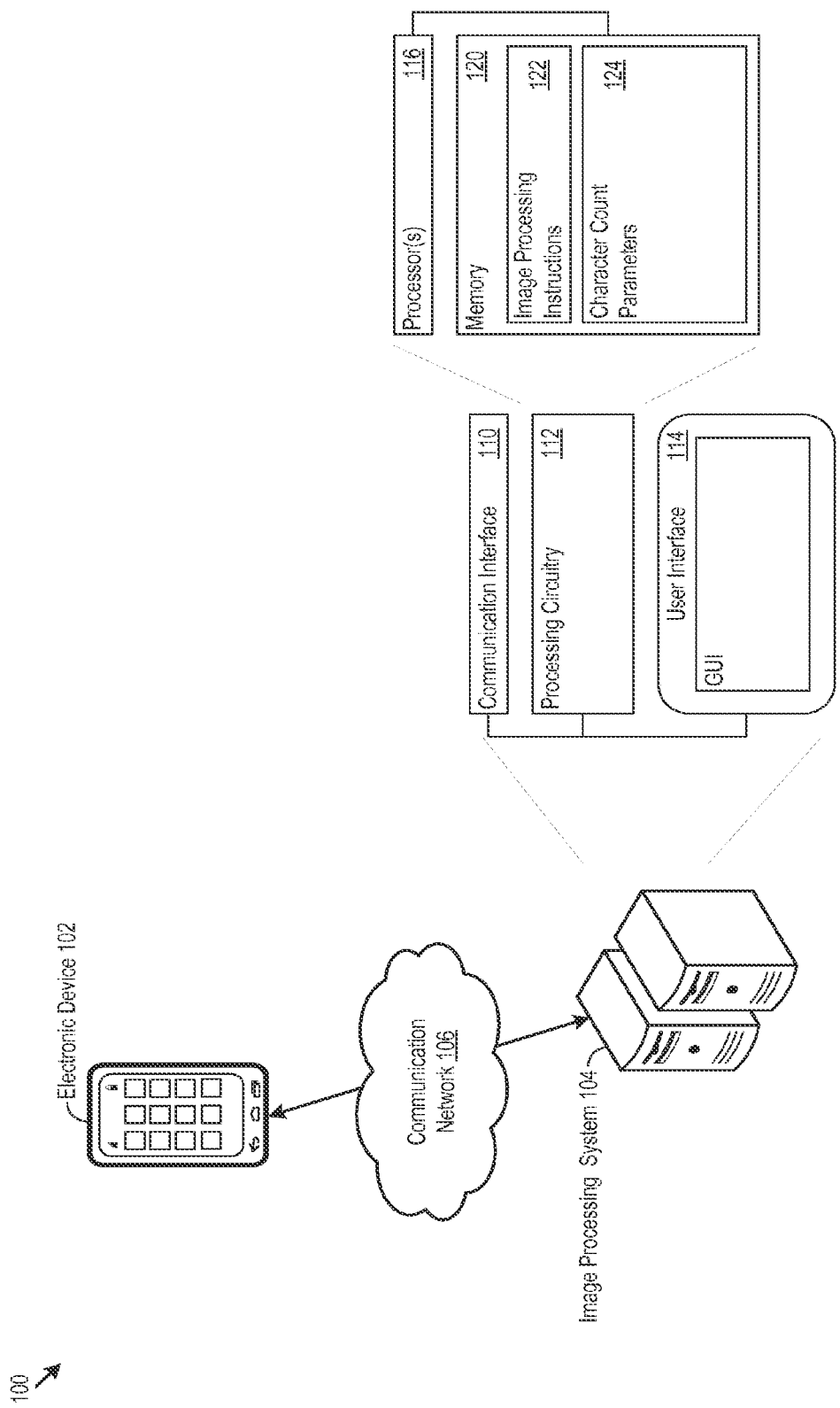
FIG. 1 shows an example of a system for determining a character count of an image.

FIG. 1 shows an example of a system 100 for determining a character count of an image. The system 100 in FIG. 1 includes an electronic device 102 communicatively linked to an image processing system 104 through a communication network 106. The electronic device 102 may include or communicate with an image capture device that captures digital images, such as a digital camera or scanning device.

In FIG. 1, the electronic device 102 is a mobile communication device, e.g., a cellular telephone with a digital camera. However, the electronic device 102 may take any number of forms, including as examples a laptop, digital camera, personal digital assistant (PDA), tablet device, portable music player, desktop computer, any image scanning device, or others. The electronic device 102 may also include any number of communication interfaces supporting communication through the communication network 106.

The communication network 106 may include any number of networks for communicating data. In that regard, the communication network 106 may include intermediate network devices or logic operating according to any communication number of mediums, protocols, topologies, or standards. As examples, the communication network 106 may communicate across any of the following mediums, protocols, topologies and standards: Ethernet, cable, DSL, Multimedia over Coax Alliance, power line, Ethernet Passive Optical Network (EPON), Gigabit Passive Optical Network (GPON), any number of cellular standards (e.g., 2G, 3G, Universal Mobile Telecommunications System (UMTS), GSM (R) Association, Long Term Evolution (LTE) (TM), or more), WiFi (including 802.11 a/b/g/n/ac), WiMAX, Bluetooth , WiGig, and more.

The exemplary system 100 shown in FIG. 1 also includes the image processing system 104. As described in greater detail below, the image processing system 104 may determine a character count for an image received by the image processing system 104. The image processing system 104 may determine the character count for the image without recognizing the content or identity of characters in the image.

In some implementations, the image processing system 104 may include a communication interface 110, processing circuitry 112, and a user interface 114. The processing circuitry 112 of the image processing system 104 may perform any functionality associated with the image processing system 104, including any combination of the image processing techniques and methods described below. In one implementation, the processing circuitry 112 includes one or more processors 116 and a memory 120. The memory 120 may store image processing instructions 122 and character count parameters 124. The character count parameters 124 may include any parameters, settings, configurations, or criteria that control how the processing circuitry 112 determines process an image, including determining of a character count for the image. In some variations, the electronic device 102, such as a mobile device, may additionally or alternatively implement any of the functionality of the processing circuitry 112 described herein.

The processing circuitry 112 may process any digital image that may include text. As examples, the processing circuitry 112 may process an image of any type of financial document, including negotiable instruments such as personal checks, business checks, money orders, promissory notes, certificate of deposits, and more. As additional examples, the processing circuitry 112 may process images of any other type, such as a image of any type of insurance form or document, tax documents (e.g., form 1040), employment forms, savings bonds, traveler's checks, job applications, any type of bill, such as an automotive repair bill or medical bill, a remittance coupon, and images of many more types.

Figure 2:
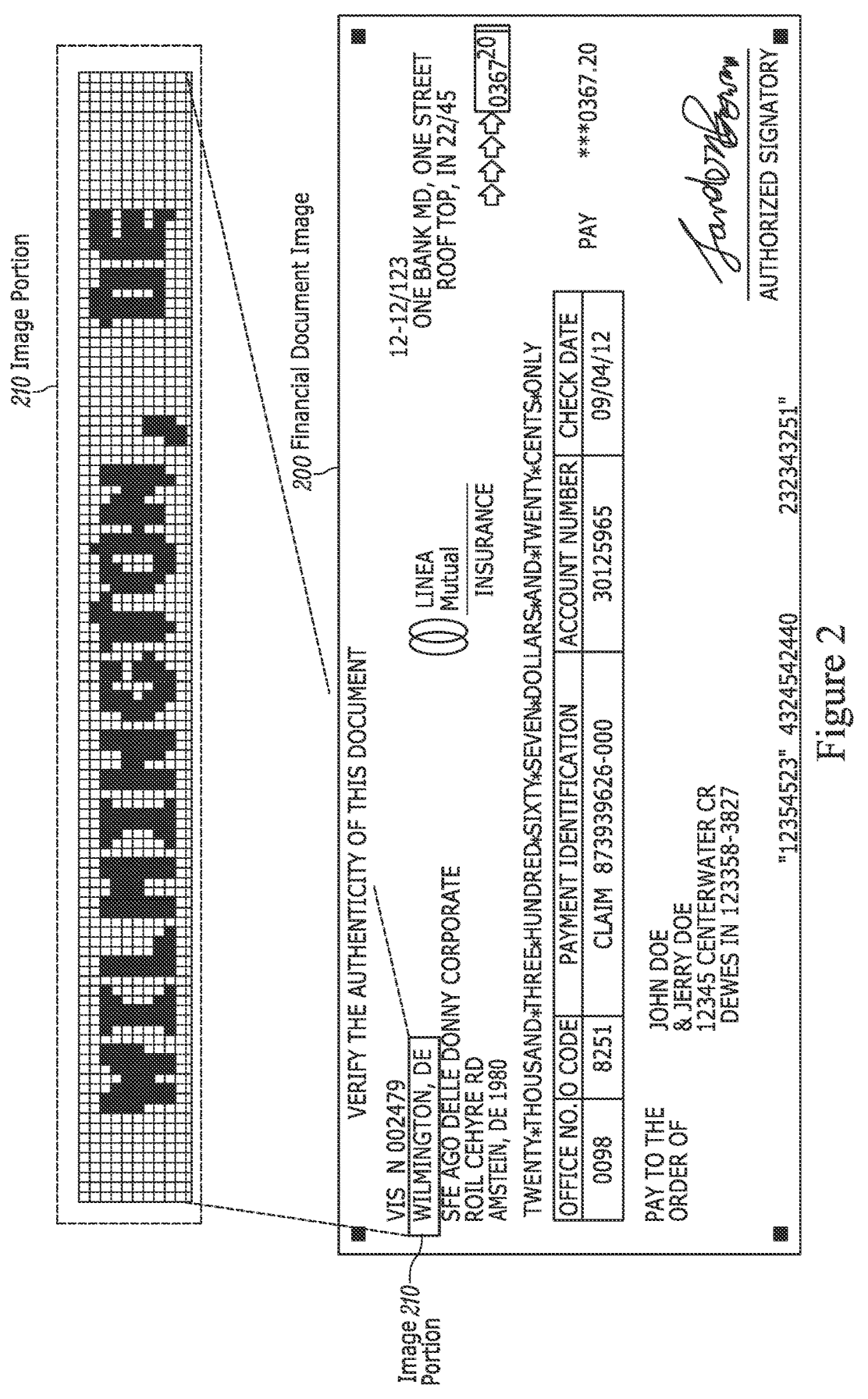

FIG. 2 shows an example of a financial document image 200 that the processing circuitry 112 may determine a character count for. A financial document image may refer to an image that includes any portion of a financial document. In particular, the example in FIG. 2 shows an image of a check, though the financial document image 200 may take various forms. The processing circuitry 112 may receive the financial document image 200 and apply any number of image processing functions prior to performing a character count process for the financial document image. For instance, the processing circuitry 112 may determine one or more corners or edges of the financial document image 200, deskew the image 200 to remove distortions, adjust the contrast of the image 200 to ease subsequent processing, apply any number of image cleaning algorithms, de-blur the image 200, binarize the image into black and white pixels, and more. As another example, the processing circuitry 112 may adjust the size of the image 200 to a particular height or width (e.g., in pixels) or to a particular proportion of the originally received image (e.g., shrink the image 200 to ¼ of the original size). The processing circuitry 112 may resize the image such that expected text in the financial document image (e.g., text of a particular font, particular font size, particular font size range, etc.) is of a particular pixel height, width, or within a particular pixel range.

The processing circuitry 112 may convert the financial document image 200 into a pixel array for processing. To illustrate, the financial document image 200 in FIG. 2 includes the image portion labeled as 210. The exemplary image portion 210 includes a number of pixels binarized into either white pixels or black pixels, as seen in the expanded image portion 210 reproduced and expanded in FIG. 2 above the financial document image 200. The processing circuitry 112 may represent the image portion 210 as a pixel array of black and white pixels. As one example, the processing circuitry 112 may represent the financial document image 200, including the image portion 210, as a two-dimensional array of array values, where an array value of '0' indicates a white pixel and an array value of '1' indicates a black pixel. The processing circuitry 112 may perform any of the image processing steps described above in preparation of determining the character count for the financial document image 200.

Exemplary processes through which the processing circuitry 112 may determine or estimate a character count for the financial document image 200 are presented next. First, the processing circuitry 112 may identify one or more text chunks in the financial document image 200, for example as described through FIGS. 3-8. Next, the processing circuitry 112 may determine a character count for some or all of the identified text chunks, for example as described through FIGS. 9-10.

Identifying Text Chunks

The processing circuitry 112 may identify one or more text chunks in the financial document image 200. A text chunk may refer to a particular portion of set of pixels of the financial document image 200 that may contain one or more text characters. In doing so, the processing circuitry 112 may evaluate the financial document image 200 to determine the likelihood particular portions (e.g., particular pixels) of the image 200 correspond to the boundary of a character, such as any edge, a top right corner, a top left corner, or other boundary portion of a text character.

In particular, the processing circuitry 112 may determine a likelihood that an image pixel corresponds to or is within a particular distance from the top left corner of a character. In some variations, the processing circuitry 112 may apply a top left scoring algorithm for pixels in the financial document image 200 to specify this likelihood. In scoring a particular pixel, the top left scoring algorithm may account for any number of other pixels surrounding the particular pixel. One such example is presented next in FIG. 3.

Figure 3:
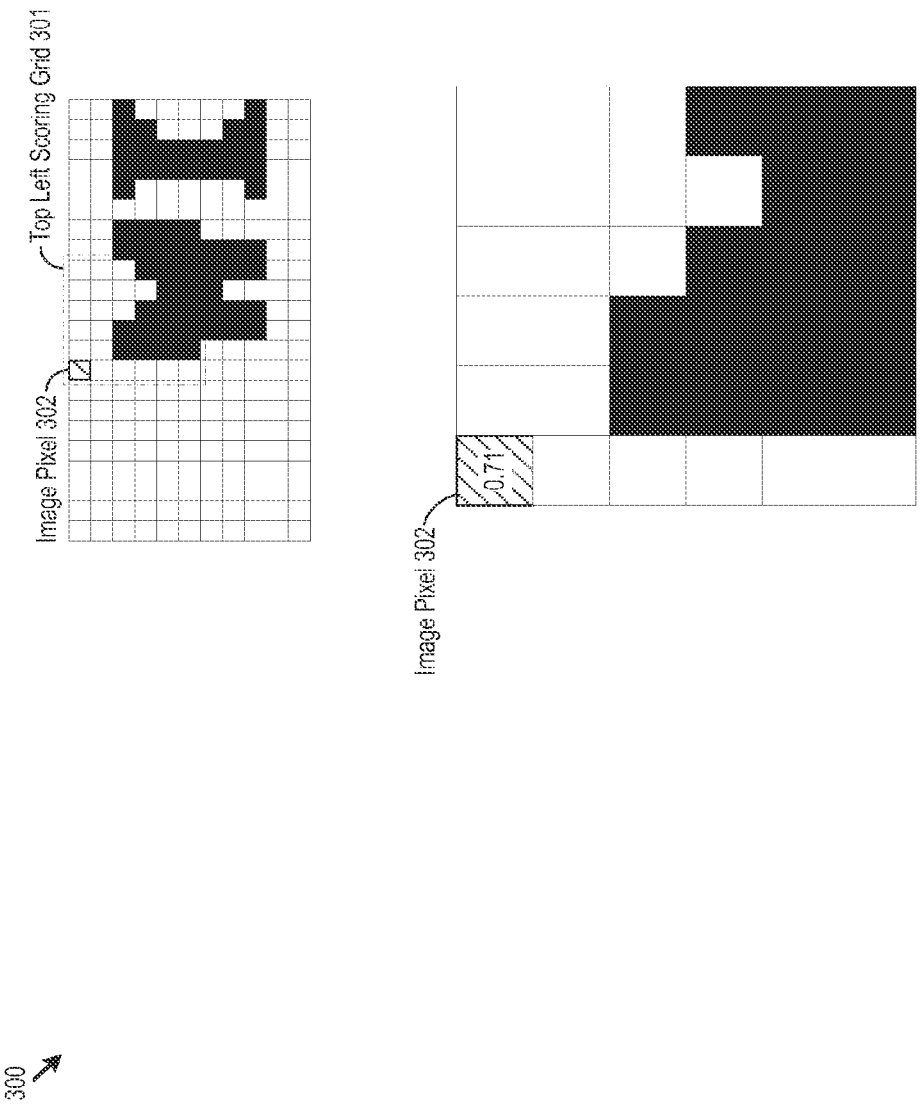
FIG. 3 shows an example of a top left scoring grid for an image pixel.

FIG. 3 shows an example of a top left scoring grid 301 for an image pixel 302. A scoring grid of pixels may represent a set of pixels surrounding a particular pixel, and the processing circuitry 112 may use the top left scoring grid 301 to apply a top left scoring algorithm to the image pixel 302. The top left scoring grid 301 may take various sizes or shapes, which may be specified through the character count parameters 124. The character count parameters 124 may, for instance, specify a height and/or width of the top left scoring grid 301. As shown in FIG. 3, the processing circuitry 112 determines the top left scoring grid 301 as a 6 by 6 array of pixels with the image pixel 302 being evaluated by the top left scoring algorithm positioned as the top left pixel of the top left scoring grid 301.

The character count parameters 124 may specify dimensions for a scoring grid according to any number of factors, some of which are presented next. The processing circuitry 112 may resize the financial document image 200 such that expected text of the image has a particular size, e.g., a MICR line, courtesy amount line, or other particular text in the financial document image 200 has particular pixel height, width, or pixel size range. The character count parameters 124 may specify, for example, dimensions for the top left scoring grid 301 such that the top left scoring grid 301 (or a non-padded portion thereof as discussed in greater detail below) covers a predetermined portion of an expected text character in the financial document image 200. As another variation, the character count parameters 124 may specify a scoring grid size that covers ⅓ the width an expected text character and ½ the height of an expected text character, which may be specified in pixels.

In some implementations, the character count parameters 124 specify the dimensions of a scoring grid to account for a particular pixel density of the financial document image 200. For instance, the character count parameters 124 may specify a particular dimension (e.g., 6 pixels wide by 9 pixels high) for scoring grid given a particular pixel density of the image 200 (e.g., for a 200 Dots-Per-Inch image). Additionally or alternatively, the character count parameters 124 may specify a scoring grid dimension to account for a minimum expected font size or minimum relevant font size in an image, for which the pixel size may vary depending on how the image was resized by the processing circuitry 112.

The processing circuitry 112 may determine a top left score for a pixel. The scoring algorithm may implement a scoring range indicative of the likelihood that the image pixel 302 corresponds to a top left corner of a character or is within a particular padded distance from the top left corner of a character. With regards to a padded distance, the top left scoring algorithm may include a padding parameter. The padding parameter may specify a particular padding of white pixels that surround the top left corner of a character. For example, with a padding parameter value of 2, the image pixel 302 may have an increased top left score when the image pixel 302 is two pixels above and two pixels to the left of a top left corner pixel of a text character. For top left scoring, the character count parameters 124 may specify a top padding parameter, a left padding parameter, or both.

The processing circuitry 112 may determine a top left score for the image pixel 302 according to the distribution of white and/or black pixels in the top left scoring grid 301. With padding, the scoring algorithm may indicate a higher likelihood of the image pixel 302 corresponding to a top left corner of a character when particular portions of the top left scoring grid 301 are white pixels, e.g. a white padded portion of the top left scoring grid 301. Along similar lines, the scoring algorithm may indicate a higher likelihood of a pixel corresponding to the top left corner when particular portions of the top left scoring grid 301 are black pixels, e.g., a black character portion. As one example, for a padding parameter value of 2 (for both top and left), the character count parameters 124 may specify an ideal distribution of white and black pixels in a 6×6 top left scoring grid 301 as the following configuration:

| W | W | W | W | W | W |
|---|---|---|---|---|---|
| W | W | W | W | W | W |
| W | W | B | B | B | B |
| W | W | B | B | B | B |
| W | W | B | B | B | B |
| W | W | B | B | B | B |

The ideally white (W) pixels in the above ideal configuration may form the white padded portion for determining a top left score and the ideally black pixels (B) may form the black character portion for determining a top left score. When determining a top left score for a pixel, the processing circuitry 112 may determine the proportion of the white padded portion of the top left scoring grid 301 for that pixel that includes white pixels and the proportion of the black character portion that includes black pixels.

The processing circuitry 112 may apply weights when evaluating the pixels in the top left scoring grid 301. That is, the processing circuitry 112 may give more or less weight when a particular pixel in a particular position in the top left scoring grid 301 is either white or black. For instance, the character count parameters 124 may specify greater weight for pixels that are closer to a particular pixel, edge, or region in the top left scoring grid 301. One exemplary weighting for a 6×6 top left scoring grid 301 with a padding parameter value of 2 is as follows:

| 1 | 1 | 1 | 1 | 1 | 1 |
|---|---|---|---|---|---|
| 1 | 2 | 2 | 2 | 2 | 2 |
| 1 | 2 | <u>4</u> | <u>4</u> | <u>4</u> | <u>4</u> |
| 1 | 2 | <u>4</u> | <u>3</u> | <u>3</u> | <u>3</u> |
| 1 | 2 | <u>4</u> | <u>3</u> | <u>2</u> | <u>2</u> |
| 1 | 2 | <u>4</u> | <u>3</u> | <u>2</u> | <u>1</u> |

In the above weighting, white pixels in the white padded portion are given a weight (e.g., multiplier) by 1 or 2. Black pixels in the white padded portion may be given a weight of 0. Black pixels in the black character portion are given a weight of 4, 3, 2 or 1, as shown by the underlined weights for pixels in the black character portion. White pixels in the black character portion may be given a weight of 0. In that regard, the processing circuitry 112 may determine a weighted proportion of white pixels in the white padded portion (e.g., a white padded score), for example by dividing a weighted sum for the pixels in a white padded portion by the ideal weighted value for the white padded portion. The processing circuitry 112 may determine a black character score in a consistent manner as well.

To illustrate, the processing circuitry 112 may determine the top left score for the image pixel 302 with the particular top left scoring grip 301 depicted in FIG. 3 according to a padding value of 2 and the exemplary weights shown above. The processing circuitry 112 may calculate a white padded portion score and black character score for the top left scoring grid 301. In particular, the white padded portion of the top left scoring grid 301 shown in FIG. 3 has pixel array of:

| W | W | W | W | W | W |
|---|---|---|---|---|---|
| W | W | W | W | W | W |
| W | B | — | — | — | — |
| W | B | — | — | — | — |
| W | B | — | — | — | — |
| W | B | — | — | — | — |

Applying the weights for white and black pixels in the white padded portion, the processing circuitry 112 may determine the following weighted values for the white padded portion:

| 1 | 1 | 1 | 1 | 1 | 1 |
|---|---|---|---|---|---|
| 1 | 2 | 2 | 2 | 2 | 2 |
| 1 | 0 | — | — | — | — |
| 1 | 0 | — | — | — | — |
| 1 | 0 | — | — | — | — |
| 1 | 0 | — | — | — | — |

Summing the weighted values, the processing circuitry 112 may determine the weighted sum for the white padded portions as 21. The processing circuitry 112 may identify the ideal weighted value (e.g., when all the pixels in the white padded portion are white) as 29. Accordingly, the processing circuitry 112 may determine the white padded score of the top left scoring grid 301 shown in FIG. 3 as 21/29=0.72.

The processing circuitry 112 may similarly determine a black character score of the top left scoring grid 301. The processing circuitry 112 may apply the exemplary weighting shown above for the black character portion of the top left scoring grid 301 in FIG. 3. In doing so, the processing circuitry 112 may determine the following weighted values for the black character portion:

| — | — | — | — | — | — |
|---|---|---|---|---|---|
| — | — | — | — | — | — |
| — | — | 4 | 0 | 0 | 0 |
| — | — | 4 | 3 | 0 | 3 |
| — | — | 4 | 3 | 2 | 2 |
| — | — | 4 | 3 | 2 | 1 |

In this example, the processing circuitry 112 may determine the weighted sum for the black character portion as 35 and the ideal weighted sum (e.g., when all the pixels in the black character portion are black) as 50. Accordingly, the processing circuitry 112 may, in one implementation, determine the weighted black character score of the top left scoring grid 301 shown in FIG. 3 as 35/50=0.70.

The processing circuitry 112 may additionally apply weights when accounting for the white padded score and the black character score. When weighted equally, the processing circuitry 112 may determine the top left score of the image pixel 302 as the average the white padded score and black character score. In this example, the processing circuitry 112 determines the top left score of the image pixel 302 as (0.5)*0.72+(0.5)*0.70=0.71, as shown in FIG. 3. In other variations, the processing circuitry 112 may apply a greater weight to the white padded score than the black character score or vice versa.

The processing circuitry 112 may determine the top left score for the image pixel 302 as well as for any number of other pixels in the financial document image 200. The top left score determination method above may provide an quick and efficient method for determining the likelihood a particular pixel corresponds to the top left corner of a text character. The processing circuitry 112 may determine a respective top left score for pixels and identify pixels with a greater likelihood of corresponding to the top left corner of a character without, for example, performing edge detection processes or other processing-intensive processes.

While some particular examples have been presented above, the character count parameters 124 may specify any number of different configurations for determining a top left score, including varying height and width dimensions for the top left scoring grid 301, varying padding parameter values (including top padding, left padding, or both), as well as varying weight configurations, such as weights applied to particular pixels in the white padded portion or the black character portions, or to the white padded and black character scores. Another weighting configuration for a 6×9 top left scoring grid 301 with a top and left padding of 3 may be as follows (with black character portion weights underlined):

| 1 | 1 | 1 | 1 | 1 | 1 |
|---|---|---|---|---|---|
| 1 | 2 | 2 | 2 | 2 | 2 |
| 1 | 2 | 3 | 3 | 3 | 3 |
| 1 | 2 | 3 | $\underline{3}$ | $\underline{2}$ | $\underline{1}$ |
| 1 | 2 | 3 | $\underline{2}$ | $\underline{2}$ | $\underline{1}$ |
| 1 | 2 | 3 | $\underline{1}$ | $\underline{1}$ | $\underline{1}$ |
| 1 | 2 | 3 | $\underline{1}$ | $\underline{1}$ | $\underline{1}$ |
| 1 | 2 | 3 | $\underline{1}$ | $\underline{1}$ | $\underline{1}$ |
| 1 | 2 | 3 | $\underline{1}$ | $\underline{1}$ | $\underline{1}$ |

In this example, the white padded portion is weighted along the edge of the top and left edges of a character and the black character portion is weighted to emphasize the top left pixel of the character. The character count parameters 124 may implement any number of varying configurations through which the processing circuitry 112 determines the top left score for pixels in the financial document image 200.

Figure 4:
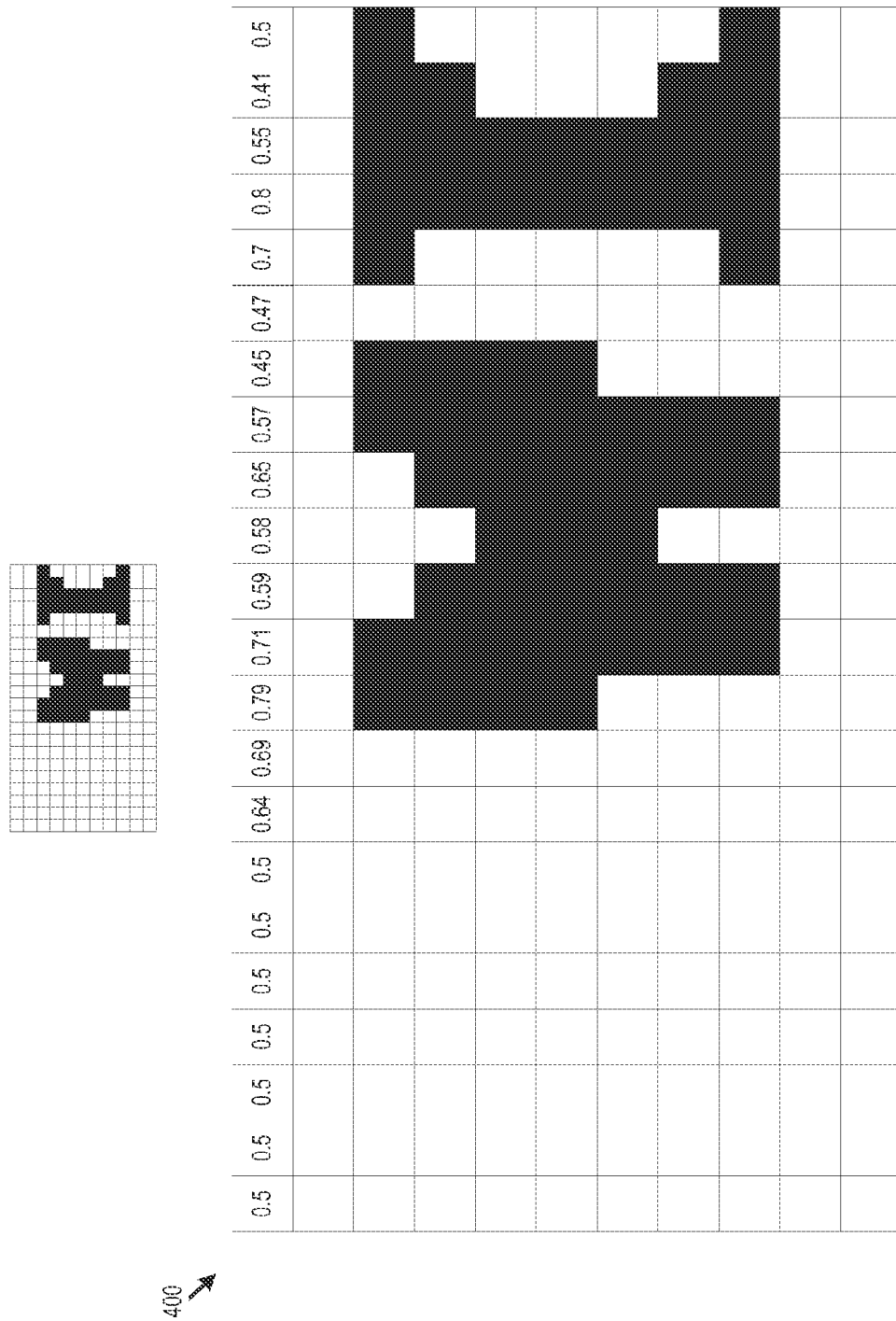
FIG. 4 shows an example of a top left score array.

FIG. 4 shows an example of a top left score array 400. In particular, the top left score array 400 shown in FIG. 4 includes top left scores for a row of pixels in the financial document image 200, e.g., after the processing circuitry 112 has determined the top left scores for that particular row of pixels. Along similar lines, the processing circuitry 112 may determine the top left scores for the remaining pixels of the financial document image 200 as well. In the exemplary top left score array 400 shown in FIG. 4, the processing circuitry 112 may determine the respective top left score for pixels in the financial document image 200 according to the following parameters: using a 6×9 pixel dimension for a top left scoring grid, a padding parameter value of 2, and an equal weight (e.g., half or 0.5) for the white padded score and black character score.

The processing circuitry 112 may determine a respective top left score for some or all of the pixels in the financial document image 200. For example, the processing circuitry 112 may abstain or forego determining the top left score for a pixel when the pixel is in a particular region of the financial document image 200, e.g., in the bottom-most row of the image 200, within a predetermined number of rows from the bottom-most row, in the right-most column of the image 200, or within a predetermined number of rows from the right-most column. As another example, the processing circuitry 112 may selectively determine the top left scores for pixels within a predetermined pixel distance from an interest region of the financial document image 200, such as the Magnetic Ink Character Recognition (MICR) location of a check, from a particular form field of an insurance document, and the like.

Before, during, or after determining the top left score for pixels in the financial document image 200, the processing circuitry 112 may determine a top right score for one or more pixels in the financial document image 200. In that regard, the processing circuitry 112 may determine a likelihood that an image pixel corresponds to or is within a particular pixel distance from the top right corner of a text character. The processing circuitry 112 may apply a scoring algorithm similar in many respects to top left scoring algorithm described above, but with any number of variances. For example, the configuration, weights, and other parameters specified by the character count parameters 124 for determining the top right score may be vertically mirrored from those used for determining a top left score.

The character count parameters 124 may specify distinct parameters through which the processing circuitry 112 determines a top right score for a pixel. In that regard, the character count parameters 124 may specify different configurations for a top right scoring grid as compared to the top left scoring grid, including differences in scoring grid dimensions, weights applied to pixels within a top right scoring grid, etc. In particular, the processing circuitry 112 may use a top padding parameter value and/or right padding parameter value in determining the top right score for a pixel, but not a left padding parameter value (as compared to the top left score determination parameters that may include a top left padding parameter value but not a top right padding parameter value).

Figure 5:
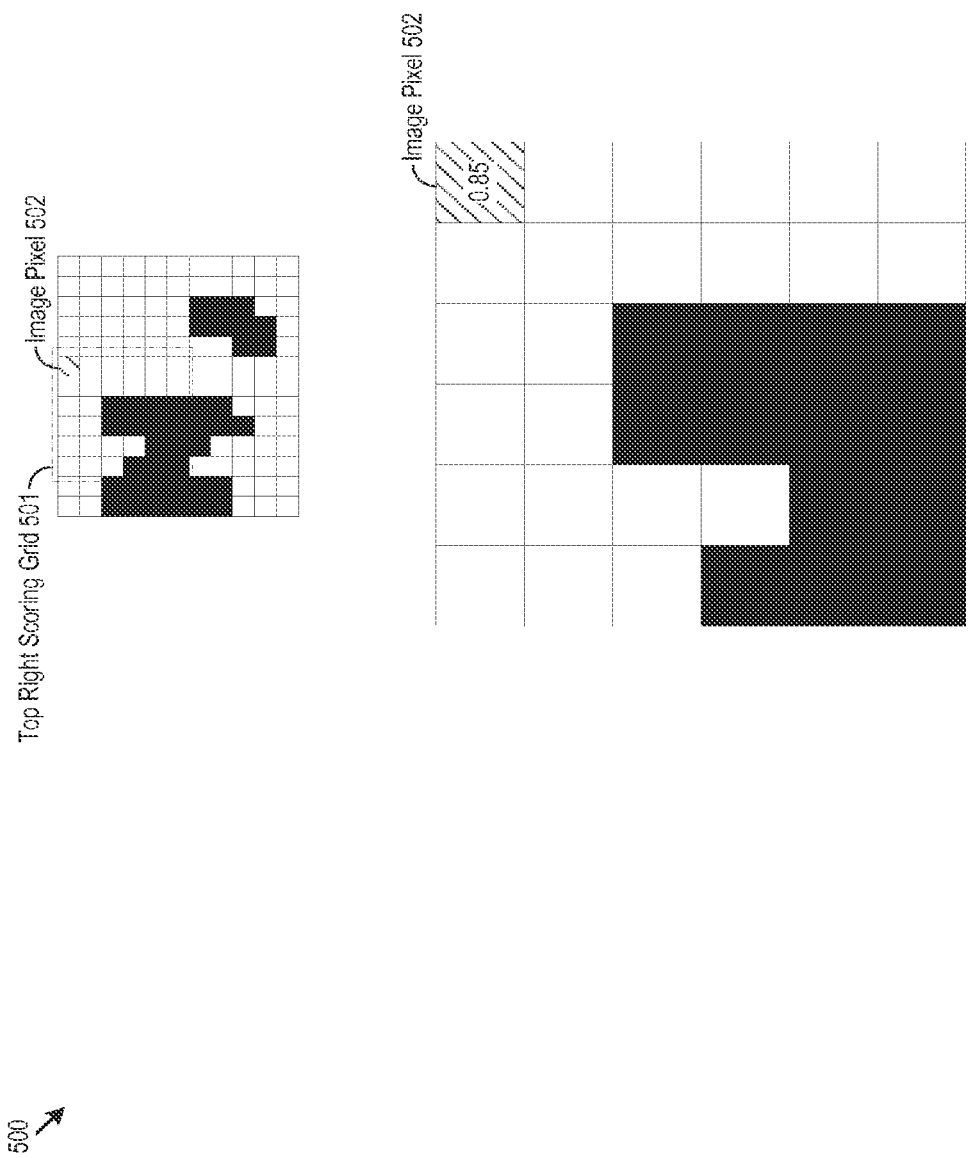
FIG. 5 shows an example of a top right scoring grid for an image pixel.

FIG. 5 shows an example of a top right scoring grid 501 for an image pixel 502. The top right scoring grid 501 in FIG. 5 has a height and width of 6 pixels and a padding parameter value of 2. In this example, the character count parameters 124 may specify an ideal distribution of white and black pixels in the 6×6 top right scoring grid 501 as the following configuration:

| W | W | W | W | W | W |
|---|---|---|---|---|---|
| W | W | W | W | W | W |
| B | B | B | B | W | W |
| B | B | B | B | W | W |
| B | B | B | B | W | W |
| B | B | B | B | W | W |

The ideally white (W) pixels in the above ideal configuration may form the white padded portion for determining the top right score for a particular pixel, e.g., the top right pixel of the top right scoring grid 501. The ideally black (B) pixels in the above ideal configuration may form the black character portion for determining the top right score. One exemplary weighting for a 6×6 top right scoring grid 501 with a padding value of 2 is as follows (with black character weights underlined):

| 1 | 1 | 1 | 1 | 1 | 1 |
|---|---|---|---|---|---|
| 2 | 2 | 2 | 2 | 2 | 1 |
| $\underline{4}$ | $\underline{4}$ | $\underline{4}$ | $\underline{4}$ | 2 | 1 |
| $\underline{3}$ | $\underline{3}$ | $\underline{3}$ | $\underline{4}$ | 2 | 1 |
| $\underline{2}$ | $\underline{2}$ | $\underline{3}$ | $\underline{4}$ | 2 | 1 |
| $\underline{1}$ | $\underline{2}$ | $\underline{3}$ | $\underline{4}$ | 2 | 1 |

As seen, this exemplary weighting for a 6×6 top right scoring grid 501 is vertically mirrored from the exemplary weighting for a 6×6 top left scoring grid 301 discussed above.

The processing circuitry 112 may apply the weights to the top right scoring grid 501 for the image pixel 502 specifically shown in FIG. 5, which may be represented by the following pixel array (pixels in the black character portion underlined):

| W | W | W | W | W | W |
|---|---|---|---|---|---|
| W | W | W | W | W | W |
| $\underline{W}$ | $\underline{W}$ | $\underline{B}$ | $\underline{B}$ | W | W |
| $\underline{B}$ | $\underline{W}$ | $\underline{B}$ | $\underline{B}$ | W | W |
| $\underline{B}$ | $\underline{B}$ | $\underline{B}$ | $\underline{B}$ | W | W |
| $\underline{B}$ | $\underline{B}$ | $\underline{B}$ | $\underline{B}$ | W | W |

The processing circuitry 112 may determine the weighted sum of the white padded portion to be 29 and the ideal weighted sum to be 29. In this example, the processing circuitry 112 determines the white padded score as 29/29=1.0. Following consistent respective calculations, the processing circuitry 112 may determine the black character score as 0.70. The processing circuitry 112 may, for example, apply the same weight to each score and determine the top right score of the image pixel 502 as (0.5)*1.0+(0.5)*(0.70)=0.85, as shown in FIG. 5. In a similar way, the processing circuitry 112 may determine a respective top right score for some or all of the pixels in the financial document image 200.

The processing circuitry 112 may determine top right scores and top left scores for some or all of the pixels in the financial document image 200. For a particular pixel, the processing circuitry 112 may determine a top right score for the particular pixel, a top left score for the particular pixel, or both. After determining top right and top left scores for pixels of the financial document image 200, the processing circuitry 112 may use the determined top right scores and top left scores to identify text chunks in the financial document image 200.

The processing circuitry 112 may identify a text chunk by determining one or more boundary pixels or edges for the text chunk. As one exemplary process described in greater detail below, the processing circuitry 112 may determine a top left pixel of the text chunk, a top right pixel of the text chunk, and a bottom edge of the text chunk. In that regard, the processing circuitry 112 may sequentially consider pixels in the financial document image 200 to identify a boundary of a text chunk. For example, the processing circuitry 112 may start the sequential processing of pixels for the text chunk determination process at the top left pixel of the financial document image 200. Or, the processing circuitry 112 may start with a pixel belongs to a particular portion of the financial document image 200, e.g., a MICR line portion of a check image.

The processing circuitry 112 may identify pixels or boundaries for a text chunk according to any number of chunk boundary criteria, which may be specified by the character count parameters 124. For a current pixel being considered for text chunk identification, the processing circuitry 112 may first determine whether the current pixel is already part of a previously determined text chunk. If so, the processing circuitry 112 may exclude the current pixel from belonging to another text chunk and proceed to a subsequent pixel for consideration.

When a current pixel is not part of a previously determined text chunk, the processing circuitry 112 may determine whether the current pixel meets chunk boundary criteria for a top left pixel of the text chunk. The processing circuitry 112 may identify the current pixel as the top left pixel for a text chunk when the top left score of the current pixel is equal to or exceeds a top left score threshold, such as a top left score threshold of 0.65 in some implementations. Accordingly, the processing circuitry 112 may identify a top left pixel for the text chunk without performing additional or more complicated image processing techniques, e.g., without performing edge detection algorithms. After determining a top left pixel for a text chunk, the processing circuitry 112 may determine the top right pixel for the text chunk.

The processing circuitry 112 may determine a top right pixel for the text chunk by evaluating pixels to the right of the determined top left pixel of the text chunk. In that regard, the processing circuitry 112 may determine a set of potential top right pixels based on the top left scores of the pixels being evaluated, e.g., top right candidate pixels. In one implementation, the processing circuitry 112 determines the top right candidate pixels for the text chunk as a set of consecutive pixels with a top left score below a top left score threshold, as set by the character count parameters 124. The character count parameters 124 may specify the same or a different top left score threshold used for identifying the top left pixel of the text chunk and the top right candidate pixels of the text chunk.

To illustrate, the processing circuitry 112 may start at the determined top left pixel of the text chunk and sequentially consider pixels to the right of the top left pixel. When the current pixel has a top left score less than the top left score threshold for identifying a top right pixel (e.g., 0.65), the processing circuitry 112 may increment a counter value and continue to the next pixel. When the current pixel has a top left score equal to or greater than the top left score threshold for identifying a top right pixel (e.g., 0.65), the processing circuitry 112 may reset the counter to 0 and continue to the next pixel. When the counter value reaches a counter threshold value (e.g., 13), the processing circuitry 112 may identify a number of previously considered pixels equal to the counter threshold value as the top right candidate pixels (e.g., the 13 previously considered pixels when the counter threshold value is 13). An exemplary iteration of this process is presented in FIG. 6.

Figure 6:
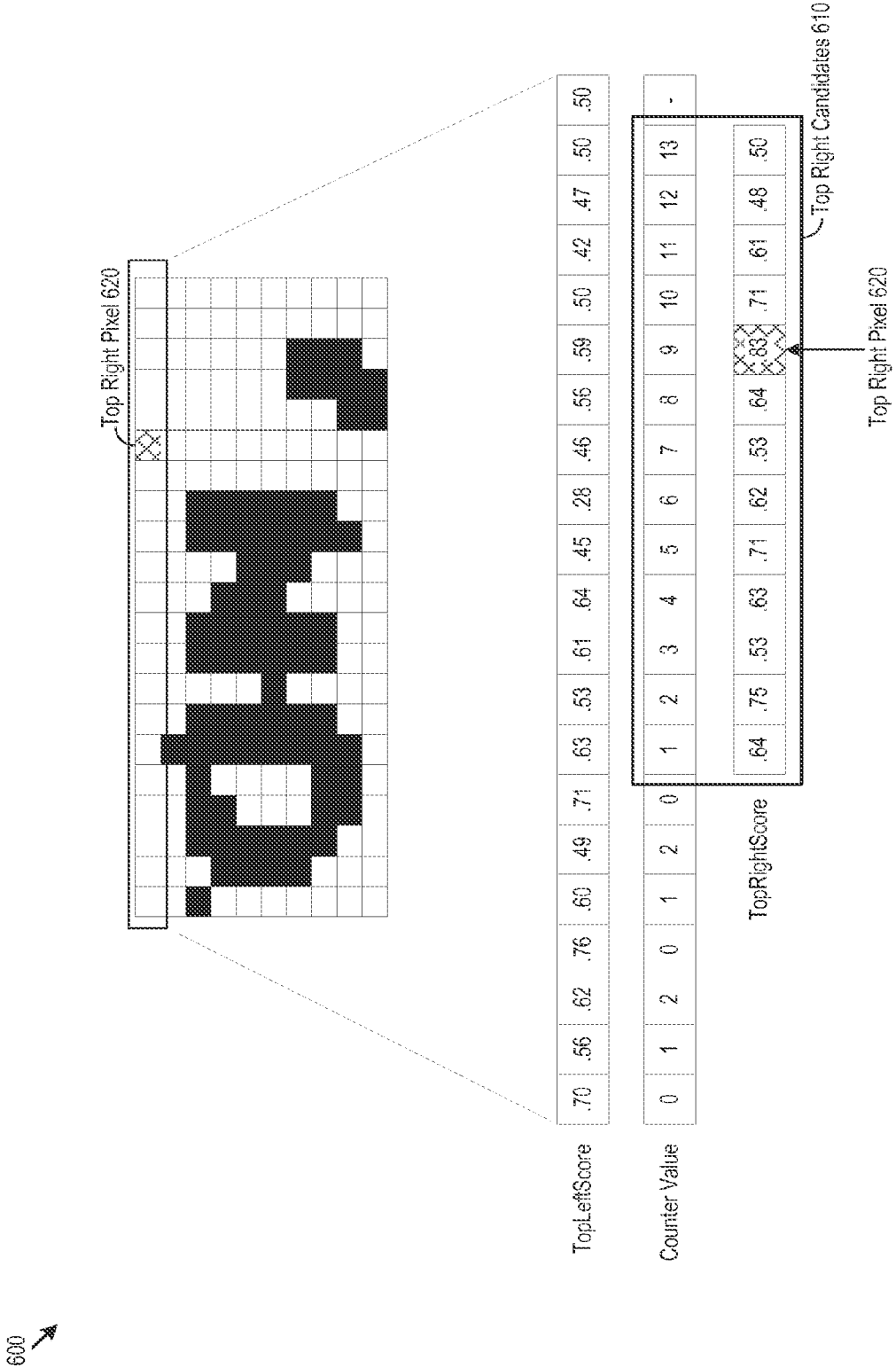
FIG. 6 shows an exemplary flow for determining a top right pixel of a text chunk.

FIG. 6 shows an exemplary flow 600 for determining a top right pixel of a text chunk. In the exemplary flow 600 in FIG. 6, the processing circuitry 112 reads the character count parameters 124, which may specify a top left score threshold for identifying the top right pixel as 0.65 and the counter threshold value as 13. As the processing circuitry 112 evaluates successive pixels, the processing circuitry 112 either increments a counter value when the top left score of the pixel is less than 0.65 or resets the counter value when the top left score of the pixels is equal to or greater than 0.65. In this example, when the processing circuitry 112 identifies thirteen (13) consecutive pixels with a top left score less than 0.65, the processing circuitry 112 determines the top right candidate pixels 610 for the text chunk.

The processing circuitry 112 may determine the top right pixel for the text chunk from among the top right candidate pixels 610. In some implementations, the processing circuitry 112 identifies the pixel with the highest top right score from among the top right candidate pixels 610 as the top right pixel for the text chunk. In the example shown in FIG. 6, the processing circuitry 112 determines the pixel with the top right score of 0.83 as the top right pixel 620 for the text chunk. The processing circuitry 112 may identify a top right pixel for the text chunk without performing additional or more complicated image processing techniques, e.g., without performing edge detection algorithms.

After determining a top left and top right corner for a text chunk, the processing circuitry 112 may determine a bottom edge of the text chunk. In doing so, the processing circuitry 112 may consider rows of pixels below the particular row of pixels formed by and between the top left and top right pixels, e.g., the top row of the text chunk. The processing circuitry 112 may identify a first row of pixels below the top row of the text chunk formed by the top left and top right pixels with a proportion of white pixels that exceeds a bottom edge threshold. In some variations, the character count parameters 124 may set the bottom edge threshold at 90%, for example. The processing circuitry 112 may determine the bottom edge of the text chunk as the upper edge of the identified first row of pixels with a proportion of white pixels that exceeds the bottom edge threshold.

In determining the bottom edge of the pixel chunk, the processing circuitry 112 may ignore or not consider a number of pixel rows at the top of the text chunk equal to the padding parameter value. For example, when the padding parameter value is set to 2, the processing circuitry 112 may not consider the top two rows of pixels formed between the top left and top right pixels when identifying the bottom edge of the text chunk. Put another way, the processing circuitry 112 may forego considering the top row of pixels that includes the top left and top right pixels and the next row of pixels directly below the top row when the padding parameter value is 2. Accordingly, the processing circuitry 112 may determine a text chunk formed by a top left pixel, a top right pixel, and a bottom edge. The processing circuitry 112 may further process the text chunk as well, some examples of which are shown in FIG. 7.

Figure 7:
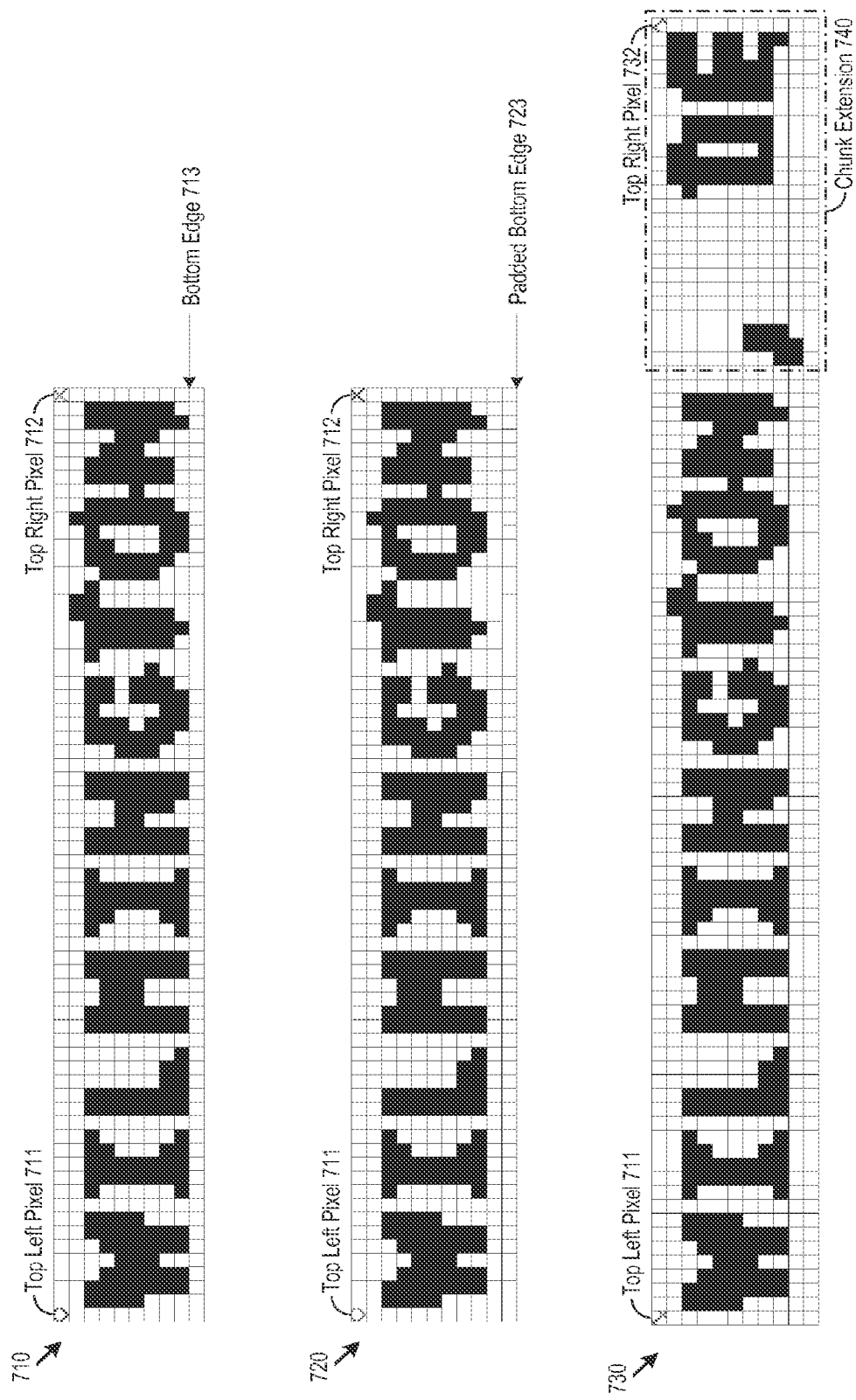
FIG. 7 shows examples of text chunks the processing circuitry may determine.

FIG. 7 shows examples of text chunks 710, 720, and 730 the processing circuitry 112 may determine. The processing circuitry 112 may determine the text chunk labeled as 710 with boundaries set by the top left pixel 711, top right pixel 712, and the bottom edge 713 using any of the methods or techniques described above. In particular, in determining the text chunk 710, the character count parameters 124 may specify a padding parameter value of 2, and accordingly, the processing circuitry 112 may forego considering the first two rows of pixels in the text chunk 710 when determining the bottom edge 713. As seen in FIG. 7, the row of pixels below the bottom edge 713 is composed entirely of white pixels, and the processing circuitry 112 may identify this row as the first row of pixels that exceed a bottom edge threshold. Accordingly, the processing circuitry 112 may determine the bottom edge 713 of the text chunk 710 as the upper edge of this row of white pixels exceeding the bottom edge threshold.

In some variations, the processing circuitry 112 may pad the bottom edge 713 of a determined text chunk 710. In that regard, the processing circuitry 112 may add a number of rows of white pixels below the bottom edge 713 as set by the character count parameters 724. In the example shown in FIG. 7, the processing circuitry 112 determine the text chunk 720 by padding the text chunk 710 with two rows of white pixels, e.g., through setting the padded bottom edge 723 as the bottom edge of a text chunk.

In some variations, the processing circuitry 112 may adjust the left or right edges of a determined text chunk. For example, the processing circuitry 112 may pad the left edge of a text chunk, right edge of a text chunk, or both as similarly described above with regards to padding the bottom edge 713 of the text chunk 710. The processing circuitry 112 may additionally or alternatively adjust the left or right edges of a text chunk to include a chunk extension. In FIG.

7, the processing circuitry 112 may determine the text chunk 730 by adjusting the text chunk 720 to include the chunk extension 740.

The processing circuitry 112 may determine a chunk extension for a text chunk. In doing so, the processing circuitry 112 may consider the columns of pixels to the right or left of an edge of a text chunk and determine occurrence of a threshold number of consecutive white pixel columns, e.g., a consecutive number of columns each or which and/or collectively have a proportion of white pixels that exceed an extension threshold, such as 90% white pixels. The columns considered by the processing circuitry 112 may be to the left or right of the text chunk and have the same height as the text chunk. The processing circuitry 112 may determine the chunk extension as the section of pixels between the edge of the text chunk and the identified consecutive white pixels columns.

As one particular example shown in FIG. 7, the processing circuitry 112 may determine the text chunk 720. Then, the processing circuitry 112 may determine the chunk extension 740 when, for example, the next threshold number of (e.g., the next 20) pixel columns to the right of the chunk extension 740 in the financial document image 200 are each 90% (or more) white. Accordingly, the processing circuitry 112 may determine the text chunk 730 by appending the chunk extension 740 to the text chunk 720. As such, the processing circuitry 112 may identify the top right pixel 732 in the chunk extension 740 as part of the boundary of the text chunk 730.

In processing the financial document image 200, the processing circuitry 112 may determine the text chunks 710 and 720 shown in FIG. 7 as intermediate text chunks and the text chunk 730 as the determined text chunk. However, the character count parameters 124 may include any number of additional or alternative parameters for determining intermediate text chunks before obtaining a determined text chunk.

Figure 8:
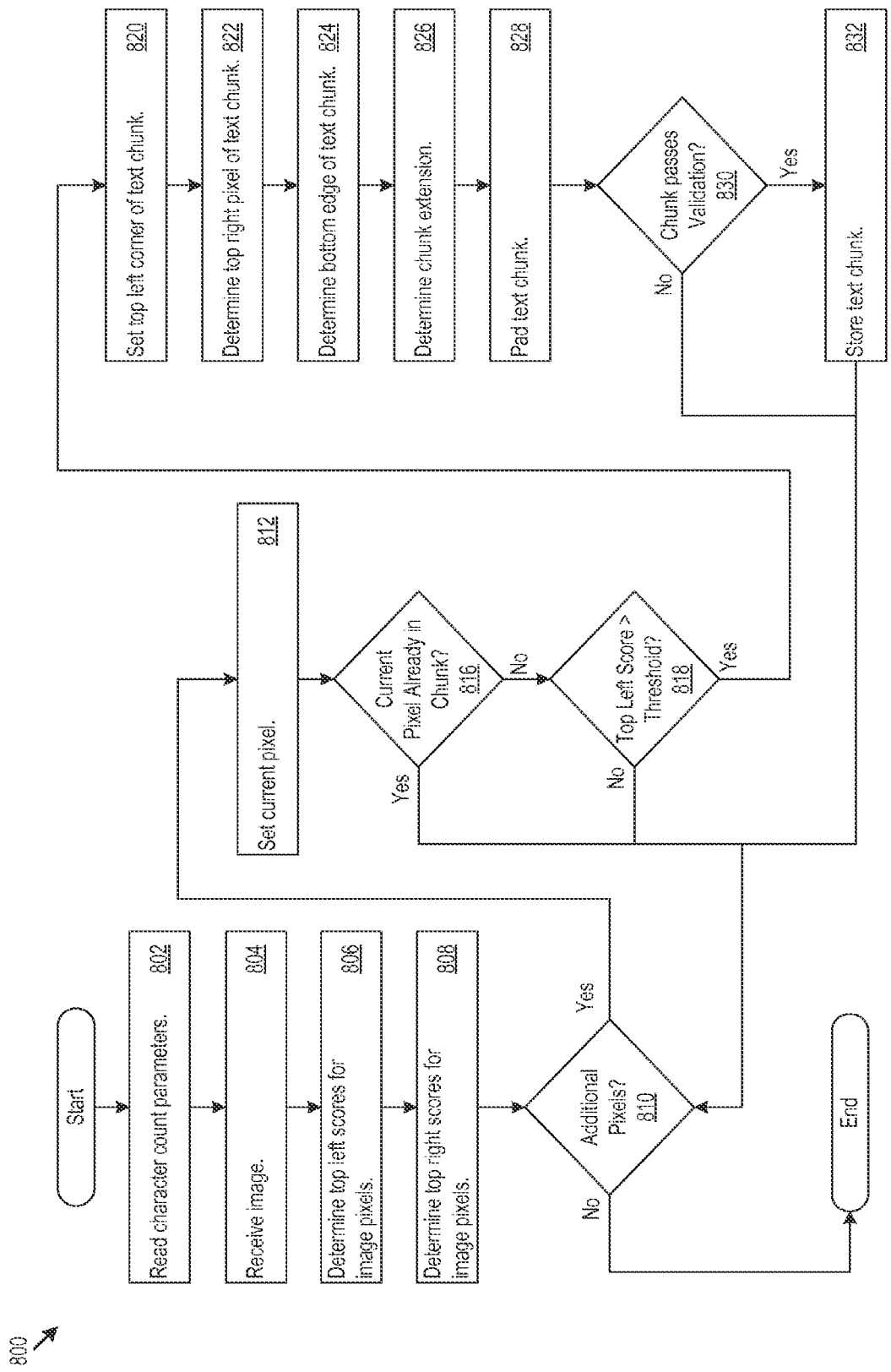
FIG. 8 shows an example of logic for identifying one or more text chunks in an image.

FIG. 8 shows an example of logic 800 for identifying one or more text chunks in an image. The logic 800 may be implemented in hardware, software, or both. For example, the processing circuitry 112 may implement the logic 800 in software as the image processing instructions 122.

The processing circuitry 112 may read the character count parameters 124 (802) and receive an image (804). The image may, for example, be a financial document image 200 such as a check or insurance form. The processing circuitry 112 may perform various pre-processing on the image, such as cleaning up the image, resizing the image to control the text size of expected text in the image (e.g., text of a MICR line or courtesy line in a check), binarizing the image, or converting the image to a pixel array.

The processing circuitry 112 may determine a respective top left score for some or all of the pixels in the image (804). The processing circuitry 112 may determine a respective top right score for some or all of the pixels in the image (806), including for pixels different from the pixels for which the processing circuitry 112 determines respective top left scores. In some implementations, the processing circuitry 112 may determine the top left scores and/or top right scores for specific portions (e.g., interest regions) of the image, and decline or skip determining the top left and/or top right scores for pixels outside of the interest regions of the image. As one example, the character count parameters 124 may specify a MICR line region, upper left hand corner, amount region on the middle right side, or other portions of a check image as interest regions.

Upon determining the top left and top right scores for image pixels in the image, the processing circuitry 112 may sequentially process pixels in the image. In that regard, the processing circuitry may determine whether any additional pixels in the image remain for processing (810), e.g., whether any unprocessed pixels remain in the interest region(s) of the image. If so, the processing circuitry 112 may set a current pixel (812). The processing circuitry 112 may set the current pixel as the next pixel in a pixel processing ordering. For example, the processing circuitry 112 may process pixels ordering from left to right and row by row from the top left corner of the image to the bottom right corner of the image or interest region.

For a current pixel, the processing circuitry 112 determines whether the current pixel is already part of a previously formed text chunk (816). For example, the processing circuitry 112 may access a listing of determined text chunks for the image, and determine whether the pixel is already part of another determined text chunk. If so, the processing circuitry 112 may proceed to consider a subsequent pixel of the image or interest region, if any remain (810).

The processing circuitry 112 may determine the boundaries of a text chunk. In that regard, the processing circuitry 112 may determine a top left corner for the text chunk. The processing circuitry 112 may determine, for example, whether the top left score of the current pixel exceeds (or alternatively, is equal to or greater than) a top left score threshold, which may be set by the character count parameters 124. When the top left score of the current pixel does not exceed the top left score threshold, the processing circuitry 112 may proceed to consider a subsequent pixel of the image or interest region, if any remain (810). When the top left score of the current pixel exceeds the top left score threshold, the processing circuitry 112 may set the current pixel as the top left corner of the text chunk (820).

Continuing the boundary determination for a text chunk, the processing circuitry 112 may determine a top right pixel for the text chunk (822) through any of the methods or techniques described above. For example, the processing circuitry 112 may determine a set of top right candidate pixels from the image, and identify the top right corner of the text chunk as the pixel from among the top right candidate pixels with the highest top right score (e.g., the pixel most likely to correspond to the top right corner or a text character as specified by top right score). The processing circuitry 112 may also determine the bottom edge of the text chunk (824) through any of the processes and techniques described above.

The processing circuitry 112 may further adjust the boundaries of a text chunk. In some variations, the processing circuitry 112 determines one or more chunk extensions (826) through which to extend the left edge or right edge (or both) of a text chunk. The processing circuitry 112 may additionally or alternatively pad the text chunk with white pixels, for example as specified by padding parameter(s) in the character count parameters 124. Using any combination of the techniques, process, or steps described above, the processing circuitry 112 may determine a text chunk.

Upon determining a text chunk, the processing circuitry 112 may validate the text chunk (830). As an exemplary validation, the processing circuitry 112 may determine whether the height of text chunk (e.g., pixel height) exceeds a minimum height threshold (e.g., 10 pixels). As another example, the processing circuitry may determine whether the height of the text chunk is within a maximum height threshold (e.g., 50 pixels). In some variations, the processing circuitry 112 may validate that all (or a threshold percentage) of the pixels in the text chunk are not a part of another determined text chunk. In these variations, the processing circuitry 112 may access a listing of previously determined text chunks to determine whether pixels of the text chunk belong to any of the previously determined text chunks. When the text chunk passes the validation process, the processing circuitry 112 may store the text chunk (832), e.g., by storing an indication of the text chunk in the determined text chunk listing. The indication may, for example, take the form of a database or data structure entry and may specify the boundary and/or pixels belonging to the associated text chunk. Then, the processing circuitry 112 may consider the subsequent pixel of the image or interest region, if any remain (810). When the text chunk fails the validation, the processing circuitry 112 may discard the text chunk and not store the text chunk in the determined text chunk listing. That is, the processing circuitry 112 may proceed to consider the subsequent pixel of the image or interest region (810) without storing an indication of the text chunk.

Determining Character Count

After identifying text chunks in an image, e.g., a financial document image 200, the processing circuitry 112 may determine a character count for the text chunks. As described in greater detail below, the processing circuitry 112 may determine the character count for a text chunk without specifically recognizing the identity or content of any particular text characters in the text chunk. For example, the processing circuitry 112 may determine the character count for the text chunk without performing any character recognition techniques, such as Optical Character Recognition (OCR) or other similar character recognition techniques.

Figure 9:
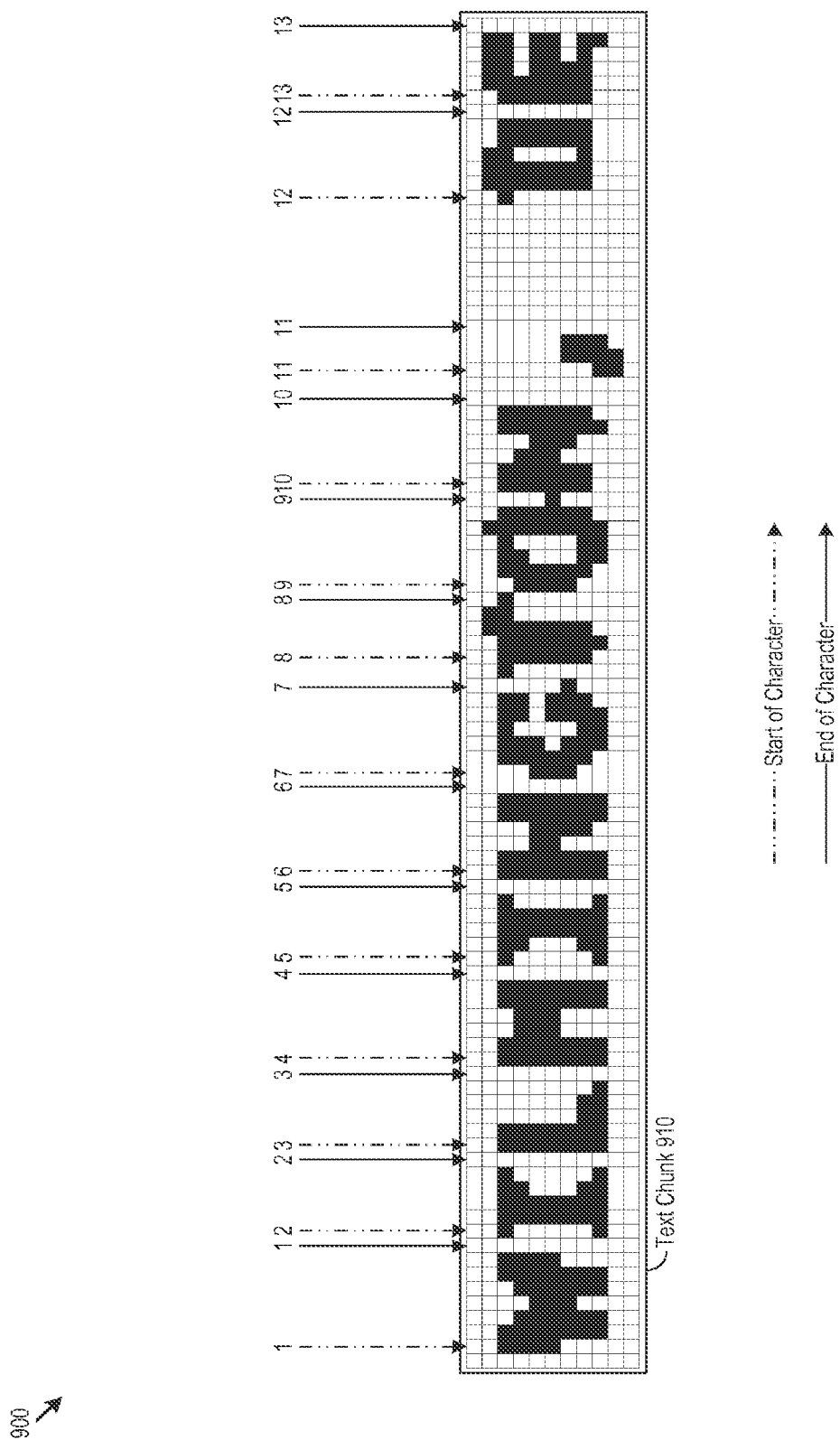
FIG. 9 shows an exemplary flow for counting characters in a text chunk.

FIG. 9 shows an exemplary character count 900 in a text chunk 910. The processing circuitry 112 may perform the character count 900 to determine a character count for the text chunk 910 without recognizing any particular characters in the text chunk 910. That is, the text chunk 910 shown in FIG. 9 includes the text "Wilmington, Del." and the processing circuitry 112 may obtain a character count for the text chunk 910 without recognizing the letters or the comma within the text chunk 910.

The processing circuitry 112 may process the text chunk 710 to determine a character start column and a corresponding character end column. To do so, the processing circuitry 112 may start at the leftmost pixel column of the text chunk and sequentially consider pixel columns in text chunk 710. The processing circuitry 112 may identify a character start column when the number of black pixels in a current column exceeds a black column threshold, which may be specified in the character count parameters 124 as a number of pixels or percentage, for example. In the specific example shown in FIG. 9, the processing circuitry 112 identifies the character start column when a current pixel column has at least one black pixel or greater than 0% of black pixels. The processing circuitry 112 may identify the character start columns shown in FIG. 9 that are marked with the dotted arrows and labeled with a corresponding character start number.

Upon identifying a character start column, the processing circuitry 112 may continue to sequentially consider pixel columns to the left of the character start column to identify a corresponding character end column. The processing circuitry 112 may identify the corresponding character end column as the first pixel column to the right of the character start column with white pixels that exceed a white column threshold. The processing circuitry 112 may identify a character end column when a current pixel column has less than 2 black pixels, for example. As seen in the exemplary text chunk 910 in FIG. 9, the processing circuitry 112 identifies the character end columns marked with the non-dotted arrows and labeled with a corresponding character end number. After identifying a corresponding character end column for a particular character start column, the processing circuitry 112 may increment a character count value and continue sequentially considering pixel columns of the text chunk 910 to determine a next character start column. The processing circuitry 112 may continue the character count process until reaching the end of the text chunk 910, e.g., considering the rightmost column of the text chunk 910. In the example shown in FIG. 9, the processing circuitry 112 determines character count of the text chunk 910 be 13, and determines the character count without recognizing the content or identity of any of the characters in the text chunk 910.

Figure 10:
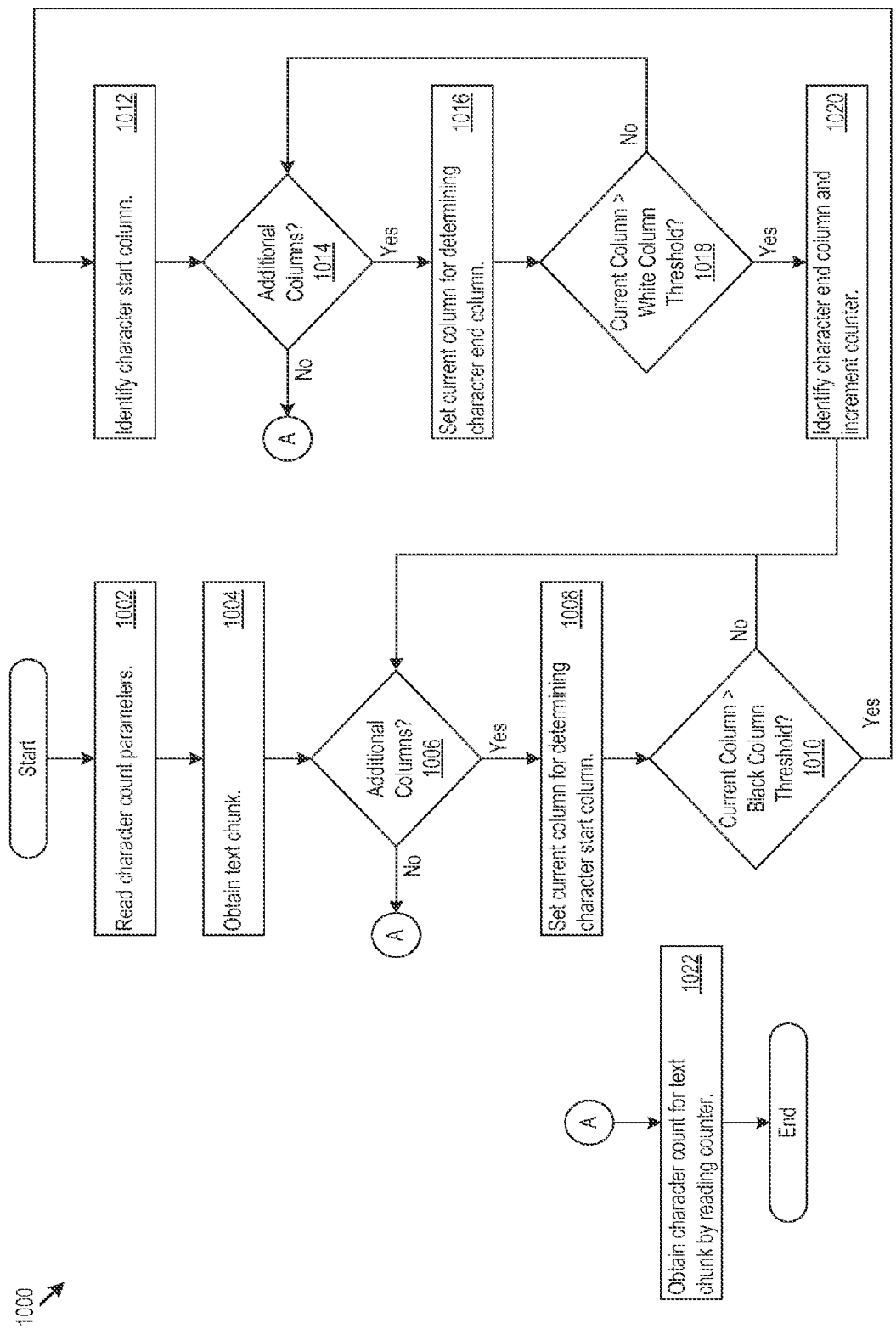
FIG. 10 shows an example of logic for obtaining a character count for a text chunk.

FIG. 10 shows an example of logic 1000 for obtaining a character count for a text chunk. The logic 1000 may be implemented in hardware, software, or both. For example, the processing circuitry 112 may implement the logic 1000 in software as the image processing instructions 122.

The processing circuitry 112 may read the character count parameters 124 (1002) and obtain a text chunk (1004). In some implementations, the processing circuitry 112 may obtain the chunk by accessing a text chunk listing or data structure, which may provide, for example, an indication of the boundaries of a particular text chunk in an image. The text chunk may be in the form of a pixel array.

In determining a character count for a text chunk, the processing circuitry 112 may process one or more pixel columns in the text chunk. The processing circuitry 112 may determine a character start column in the text chunk and then a corresponding character end column. To do so, the processing circuitry 112 may process the pixel columns in the chunk in according to a pixel column processing ordering. For example, the processing circuitry 112 may process pixel columns in the text chunk in a sequential order from the left most pixel column to the right most pixel column. Accordingly, the processing circuitry 112 may determine whether any additional pixel columns in the text chunk remain for processing (1006). If so, the processing circuitry 112 may set the next pixel column in the pixel column processing ordering as the current column for determining a character start column (1008).

The processing circuitry 112 may identify a character start column when a current pixel column meets any number of character start column criteria. The processing circuitry 112 may identify a character start column based on a black column threshold, which may specify a percentage, proportion, or number of black pixels in a pixel column. Accordingly, the processing circuitry 112 may identify a character start column by determining whether the number or proportion of black pixels in the current pixel column exceeds a black column threshold (1010). If not, the processing circuitry 112 may consider the next pixel column in the text chunk for determining a character start column, if any remain (1006). When the number or proportion of black pixels in the current pixel column exceeds the black column threshold, the processing circuitry 112 identifies this particular pixel column as a character start column (1012).

The processing circuitry 112 may determine a corresponding character end column for the identified character start column. After identifying the character start column, the processing circuitry 112 may consider the next pixel column in the text chunk, if any remain (1014). If so, the processing circuitry 112 may set the next pixel column as the current column for determining a character end column (1016). The processing circuitry 112 may identify a character end column when a current pixel column meets any number of character end column criteria. In particular, the processing circuitry 112 may, for example, identify a character end column by determining whether the number or proportion of white pixels in the current pixel column exceeds a white column threshold (1018). If not, the processing circuitry 112 may consider the next pixel column in the text chunk for determining a character end column, if any remain (1014).

When the number or proportion of white pixels in the current pixel column exceeds the white column threshold, the processing circuitry 112 identifies this particular pixel column as a corresponding character end column to the previously determined character start column (1020). The processing circuitry 112 may increment a counter indicating the character count for the text chunk.

The processing circuitry 112 may continue processing the text chunk to determine character start columns and corresponding character end columns until no additional pixel columns remain (1006 or 1014). Then, the processing circuitry 112 may obtain the character count for the text chunk by reading the counter indicating the character count for the text chunk (1022).

Figure 11:
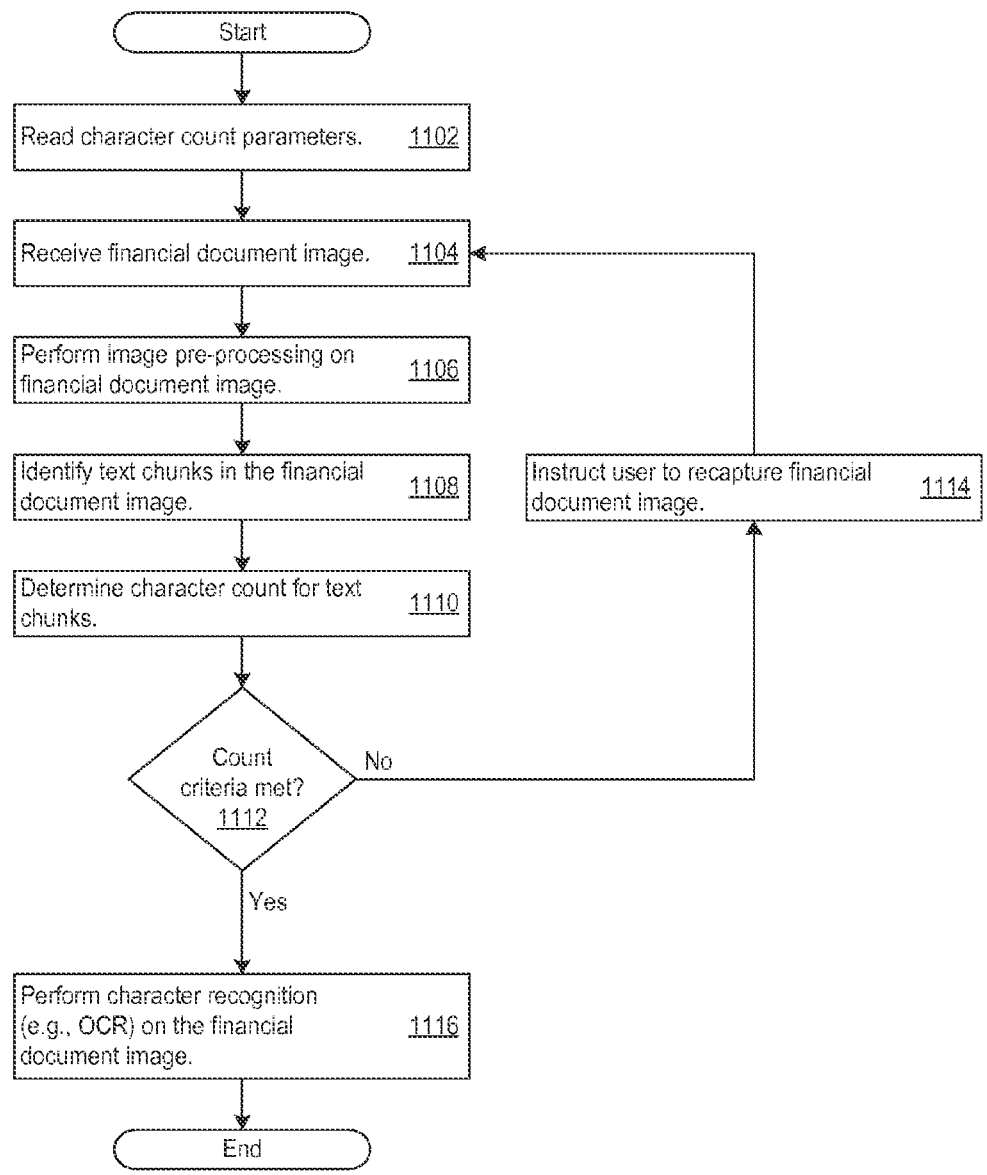
FIG. 11 shows an example of logic that may be implemented in hardware, software, or both.

FIG. 11 shows an example of logic 1100 that may be implemented in hardware, software, or both. For example, the processing circuitry 112 may implement the logic 1100 in software as the image processing instructions 122.

The processing circuitry 112 may read the character count parameters 124 (1102) and receive a financial document image 200 (1104). In some implementations, the character count parameters 124 may specify a character count threshold for the financial document image 200. The character count threshold may specify a minimum or maximum threshold number of characters in a financial document image 200 to meet particular quality criteria for processing the financial document image 200. Additionally, the character count parameters 124 may specify a particular character count threshold for different types of images, such as specific character count thresholds for business checks, personal checks, financial forms, remittance coupons, etc. As illustrative examples, the character count threshold for a business check may be set to 50 characters for personal checks and 100 characters for business checks. The character count parameters 124 may additionally or alternatively specify a particular character count threshold for particular regions (e.g., interest regions) of the financial document image 200 or any other image type the processing circuitry 112 may process.

The processing circuitry 112 may optionally perform image pre-processing techniques on the financial document image 200 (1106), including any of the pre-processing techniques described above. The processing circuitry 112 may determine a character count for the financial document image 200, for example by identifying one or more text chunks in the financial document image 200 (1008) and determining a character count for one or more of the identified text chunks (1110). To do so, the processing circuitry 112 may utilize any combination of the methods, flows, and techniques described above. The processing circuitry 112 may determine a character count for the financial document image 200 by summing the determined character count of text chunks in the financial document image 200.

The processing circuitry 112 may determine whether the character count for the financial document image 200 meets the character count criteria (1112). When the character count for the financial document image 200 fails the character count criteria, the processing circuitry 112 may instruct recapture of the financial document image (1114). For example, the processing circuitry 112 may send an image rejection message to an electronic device 102 used to capture the financial document image 200. The image rejection message may further instruct a user to recapture the image of financial document.

When the character count for the financial document image 200 meets the character count criteria, the processing circuitry 112 may perform further image processing. For example, the processing circuitry 112 may perform character recognition (e.g., OCR) on the financial document image 200 to recognize the characters on the financial document image 200. The processing circuitry 112 may perform further processing after character recognition, such as initiating a deposit process of a check represented by the financial document image 200, processing of a medical bill or financial form, etc.

The character count criteria may serve as an initial quality screen for incoming images received by the processing circuitry 112. By determining the character count of an image prior to performing subsequent image processing, the processing circuitry 112 may determine that the image is not overly cropped, and thus containing a character count less than a minimum threshold. Similarly, the character count criteria may be configured to prevent processing of overly blurry images, e.g., blurry images such that the processing circuitry 112 cannot determine enough character start and end columns and resulting in a character count less than a minimum threshold.

As discussed above, the character count parameters 124 may specify particular character count thresholds for interest regions of an image. Accordingly, the processing circuitry 112 may specifically identify text chunks and determine character counts for these interest regions instead of for the entire image. The processing circuitry 112 may determine the image passes the character count criteria when some or all of the particular character count criteria for the determined interest regions are met. As one example, the processing circuitry 112 may identify a MICR line portion of a check image as an interest region, and apply particular character count criteria for the MICR line portion, e.g., a minimum character count threshold. Additional exemplary interest regions may include high priority fields of a document, such as a social security number field, name field, address field, courtesy amount field, or any high priority region of an image received by the processing circuitry.

By performing combinations of the methods and techniques described above, the processing circuitry 112 may identify the character count for a financial document image 200 or other image without recognizing any particular character in the financial document image 200.

Although the example of a financial document 200 such as a check is provided by way of example above, the techniques discussed for identifying the presence, but not the specific identity or literal meaning, of characters or words, may be applied to any type of document. Other documents that may be analyzed with the techniques described herein include receipts, insurance documents, coupons, and so on. Specific portions of these documents may be targeted, or only characters of a particular font size may be included, for a given type of document. An advantage of the techniques discussed above is that the processing power and time for recognizing the presence, but not the specific identity, of characters or words may be less than that needed for actually identifying the individual letter, number or symbol. In other words, the knowledge that the captured image has chunks of text with a likelihood of four characters may be used rather than identifying those four characters as "abc3" can provide a helpful filter for a system to determine if an expected type of document is being looked at. In this way, a system may quickly, and with less processing power, filter out unacceptable (e.g., overly cropped or blurry) documents.

In some implementations, an image processing system 104 may implement the processing circuitry 112 for performing any of the methods and techniques described above, including determining a character count for a financial document image 200 without recognizing any particular character in the financial document image 200. In other implementations, an electronic device 102, such as a mobile device, may implement the processing circuitry 112. In yet other implementations, the functionality of the processing circuitry 112 may be implemented, e.g., distributed, through a combination of the image processing system 104 and electronic device 102.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability described above may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the systems and methods have been described, it will be apparent to those of ordinary skill in the art that many more embodiments and implementations are possible within the scope of the systems and methods. Accordingly, the systems and methods are not to be restricted except in light of the attached claims and their equivalents.

What is claimed is:

1. A method comprising:
converting, by a processor, an image chunk in a modified digital image into a pixel array representation comprised of first color pixels or second color pixels, wherein the modified digital image depicts a document; and
determining, by the processor, a character count for the image chunk based on at least one of a number of first color pixels in the image chunk or a number of second color pixels in the image chunk.

2. The method of claim 1, wherein determining the character count for the image chunk comprises:
starting at a leftmost column in the image chunk and traversing sequentially to an adjacent right-hand column in the image chunk, counting the number of first color pixels in each column;
identifying a character start column when the number of second color pixels in a current column exceeds a second color pixel column threshold;
identifying a character end column when the number of first color pixels in the current column exceeds a first color pixel column threshold; and
increasing a character count value for each identified character end column having a corresponding character start column in the image chunk.

3. The method of claim 1, further comprising:
determining a first pixel in the modified digital image as a top left pixel of the image chunk based on a top left score of the first pixel;
determining a second pixel of the modified digital image as a top right pixel of the image chunk based on a top right score of the second pixel; and
determining a row of pixels in the modified digital image as a bottom edge of the image chunk.

4. The method of claim 3, where determining the row of pixels in the modified digital image as the bottom edge of the image chunk comprises:
identifying a particular row of pixels with a proportion of first color pixels exceeding a bottom edge threshold; and
identifying the particular pixel row as the bottom edge of the image chunk.

5. The method of claim 1, further comprising:
applying, by the processor, a pre-processing function to a digital image depicting the document to generate the modified digital image;
wherein the image pre-processing function comprises at least one of an image binarizing function, an image de-skewing function, an image contrast adjustment function, an image cleaning function, an image de-blurring function, or an image size adjustment function.

6. The method of claim 1, further comprising:
receiving, by the processor, a character count parameter including dimension information for the image chunk; and
wherein identifying the image chunk in the modified digital image comprises identifying the image chunk according to the dimension information.

7. The method of claim 1, further comprising:
determining a quality value assigned to the modified digital image.

8. The method of claim 1, further comprising:
identifying an image chunk extension when at least a threshold number of pixel columns are determined to be comprised of all first color pixels adjacent to an edge of the image chunk within the modified digital image.

9. A computing device system comprising:
a memory configured to store a digital image depicting a document; and
a processor in communication with the memory, wherein the processor is configured to:
convert an image chunk in a modified digital image into a pixel array representation comprised of first color pixels or second color pixels, wherein the modified digital image is a modified version of the digital image depicting the document; and
determine a character count for the image chunk based on at least one of a number of first color pixels in the image chunk or a number of second color pixels in the image chunk.

10. The computing device system of claim 9, wherein the processor, to determine the character count for the image chunk, is configured to:
start at a leftmost column in the image chunk and traverse sequentially to an adjacent right-hand column in the image chunk, count the number of first color pixels in each column;
identify a character start column when the number of second color pixels in a current column exceeds a second color pixel column threshold;
identify a character end column when the number of first color pixels in the current column exceeds a first color pixel column threshold; and
increase a character count value for each identified character end column having a corresponding character start column in the image chunk.

11. The computing device system of claim 9, wherein the processor is further configured to:
determine a first pixel in the modified digital image as a top left pixel of the image chunk based on a top left score of the first pixel;
determine a second pixel of the modified digital image as a top right pixel of the image chunk based on a top right score of the second pixel; and
determine a row of pixels in the modified digital image as a bottom edge of the image chunk.

12. The computing device system of claim 11, wherein the processor, to determine the row of pixels in the modified digital image as the bottom edge of the image chunk, is configured to:
identify a particular row of pixels with a proportion of first color pixels exceeding a bottom edge threshold; and
identify the particular pixel row as the bottom edge of the image chunk.

13. The computing device system of claim 9, wherein:
the processor is further configured to apply an image pre-processing function to the digital image to generate the modified digital image; and
the image pre-processing function comprises at least one of an image binarizing function, an image de-skewing function, an image contrast adjustment function, an image cleaning function, an image de-blurring function, or an image size adjustment function.

14. The computing device system of claim 9, wherein the processor is further configured to:
receive a character count parameter including dimension information for the image chunk; and
identify the image chunk in the modified digital image comprises identifying the image chunk according to the dimension information.

15. The computing device system of claim 9, wherein the processor is further configured to determine a quality value assigned to the modified digital image based on the character count value.

16. The computing device system of claim 9, wherein the processor is further configured to:
identify an image chunk extension when at least a threshold number of pixel columns are determined to be comprised of all first color pixels adjacent to an edge of the image chunk within the modified digital image.

17. A device comprising:
a non-transitory machine-readable storage medium; and
instructions stored on the machine-readable medium, the instructions configured to, when executed by a processor, cause the processor to:
convert an image chunk in a modified digital image into a pixel array representation comprised of first color pixels or second color pixels; and
determine a character count for the image chunk based on at least one of a number of first color pixels in the image chunk or a number of second color pixels in the image chunk.

18. The device of claim 17, wherein the instructions, when executed by the processor, cause the processor to:
start at a leftmost column in the image chunk and traverse sequentially to an adjacent right-hand column in the image chunk, count the number of first color pixels in each column;
identify a character start column when the number of second color pixels in a current column exceeds a second color pixel column threshold;
identify a character end column when the number of first color pixels in the current column exceeds a first color pixel column threshold; and
increase a character count value for each identified character end column having a corresponding character start column in the image chunk.

19. The device of claim 17, wherein the instructions, when executed by the processor, cause the processor to:
determine a first pixel in the modified digital image as a top left pixel of the image chunk based on a top left score of the first pixel;
determine a second pixel of the modified digital image as a top right pixel of the image chunk based on a top right score of the second pixel; and
determine a row of pixels in the modified digital image as a bottom edge of the image chunk.

20. The device of claim 17, wherein:
the instructions stored on the machine-readable medium are further configured to, when executed by a processor, cause the processor to apply an image pre-processing function to a digital image to generate the modified digital image; and
the image pre-processing function comprises at least one of an image binarizing function, an image de-skewing function, an image contrast adjustment function, an image cleaning function, an image de-blurring function, or an image size adjustment function.

* * * * *